United States Patent
Reister

[11] 3,769,710
[45] Nov. 6, 1973

[54] ELECTRONIC CELESTIAL NAVIGATION MEANS
[76] Inventor: Richard A. Reister, Box 110-O.W.S. Rd., Yucca Valley, Calif. 92284
[22] Filed: Apr. 1, 1969
[21] Appl. No.: 827,082

[52] U.S. Cl. .............. 33/320, 33/226 Z, 33/222 B, 244/77 R, 250/203 R, 235/150.26, 235/150.27
[51] Int. Cl............................................. G01c 21/00
[58] Field of Search........................................ 33/61

[56] References Cited
UNITED STATES PATENTS
2,513,367   4/1950   Scott.................................. 250/203
2,966,823   1/1961   Trimble .............................. 250/203

Primary Examiner—Robert B. Hull

[57] ABSTRACT

An automatic navigation and guidance system for use in moving vehicles such as air or sea craft, and more particularly a navigation system utilizing a single automatic star or satellite tracker through which a continuous indication of the longitude and latitude of the moving vehicle may be provided to an automatic guidance system, automatic star selection being provided, the described celestial navigation device providing continuous, accurate monitoring of a further inertial navigation device during normal operation, the further inertial navigation device providing continuous navigation and orientation during interruptions of the celestial navigation device.

29 Claims, 42 Drawing Figures

INVENTOR.
BY R. A. Reister

INVENTOR.
R. A. Reister

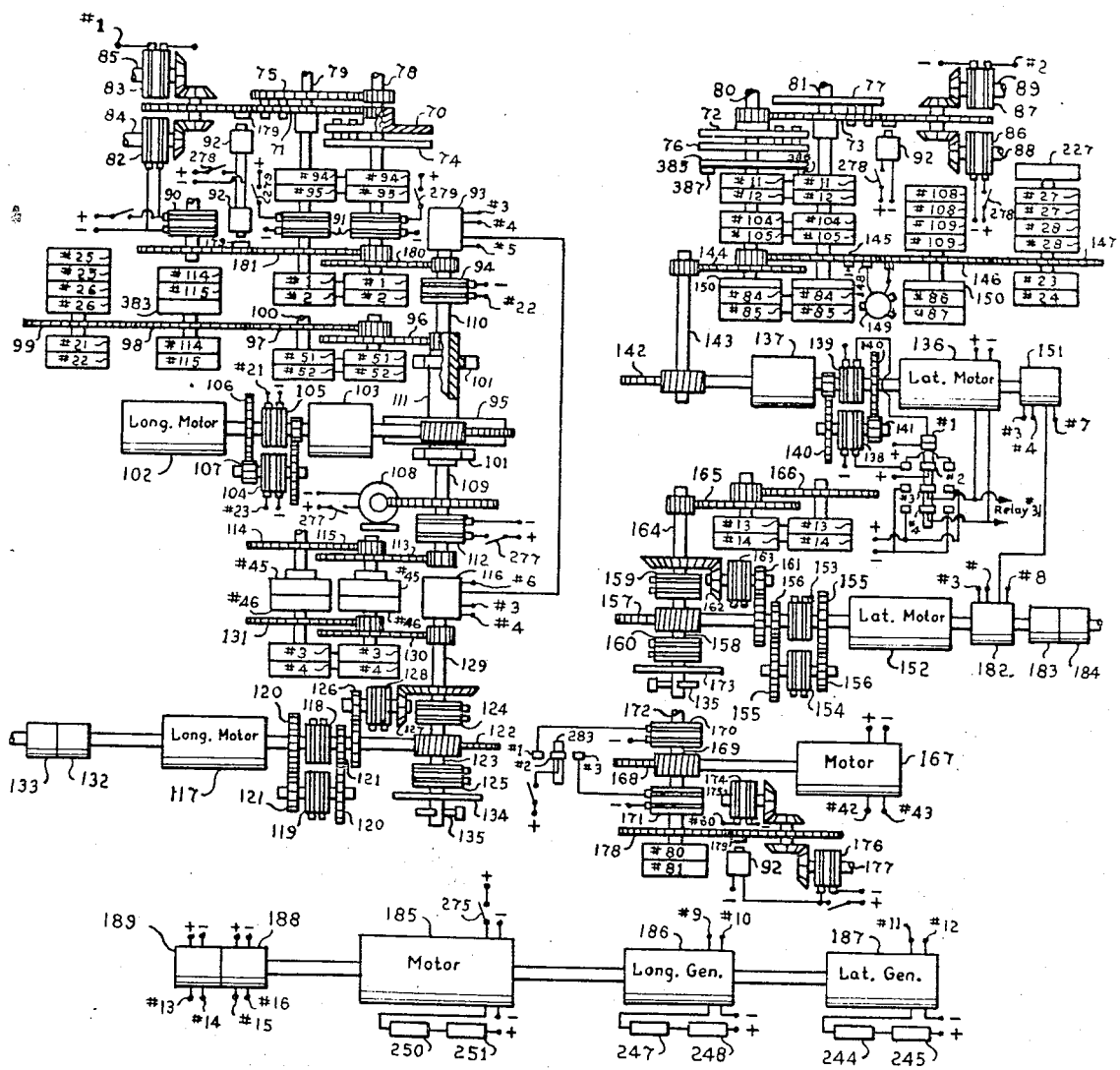
Fig. 7
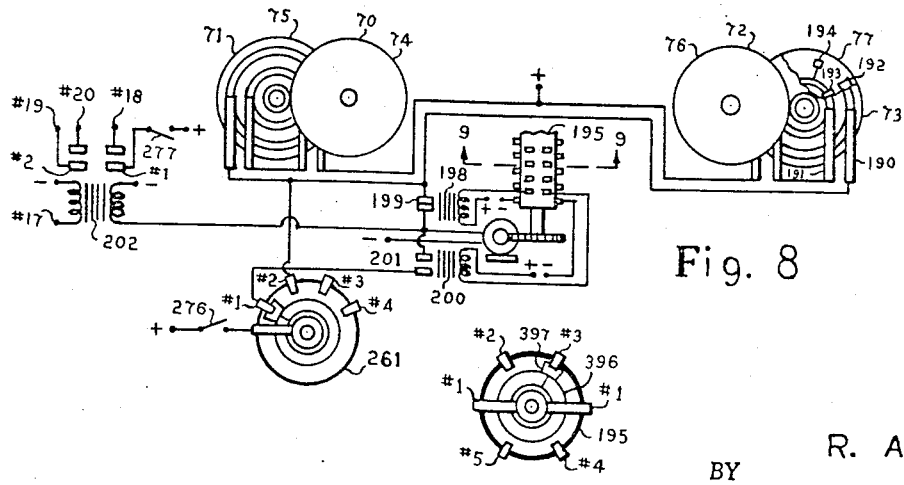
Fig. 8
Fig. 9
INVENTOR.
R. A. Reister
BY

INVENTOR.
Richard A. Reister
BY

ATTORNEY

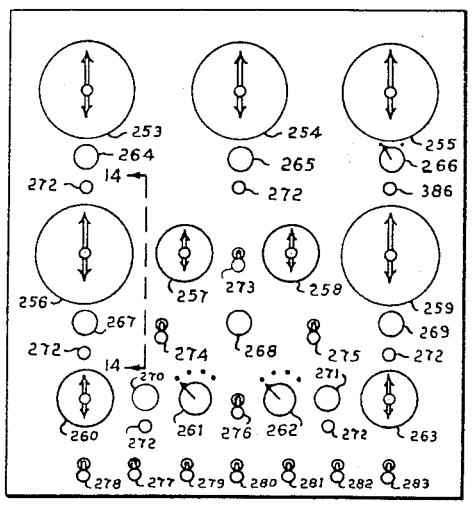
Fig. 13
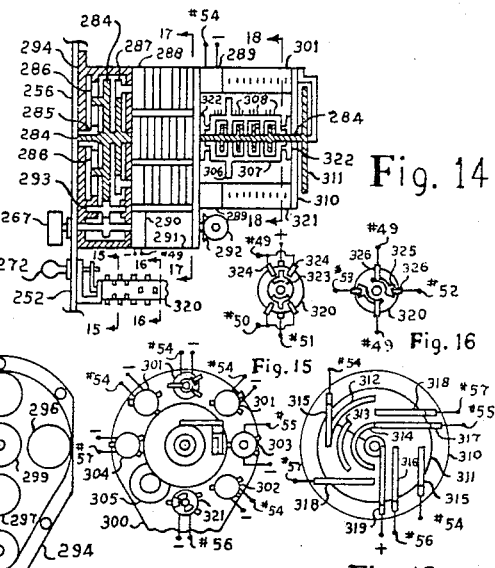
Fig. 14
Fig. 15
Fig. 16
Fig. 17
Fig. 18
Fig. 19
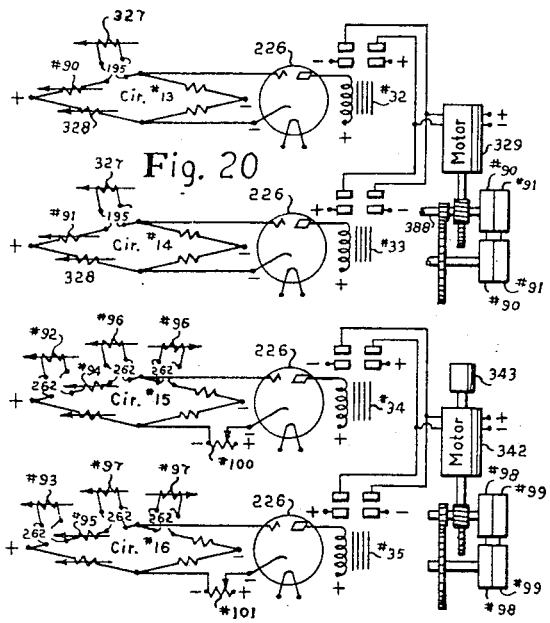
Fig. 20
Fig. 21
Fig. 22
Fig. 23
Fig. 24
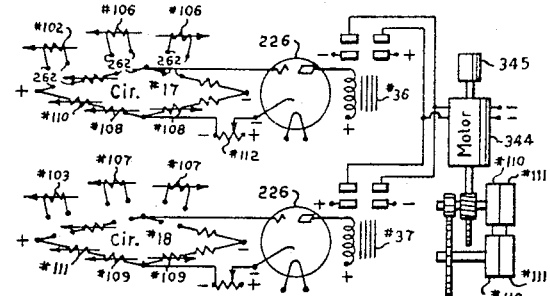
Fig. 25
Fig. 26
Fig. 27
Fig. 28
INVENTOR
R. A. Reister
BY INVENTOR
R. A. Reister
BY

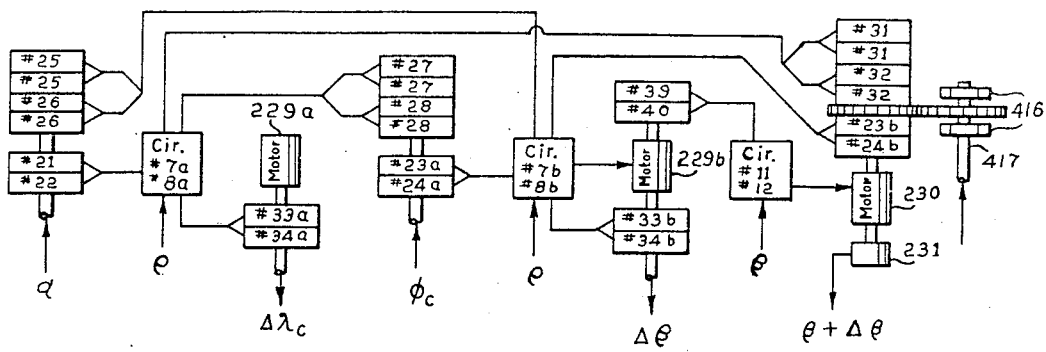
Fig. 31
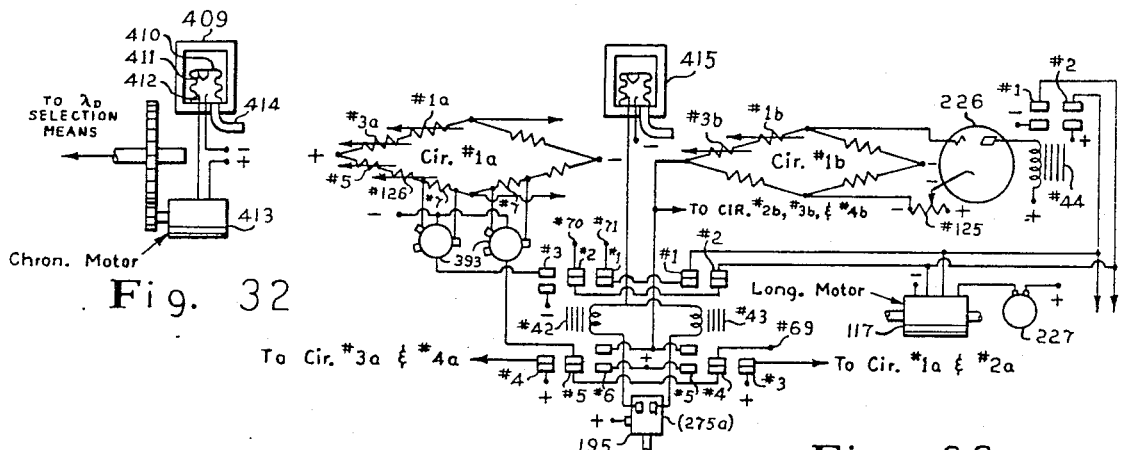
Fig. 32
Fig. 33
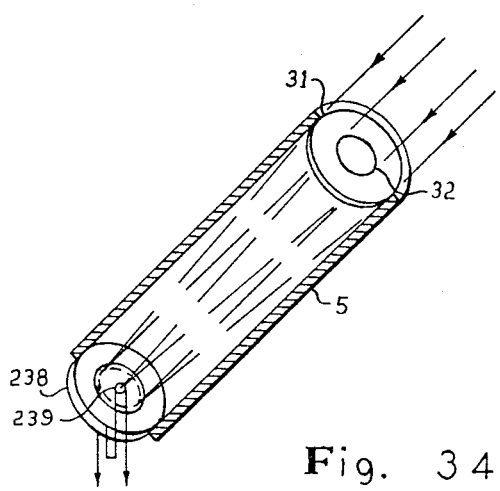
Fig. 34
To input of amplifier 237
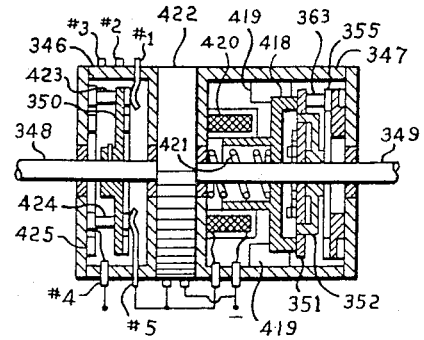
Fig. 35
INVENTOR.
R. A. Reister
BY INVENTOR.
R. A. Reister
BY

INVENTOR.
R. A. REISTER

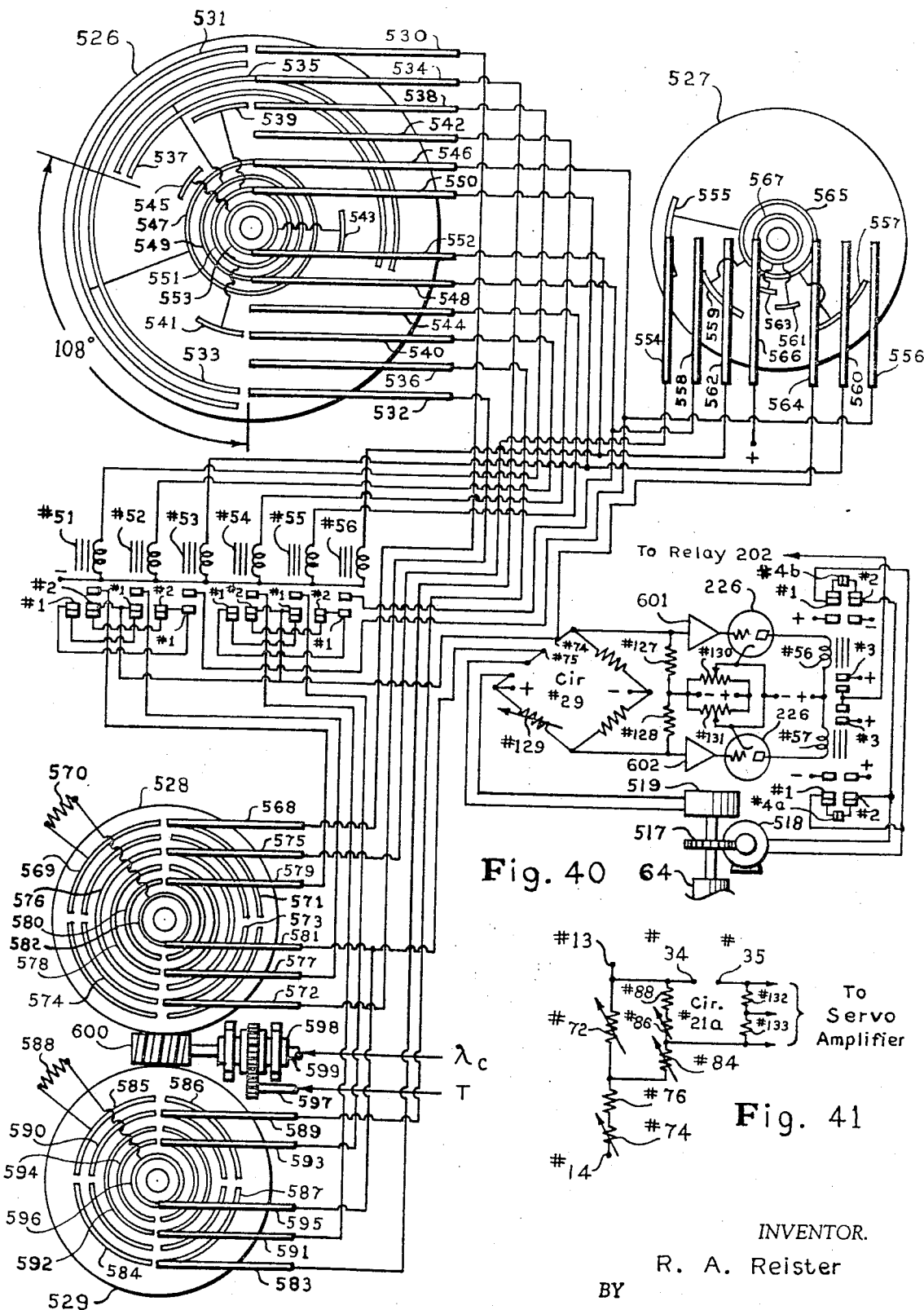

ELECTRONIC CELESTIAL NAVIGATION MEANS

The specification and drawings of the present invention are a continuation of the earlier application Ser. No. 547,101, now abandoned, application Ser. No. 547,101 being a continuation-in-part of the earlier application Ser. No. 56,624 upon which U.S. Pat. No. 3,249,326 issued May 3, 1966.

In navigation systems requiring two stars simultaneously for navigation, the stars should be at a minimum of 45° apart in order to achieve sufficient accuracy, and since maximum accuracy is achieved when the star is at the zenith of the observer, automatic navigation systems requiring two stars simultaneously for navigation may require as many as one hundred stars on a single journey, whereas the present invention requires as few as twelve stars for navigation over the entire surface of the Earth. Also the present invention can conveniently utilize an astrodome which is flush with the outer surface of the craft rather than protruding into the airstream, since stars can be selected for navigation which are relatively near the craft's zenith, whereas a navigation system requiring two stars simultaneously for navigation could not conveniently use such a flush astrodome due to the resulting restricted range of vision. A flush astrodome would be of practical value in a high speed aircraft or missile where protrusion of the astrodome in the airstream might create undesirable heating effects.

Briefly, the navigation system of the present invention is comprized primarily of a double gimbal mounted star follower rotatable about a vertical axis in the craft and a similarly double gimbal mounted magnetic seeking element rotatable about a vertical axis in the craft, the magnetic seeking element capable of aligning itself to the inclination of the Earth's magnetic field in a North-South and East-West direction. A first gimbal system in the star follower serves as a vertical reference from which a second gimbal system in the star follower may align the star tracker with its selected star. A first gimbal system in the magnetic seeking element similarly serves as a vertical reference from which a second gimbal system in the magnetic seeking element may align the magnetic seeking element with the inclination of the Earth's magnetic field at the craft's position. When the first gimbal system of the star follower is properly oriented with respect to True North and a true vertical, the angular position of the second gimbal system of the star follower indicates the latitude and longitude of the craft when properly differentiated with respect to Greenwich Meridain Time. The first gimbal system of the magnetic seeking element is also properly oriented with respect to True North and a true vertical, the angular position of the second gimbal system of the magnetic seeking element providing a measurement of the inclination of the Earth's magnetic field in a North-South and East-West direction at the craft's position. A computer with a memory element is provided with known values of deviation of the Earth's magnetic field from a true vertical in a North-South and East-West direction as a function of longitude and latitude and also deviation of Magnetic North from True North as a function of longitude and latitude, a gyrosyn compass providing the computer with the direction of Magnetic North within the craft. When the automatic star follower is aligned with a selected star at the craft's position, when the computer is provided with a measurement of inclination of the Earth's magnetic field in a North-South and East-West direction as determined by the magnetic seeking element within the craft, and when the star follower provides the computer with the indicated longitude and latitude of the craft's position, the computer is then capable of properly orienting the first gimbal system of the star follower and magnetic seeking element with respect to True North and a true vertical, the second gimbal system of the star follower then indicating the craft's latitude and longitude when properly differentiated with respect to Greenwich Meridian Time.

Due to the nature of gyro-stabilized elements in the system, rolling, pitching, or yawing of the guided craft would have a negligible effect in creating spurious reactions in the system or errors in indicated position. Also, since the Earth's gravity is unnecessary as a vertical reference and the system's accuracy is completely unaffected by accelerations of any kind, the present invention could be utilized for the automatic guidance of high speed aircraft or missiles and even aircraft or missilies leaving and re-entering the Earth's atmosphere.

Electrical contact means are provided in the navigation system which activate solenoids when the star follower reaches a point approaching the limit of navigation for its selected star, the solenoids operating switching means to automatically orient the star follower with the next star selected for navigation.

Further automatic star selection means are provided differentially rotating a star selection disc in accordance with the Earth's rotation and the craft's longitude on Earth such that the rotation of the star selection disc is synchronized with the longitudinal movement of the craft with respect to selected stars or celestial bodies. Electrical contact means responsive to rotation of the star selection disc connect appropriate fixed resistances into a servo system appropriately adjusting switching means to automatically transfer navigation to a proper star whenever a previous star approaches the limit for practical navigation. A longitude selection disc rotating in accordance with the craft's longitude, a latitude selection disc rotating in accordance with the craft's latitude, and relay means responsive to the rotation of the longitude and latitude selection discs further select appropriate electrical contact means of the described star selection disc such that rotation of the star selection disc connects appropriate fixed resistors into the stated servo system adjusting the stated switching means resulting in automatic transfer of navigation to a proper star in accordance with the Earth's rotation and the craft's geographical location on Earth.

Due to the nature of the star tracker providing a special gimbal ring for adjustment to the declination of a selected star in order to maintain the longitude indicating axis of the star tracker parallel to the Earth's axis of rotation, the position of the star tracker provides a direct indication of latitude which is never uncoupled from the star tracker during transfer of navigation to a different star, however indication of longitude provided by the star tracker must be uncoupled from the star tracker during transfer of navigation to a different star, other navigation means maintaining a continuous indication of longitude and latitude during such periods. Therefore relay means are provided such that the servo system providing for reorientation of the star tracker to a different star also provides for electrical computation of longitude from the star tracker's position after transer of navigation to a different star has been accomplished. Further relay means also provide for instantaneous mechanical determination of longitude from the star tracker's position, the described star tracker reorienting servo system further serving to operate the further relay means to electrically correct the mechanically determined longitude whenever an error occurs in the instantaneous mechanical determination of longitude as a result of transfer of navigation to a different star.

The described navigation system also provides for navigation from any one of a series of artificial satellites orbiting at fixed intervals in the Equatorial plane of the Earth either at a constant or varying position in longitude with respect to the Earth's rotation, the described artificial satellite providing radio signals from which the tracking element of the navigation system may track the artificial satellite to provide all weather navigation. More than one series of such satellites may also be provided, means being provided to automatically transfer navigation from one series to another whenever the signal from a satellite in the previous series is interrupted.

Submarines utilizing the navigation system of the present invention to track the described artificial satellites would thus be capable of continuous navigation without ever surfacing, since measurement of the Earth's magnetic field and tracking of the described artificial satellites could be accomplished under water.

Further means are described in the present invention enabling the navigation and guidance system to maintain continuous navigation and guidance of a submarine or orbiting space craft over an indefinite period of time or distance.

The previously described vertical reference properly oriented with respect to True North and a true vertical by the celestial navigation system provides an appropriate platform for the mounting of East-West and North-South accelerometers of an inertial navigation system. A conventional inertial navigation system with the described mounting platform for the accelerometers is therefore provided in conjunction with the described celestial navigation system, the celestial navigation system providing accurate monitoring of the inertial navigation system during normal operation of the celestial navigation system, and the inertial navigation system providing continuous navigation during automatic transfer of navigation to different stars or malfunctioning of the celestial navigation system.

A unique planetary gear utilizing smooth surfaced discs or cylinders with a thin rubber coating as friction drive gears with a minimum number of very high precision teeth to maintain accurate orientation of the friction drive gears may be used to adjust the gimbals in the star follower and other positioning devices in the navigation and guidance systems, such a gear being intended to provide smooth operation with a minimum of backlash and vibration in the star follower and to achieve high positioning accuracy.

An automatic guidance system is employed in which a dead-reckoning computer is utilized to establish the craft's desired route, azimuth and speed selection means controlling the dead-reckoning computer. Wheatstone bridge circuits utilized to control the rudder and azimuth of the craft, similarly as in the azimuth control circuits of an auto-pilot, also directly differentiate between the longitude and latitude of the craft as determined by the navigation system and the desired longitude and latitude as determined by the dead-reckoning computer, thus eliminating the need for differentiating means, a cosine multiplier, and coordinate transformer required in other guidance systems which convert the craft's longitude and latitude into rectangular coordinates parallel and perpendicular to the craft's route. Elimination of the cosine multiplier and coordinate transformer permits direct and instantaneous reaction of the guidance system to changes in longitude and latitude which, when coupled with means in the navigation system anticipating changes in longitude and latitude of the craft before the tracking element reorients to such changes, provides extremely rapid reaction of the navigation and guidance system.

The dead-reckoning computer thus maintains the craft on a desired route and an electrical switch is provided which either adjusts the speed of the dead-reckoning computer to the actual ground speed of the craft or adjusts the speed of the craft to the selected speed of the dead-reckoning computer at the option of the pilot, an automatically adaptive electronic speed control being provided which makes very precise and accurate speed adjustments rather than an oscillating adjustment greater and less than the desired speed. A computer is also provided which determines the correct azimuth to maintain a great circle route to a selected destination, and the computer may automatically adjust the azimuth control of the dead-reckoning computer to maintain such a great circle route at the option of the pilot. Means are also provided to automatically transmit the longitude and latitude values of a second selected destination to the azimuth computer when the craft reaches a first selected destination, thus enabling the craft to be automatically guided through a series of selected destinations.

Means are provided such that the dead-reckoning computer used for automatic guidance also properly orients the star follower temporarily in accordance with the craft's position as determined by the dead-reckoning computer while automatic transfer of navigation to a different star is being accomplished or when tracking of the star selected for navigation is temporarily interrupted by clouds or other obstructions, any error in the craft's position during interruption of the star's tracking being automatically corrected when the star follower is again aligned with the selected star. When the automatic guidance system is turned off for manual operation of an aircraft, such as at take-offs or landings, provision is also made whereby the azimuth and speed selection dials of the dead-reckoning computer are automatically adjusted to the craft's azimuth and true air speed whenever tracking of the star selected for navigation is temporarily interrupted by clouds or other obstructions, such that the star follower is accordingly oriented with its selected star at all times.

A unique type of compact multiple turn linear variable resistor is utilized in the wheatstone bridge guidance circuits in which each revolution of a first linear variable resistor adjusts a second variable resistor in increments of resistance equal to the maximum resistance of the first resistor, the first and second resistor being connected in series to provide any desired degree of accuracy in the guidance system.

Provision is made for navigation and guidance of a craft leaving and re-entering the Earth's atmosphere such that the normal wheatstone bridge guidance circuits are automatically converted to homing circuits prior to the craft's re-entrance into the Earth's atmosphere which merely home the craft on a selected distination, thus permitting the craft to skid considerable distances while maneuvering in the rarefied atmosphere without exceeding the limits of control of the guidance circuit. While the normal guidance circuits are converted to homing circuits, auxiliary positioning circuits are activated to maintain the longitude and latitude determined by the dead-reckoning computer identically equal to the longitude and latitude determined by the navigation system such that immediate conversion back to the normal guidance circuits can be achieved at any instant. When atmospheric density is sufficient for the craft's control surfaces to maintain the position of the craft within the designed limits of tolerance of the control system, an atmospheric pressure operated switch automatically restores to guidance circuits from the homing circuit to the normal wheatstone bridge guidance circuits maintaining a straight line flight path to the selected destination.

Visual position indication means are provided which project the craft's position and route being maintained by the guidance system on any of a series of projected maps at the selection of the pilot. The azimuth selection dial of the dead-reckoning computer adjusts the projected route of the craft on the projected maps such that the pilot may merely adjust the azimuth selection dial until the projected route intersects a desired destination on the selected map to achieve automatic guidance to the selected destination of the azimuth computer isn't turned on to automatically determine the proper azimuth to a pre-set longitude and latitude.

Means are provided to conveniently set various functions into the automatic navigation and guidance system such as sidereal hour angle and declination of various stars to be used for navigation, longitude and latitude of selected destinations, desired speeds and altitudes at various stages of flight, etc., the values being conveniently set into the system or changed during flight at the push of a button. A series of push buttons establish and indicate digits of a desired quantity, a linear variable resistance connected into a positioning circuit being simultaneously adjusted by the push buttons to the desired quantity, a first and second selector switch being used to connect any desired function into the positioning circuit, whereupon the desired function is adjusted in accordance with the indicated quantity at the push of a button.

It is accordingly one of the objects of the present invention to provide a navigation system utilizing a single star and the Earth's magnetic field as a reference to determine a continuous indication of a craft's longitude and latitude, which is independent of the Earth's gravity and is unaffected by accelerations of any kind.

Another object of the present invention is to provide an accurate, economical craft guidance system which will automatically guide a craft to a pre-determined destination or on any ground route conveniently at the selection of the pilot.

A further object is to correct errors in the navigation system due to refraction of light in the Earth's atmosphere.

Another object is to provide an automatic star selector which automatically transfers navigation to a proper star in accordance with time and the craft's geographical location whenever a previous star approaches the limit for practical navigation.

A further object is to provide mechanical differentiation with respect to time of a selected star's hour angle to provide an instantaneous indication of longitude coupled with electronic differentiation to correct any errors in the described mechanical differentiation, the electronic differentiation means further serving to re-orient the star tracker in sidereal hour angle upon transfer of navigation to a different star.

Another object is to provide inertial navigation means in conjunction with the celestial navigation means, the celestial navigation means normally accurately monitoring the inertial navigation means, the inertial navigation means maintaining continuous navigation during automatic transfer of navigation to a different star or during malfunctioning of the celestial navigaiton system.

A further object is to provide navigation from a series of artificial radio satellites orbiting at fixed intervals in the equatorial plane of the Earth either at a constant or varying position in longitude with respect to the Earth to provide all weather navigation.

Another object is to provide continuous automatic navigation and guidance for submarine or sea craft and artificial satellites over an indefinite period of time or distance.

A further object is to provide means for guiding the craft automatically through a series of destinations, and flight conditions such as speed, altitude, etc. which are pre-set into the control.

Another object is to provide at the selection of the pilot either automatic adjustment of the craft's throttle to maintain a desired ground speed or automatic adjustment of the guidance system to the actual ground speed of the craft at a constant throttle setting under all wind conditions.

A further object is to provide an electronic speed control for longitude and latitude motors in the dead-reckoning computer which automatically corrects for wear in the motors, varying resistance in the motor's brushes, varying loads on the motors, etc. so a selected ground route is accurately maintained without frequent repair or adjustment.

Another object is to provide a unique variable resistance providing a high degree of accuracy through multi-turn resolution.

A further object is to provide accurate, economical gearing for accurate transmission of shaft positions.

Another object is to provide automatic guidance of a craft leaving and re-entering the Earth's atmosphere.

A further object is to provide a series of maps of any scale which may be projected on a screen at the pilot's selection.

Another object is to automatically project the craft's position and ground route at any time on any of the projected maps, thus permitting convenient rapid establishment of the craft's course to any selected position on the projected maps.

A further object is to provide means in the navigation system anticipating changes in longitude and latitude of the craft before the celestial tracking element reorients to such changes, and means in the guidance system providing direct and instantaneous reaction of the guidance system to such anticipated changes in longitude and latitude of the craft, thus providing extremely rapid response of the navigation and guidance system.

Other desirable features and advantages of the invention will appear more fully hereinafter from the following detailed description when taken in connection with the accompanying drawings illustrating one form of the invention. It is to be expressly understood, however, that the drawings are utilized for purposes of illustration only and are not to be taken as a definition of the limits of the invention, reference being had for this purpose to the appended claims.

In the drawings, wherein similar reference characters refer to like parts throughout the several views:

FIG. 7 is a view of further details of the navigation and guidance system.

FIG. 8 is a view of a portion of the circuit and mechanism which establishes a series of destinations and flight conditions.

FIG. 9 is a cross-sectional view of multi-pole, multi-position switch 195 in FIG. 8.

FIG. 13 is a view of a control panel.

FIG. 14 is a cross sectional view of azimuth selection dial 256 and its attached mechanisms.

FIG. 15 is a cross-sectional view of switch 320 in FIG. 14.

FIG. 16 is another cross-sectional view of switch 320.

FIG. 17 is a cross-sectional view of the mechanism in FIG. 14 illustrating various variable resistors adjusted by azimuth selection dial 256.

FIG. 18 is a cross-sectional view of the mechanism in FIG. 14 illustrating various rotary relays operated by disc 311 upon adjustment of azimuth selection dial 256.

FIG. 19 is a back view of disc 311 in FIG. 14 which provides automatic adaptation of the guidance system to proper operation at any selected azimuth.

FIG. 20 is an illustration of the circuit controlling the attitude of the craft with respect to the Earth's surface.

FIG. 21 is a back view of azimuth computer 46 illustrating connections to elements of the navigation and guidance system.

FIG. 22 is a detail illustrating connections of rotary relay 301 of FIG. 18 to one type of variable resistor.

FIG. 23 is an other detail illustrating connections of rotary relay 301 to another type variable resistor.

FIG. 24 is an illustration of circuits used to indicate a craft's position on a projected map.

FIG. 25 is a cross-sectional view of variable resistors 346 and 347 providing high accuracy and rapid resolution.

FIG. 26 is another cross-sectional view of variable resistor 347.

FIG. 27 is a back view of the projection mechanism which indicates a craft's position and ground route on a projected map.

FIG. 28 is a front view of the mechanism of FIG. 27.

Figure 30:
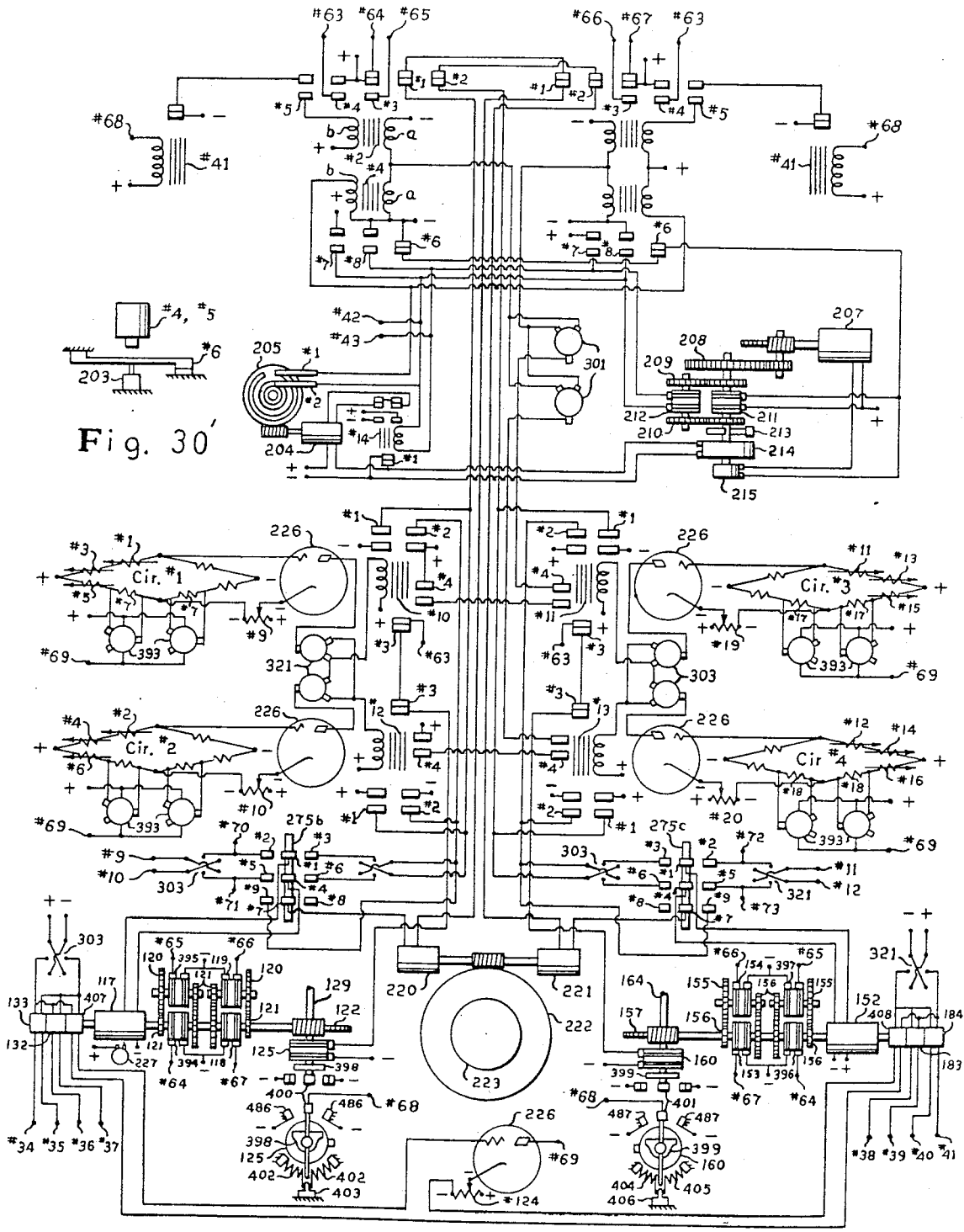
FIG. 30 is an illustration of a modification of the guidance circuit of FIG. 10.

FIG. 30' is a detail of relays #4 and #5 in FIG. 30.

FIG. 31 is an illustration of a computer for correction of errors due to refraction of light in the Earth's atmosphere.

FIG. 32 is a detail providing for adjustment in longitude of a selected destination when the guided craft leaves the Earth's atmosphere.

FIG. 33 illustrates a modification of the guidance circuit of FIG. 30, providing proper guidance of a craft upon entering the Earth's atmosphere.

FIG. 34 is a view of the interior of tracking telescope 5.

FIG. 35 is an illustration of a modification of the variable resistors of FIG. 25.

Figure 36:
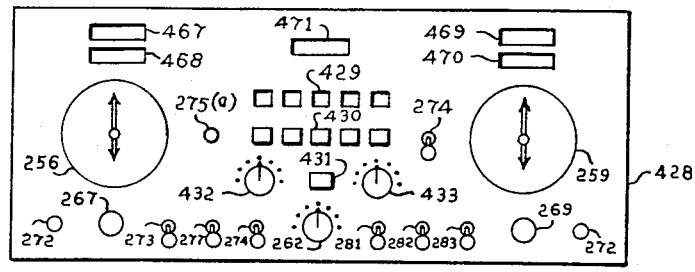

FIG. 36 illustrates a control panel.

Figure 37:
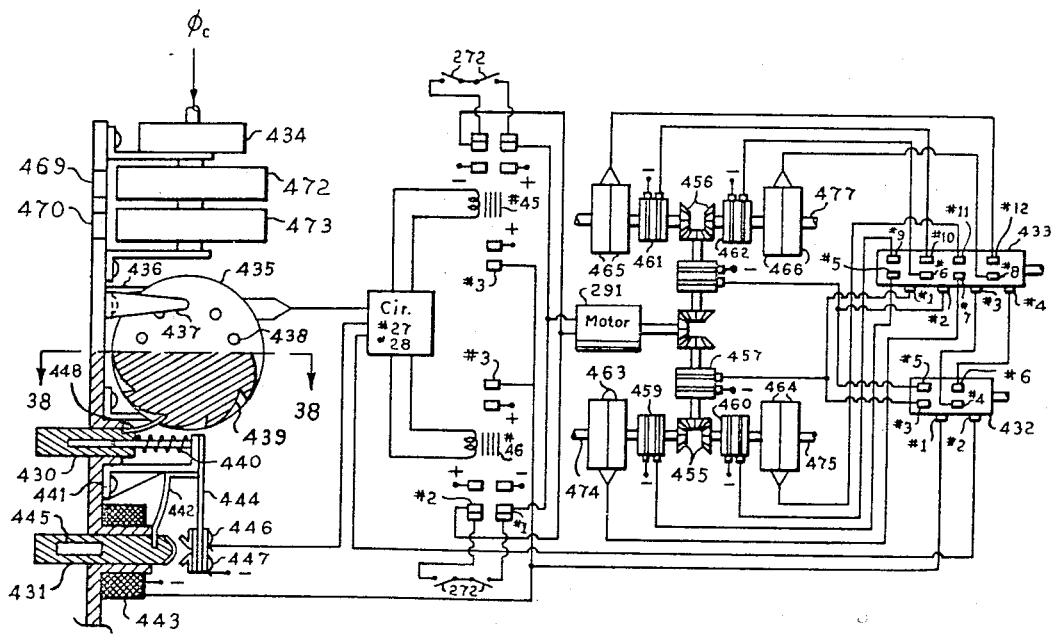

FIG. 37 illustrates the mechanism by which various data is inserted into the navigation and guidance system through the control panel of FIG. 36.

Figure 38:
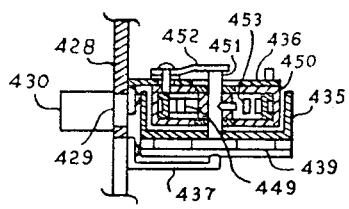

FIG 38 is a cross-sectional view of the mechanism of FIG. 37.

Figure 6:
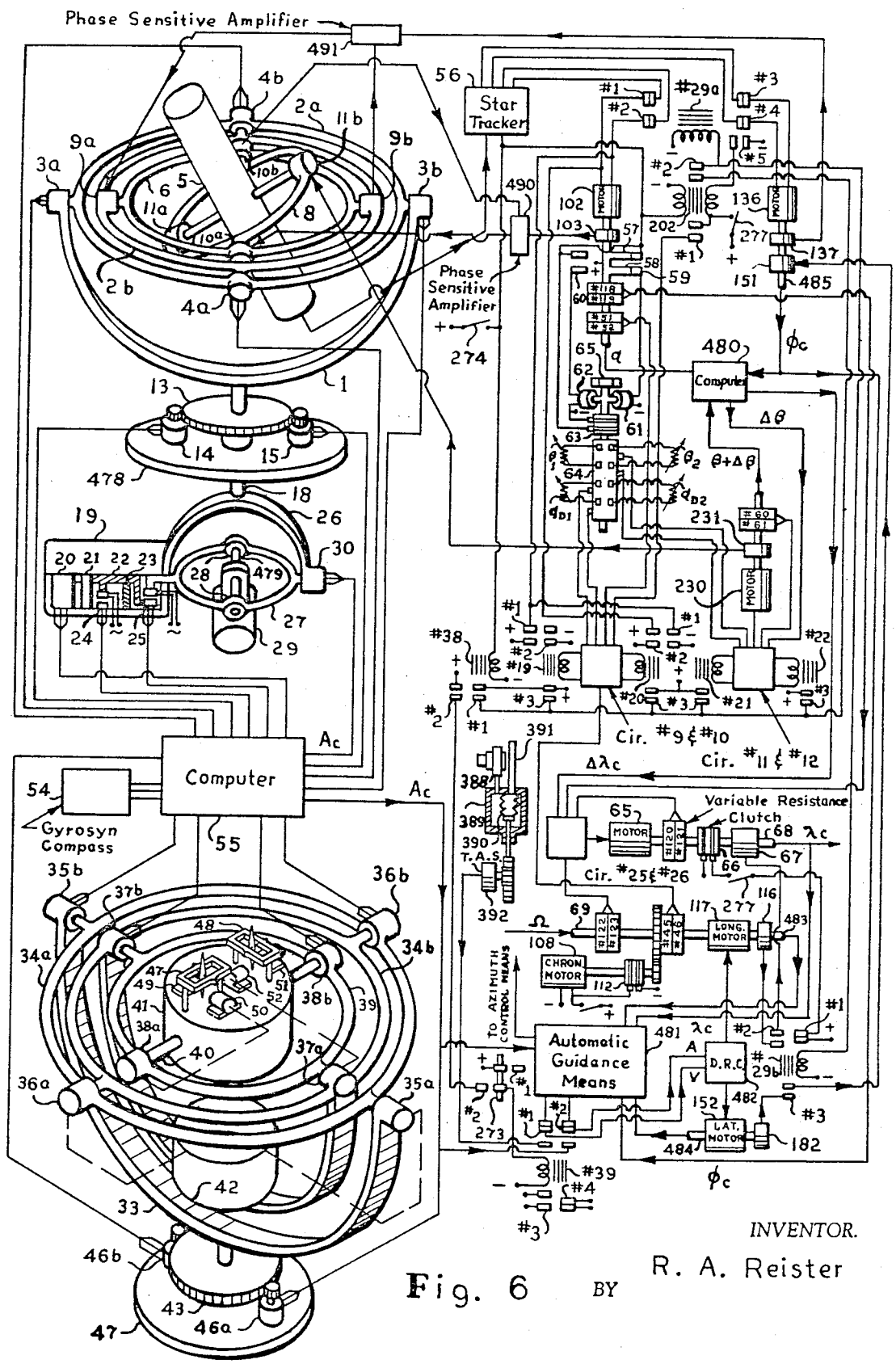
FIG. 6 is a three dimensional view and block diagram illustrating the fundamental principle of the navigation mechanism and the relationship of the principal navigation components.
Figure 11:
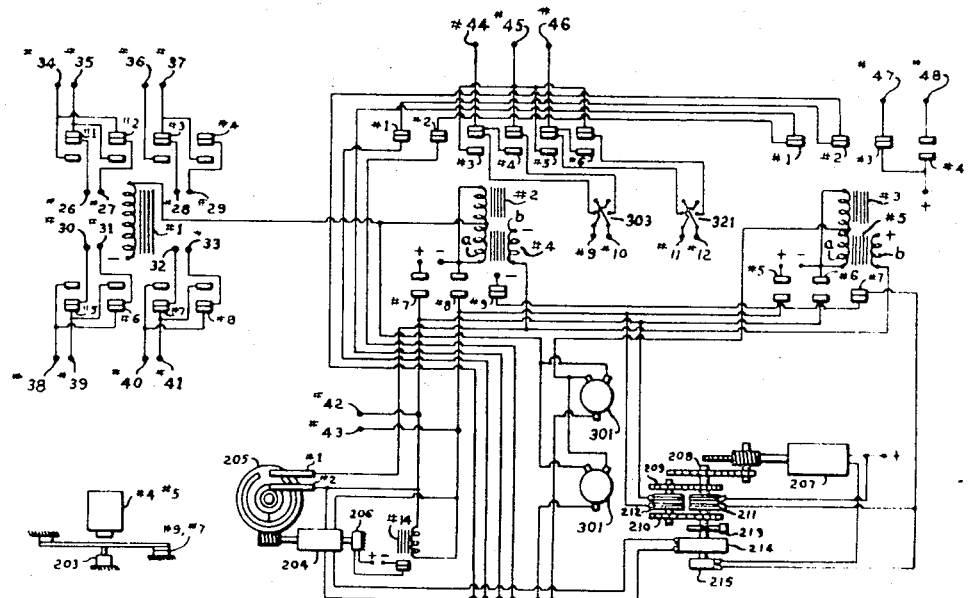
FIG. 11 is a detail of relay #4 and #5 in FIG. 10.
Figure 39:
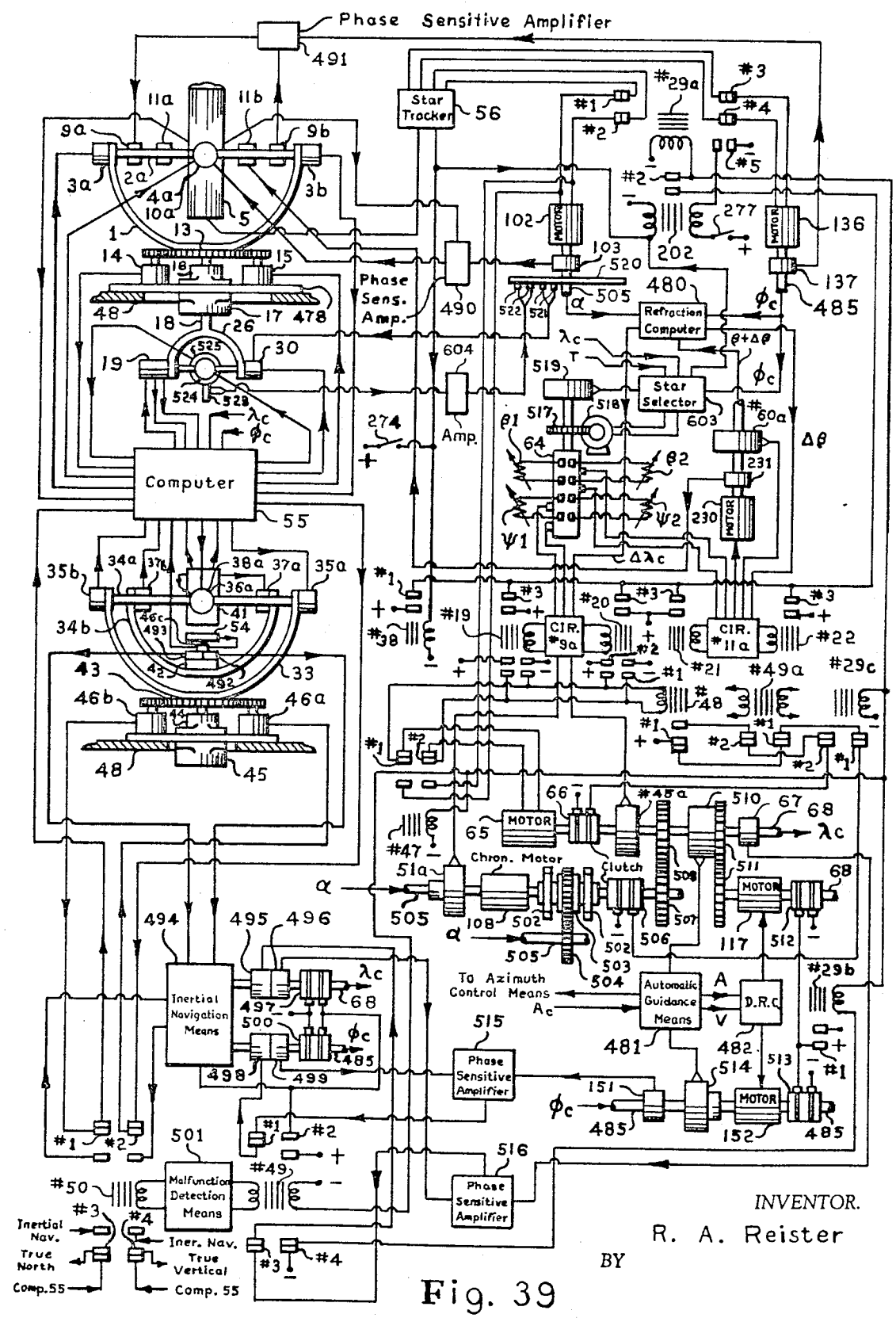

FIG. 39 illustrates modifications in the navigation system provided in the present invention over the navigation system illustrated in FIG. 6.

FIG. 40 is a more detailed schematic illustration of the automatic star selector illustrated in block form in FIG. 39.

Figure 12:
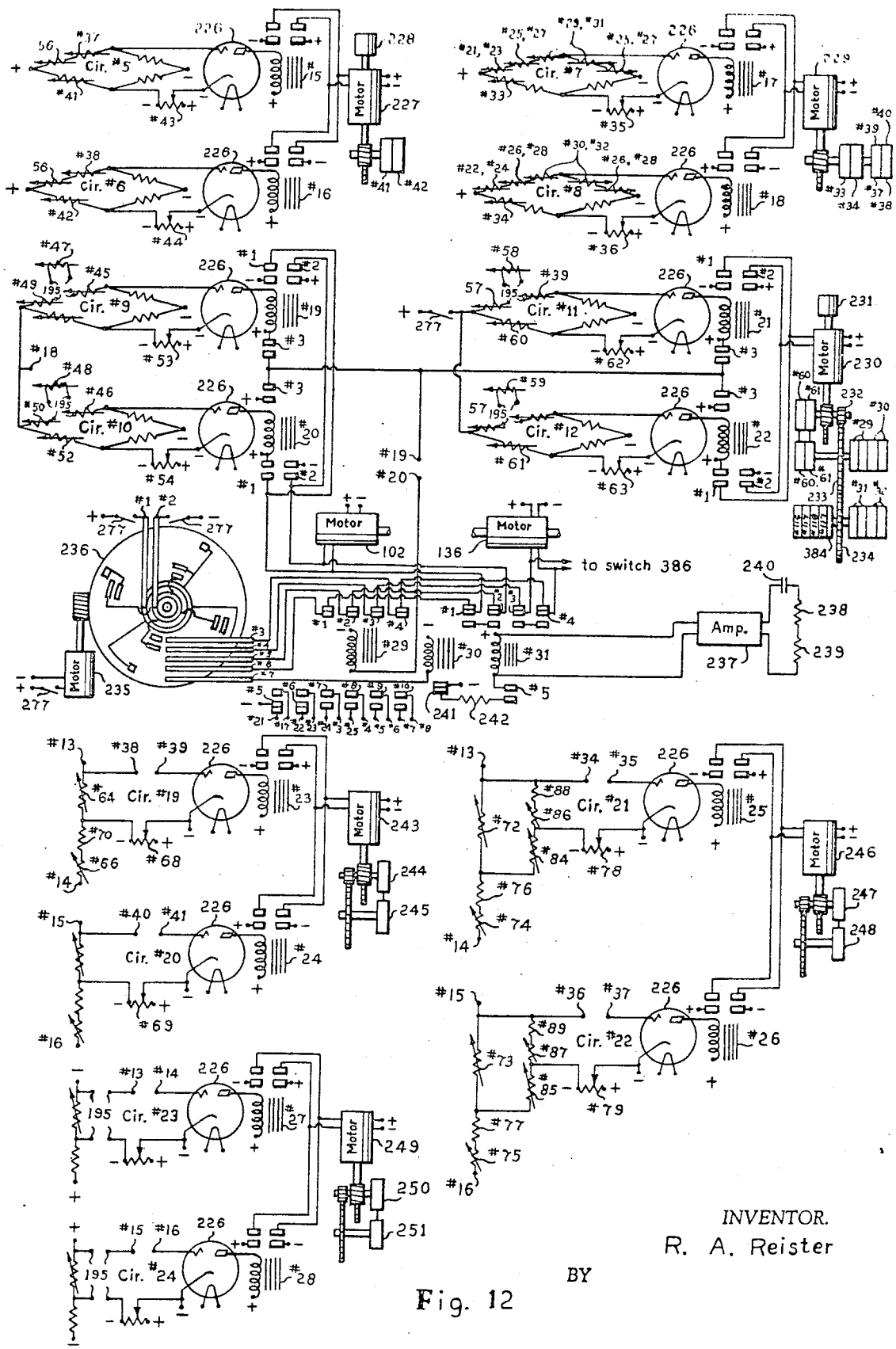
FIG. 12 is an illustration including circuits for correction of refraction of light by the Earth's atmosphere, circuit for star tracking mechanism, circuit for automatic transfer of navigation to different stars, and electronic speed control circuits of longitude and latitude motors in dead-reckoning computer.

FIG. 41 illustrates the use of conventional servo amplifiers for circuits #21– #22 of the dead-reckoning computer in FIG. 12.

The symbol # is to be taken as a part of the reference character differentiating it from a reference numeral without that symbol.

While the description herein considers the instant invention as applied to the problem of automatic craft navigation and guidance, it is to be understood that the present invention also relates to the novel features or principles of the instrumentalities described herein, whether or not such are used for the stated objects, or in the stated fields or combinations.

Although the principles illustrated and described in the present invention in determining a true vertical and True North reference apply particularly to the disclosed navigation system, it is to be expressly understood that the principles would apply equally well to any navigation system capable of determining a geographical positon in longitude and latitude in which reference to a true vertical or True North completely unaffected by accelerations of any kind were either essential or desired. It is also to be expressly understood that one embodiment of apparatus responsive to signals from a star tracking element to align the tracking element with its selected star as disclosed in the present invention is for illustrative purposes only and that any apparatus responsive to signals from a tracking element to properly orient the tracking element with a selected celestial body could be utilized, as indicated in FIG. 6.

The determination of continuous, instantaneous, exact geographical location, plus a precise true vertical and True North reference the accuracy of which is unaffected by acceleration of any kind is vitally important in the sighting of military equipment such as mobile artillery, tanks, mobile rocket launchers, and mobile ballistic missile launchers either at sea utilizing submarines or on land utilizing mobile equipment or in the air utilizing aircraft. The express purpose of this invention is to provide such information through reference to a single celestial body, so such information could be conveniently obtained as in the present invention during daylight hours by reference to the Sun or at any time by reference to a single satellite orbiting in the plane of the Earth's equator at a constant position with respect to the Earth, the star tracking telescope being conveniently replaced by a single seeking antenna tracking radio signals emanating from the described satellite.

THE NAVIGATION SYSTEM

The basic principle of the navigation system is illustrated in FIG. 6, where it is readily seen that the automatic star follower 5 is mounted in a double gimbal system supported by frame 1 rotatable about a first vertical axis 18 in the craft, a True-North seeking gyroscope 29 being gimbally attached to axis 18 to stabilize frame 1 with respect to True North. In the following, certain gimbal rings are also designated as gimbal platforms, as explained below. A first gimbal platform 2b has three degrees of rotational freedom about three mutually perpendicular axes which permits orientation of said first gimbal platform 2b with respect to true north and a true vertical, first outer gimbal ring 2a being rotatably mounted about a second axis within supporting frame 1, the second axis being perpendicular to the first vertical supporting axis 18, a second gimbal ring 2b being rotatably mounted about a third axis within the first gimbal ring 2a, the third axis being perpendicular to the second axis, the plane of the second gimbal ring 2b being oriented perpendicular to a true vertical through the center of the Earth, and the third axis about which the second gimbal ring 2b rotates being aligned with True North. A second gimbal platform 8 with two degrees of rotational freedom about two mutually perpendicular axes is mounted within the first gimbal platform 2b to align the star follower 5 with a selected star, a third gimbal ring 6 being rotatably mounted about a fourth axis within the second gimbal ring 2b, the fourth axis being perpendicular to the third axis, a fourth gimbal ring 8 being rotatably mounted about a fifth axis within the third gimbal ring 6, the fifth axis being perpendicular to the fourth axis, and the star follower 5 being rotatably mounted about a sixth axis within the fourth gimbal ring 8, the sixth axis being perpendicular to the fifth axis and the optical axis of telescope 5 being perpendicular to the sixth axis. The angular position of star follower in rotation about the sixth axis 5 in the fourth gimbal ring 8 is adjusted to the declination of a selected star, the optical axis of star follower 5 being perpendicular to the plane of fourth gimbal ring 8 at 0° declination. The angluar position of the star follower 5 in rotation about the fourth and fifth axes (represented respectively by the third gimbal ring 6 and the fourth gimbal ring 8) is then adjusted by the star tracking apparatus to align the optical axis of the star follower 5 with a selected star.

Thus when the star follower 5 is aligned with its selected star and the second gimbal ring 2b is properly oriented with respect to a true vertical and True North as previously described, the fifth axis (about which the fourth gimbal ring 8 rotates) is aligned parallel to the Earth's axis of rotation, the angular position of the fourth gimbal ring 8 with respect to the third gimbal ring 6 then indicating hour angle of the selected star which when properly differentiated with Greenwich Meridian Time provides the longitude of the craft, and the angular position of the third gimbal ring 6 with respect to the second gimbal ring 2b indicating the latitude of the craft since the angle of the Earth's axis of rotation (represented by the third gimbal ring 6) with respect to a true vertical through the center of the Earth (represented by the second gimbal ring 2b) indicates the latitude of the craft. For purposes of reference in the claims, gimbal ring 2b may be referred to as a first gimbal platform with three degrees of rotational freedom permitting orientation of said first gimbal platform with respect to true north and a true vertical, gimbal ring 8 may be referred to as a second gimbal platform having a first axis of adjustment (9a – 9b) with respect to said first gimbal platform, said second gimbal platform having a second axis of adjustment (10a – 10b) with respect to said first gimbal platform, a tracking element 5 being mounted to rotate on a third axis (11a – 11b) on said second gimbal plaftorm.

A theoretical example will serve to illustrate alignment of the fifth axis (about which the fourth gimbal ring 8 rotates) parallel to the Earth's axis of rotation. Assume the craft to be at 0° latitude at the Earth's equator, the declination of the star selected for navigation to be 0°, and time such that the star selected for navigation is at the craft's zenith. Then it is readily seen that the fifth axis, about which the fourth gimbal ring 8 rotates, would be aligned parallel to the Earth's axis of rotation under normal conditions of operation where the gimbal system was properly oriented with respect to a true vertical and True North as previously described. It is also readily seen that movement of the craft East or West parallel to the Earth's equator or North or South perpendicular to the Earth's equator would not affect the alignment of the fifth axis with respect to the Earth's axis of rotation such that the fifth axis (about which the fourth gimbal ring 8 rotates) would always remain parallel to the Earth's axis of rotation as long as the star follower were aligned with the star selected for navigation and the gimbal system was properly oriented with respect to True North and a true vertical as previously described.

The magnetic seeking element for determining the inclination of the Earth's magnetic field in North-South and East-West direction within the craft is mounted in a double gimbal system supported by frame 33 rotatable about a further first vertical supporting axis within the craft, similarly as the star follower is mounted, as illustrated directly below the star follower in FIG. 6. (For purposes of reference the vertical supporting axis of the magnetic inclination seeking element will be referred to as the first axis of the magnetic inclination seeking element to distinguish it from the first vertical supporting axis 18 of the star follower, further similarly designated axes and gimbal rings in the magnetic inclination seeking element being similarly referred to.) In the magnetic inclination seeking element, a first gimbal system with two degrees of rotational freedom about two mutually perpendicular axes provides a vertical reference platform, first outer gimbal ring 34a being rotatably mounted about a second axis within supporting frame 33, the second axis being perpendicular to the first vertical supporting axis of frame 33, a second gimbal ring 34b being rotatably mounted about a third axis within the first gimbal ring 34a, the third axis being perpendicular to the second axis, vertical seeking gyroscope 42 being attached to the second gimbal ring 34b in a suspended position below gimbal 34b as illustrated to stabilize the plane of the second gimbal ring 24b in a position perpendicular to a true vertical through the center of the Earth, and the third axis about which the second gimbal ring 34b rotates being aligned with True North. A second gimbal system with two degrees of rotational freedom about two mutually perpendicular axes is mounted within the first gimbal system platform to align the magnetic seeking element 41 with the inclination of the magnetic lines of force of the Earth, a third gimbal ring 39 being rotatably mounted about a fourth axis within the second gimbal ring 34b, the fourth axis being perpendicular to the third axis, and gyroscope 42 being rotatably mounted about a fifth axis 40 within the third gimbal ring 39, the fifth axis 40 being perpendicular to the fourth axis, and the spin axis of gyroscope 41 being perpendicular to the fifth axis 40. The spin axis of gyroscope 41 is aligned parallel or tangent to the magnetic lines of force of the Earth by magnetic inclinometers 47 and 48, inclinometers 47 and 48 being mounted atop gyroscope 41 to respectively indicate the inclination of the Earth's magnetic field in a North-South and East-West direction, photo-pickoff means 50 and 52 respectively creating signals responsive to the position of inclinometers 47 and 48 to torque gyroscope 41 until precession of gyroscope 41 aligns the spin axis of gyroscope 41 parallel or tangent to the lines of force of the Earth's magnetic field. The angular position of the spin axis of gyroscope 41 with respect to the third gimbal ring 39 and the angular position of the third gimbal ring 39 with respect to the second gimbal ring 34b is then a measure of the deviation of the Earth's magnetic field within the craft from the vertical reference of second gimbal ring 34b, the described deviation of the Earth'magnetic field in a North-South and East-West direction from the vertical reference of gimbal ring 34b being supplied to computer 55.

Computer 55 employs memory elements to store the known deviation of the Earth's magnetic field in a North-South and East-West plane with respect to a true vertical through the center of the Earth as a function of longitude and latitude, the known values being obtained from a device contructed in a manner identically similar to the magnetic seeking device illustrated in FIG. 6. The known deviation of Magnetic North from True North as a function of longitude and latitude is also stored in memory elements of computer 55, gyrosyn compass 54 providing computer 55 with the direction of Magnetic North with respect to the craft at the craft's geograhical location. Thus when computer 55 is provided with the longitude and latitude of the craft as determined by the navigation device, computer 55 may determine the deviation of Magnetic North from True North at the craft's indicated position and correspondingly properly orient frame 1 of the star follower and frame 33 of the magnetic inclination seeking element with respect to True North as previously described, computer 55 overriding True North seeking gyroscope 29. True North seeking gyroscope 29 thus serves as an auxiliary True North reference in the event of failure of computer 55 in addition to providing gyro stabilization of frame 1. Computer 55 similarly determines the deviation of the Earth'magnetic field in a North-South and East-West direction with respect to a true vertical at the craft's indicated position and correspondingly properly orients the second gimbal ring 2b of the star follower with respect to a true vertical, the position of the second gimbal ring 34b of the magnetic inclination seeking element with respect to the craft serving as an intermediary reference from which computer 55 may properly orient the second gimbal ring 2b of the star follower in accordance with the difference between the observed deviation of the Earth's magnetic field from a true vertical (as determined by the position of gimbal ring 34b with respect to the magnetic inclination seeking element) and the true deviation of the Earth's magnetic field from a true vertical as determined by computer 55 at the craft's indicated position. Computer 55 may also override vertical seeking gyroscope 42 to adjust the second gimbal ring 34b of the magnetic inclination seeking element until the plane of gimbal ring 34b is perpendicular to a true vertical, the position of the second gimbal ring 2b of the star follower then being slaved to the position of the second gimbal ring 34b of the magnetic inclination seeking element, vertical seeking gyroscope 42 serving as an auxiliary vertical reference in the event of failure of computer 55 in addition to providing gyro stabilization of the vertical reference. It may be noted that gyroscope 41 in the magnetic inclination seeking element gyro stabilizes the position of the magnetic inclinometers with respect to the Earth's magnetic field and in addition gyro stabilizes the direction of frame 33 with respect to True North at all geographical locations of the craft except directly over the magnetic poles of the Earth where the spin axis of gyroscope 41 would be aligned in a vertical position. Computer 55 and the torquer adjusting the direction of frame 33 about its vertical supporting axis would of course override this gyro stabilization effect to maintain frame 33 properly oriented with respect to True North, it being understood that the direction of frame 33 would be slaved to the direction of frame 1 in the star follower such that True North seeking gyroscope 29 would properly orient both frame 1 and frame 33 with respect to True North in the event of failure of computer 55.

A few theoretical examples will serve to illustrate the operation of computer 55 in properly orienting the gimbal systems with respect to a true vertical and True North.

I. Assume the craft to be at a longitude of 90° West at some latitude within the United States where the known deviation of Magnetic North from True North is 5° East, the star selected for navigation being South of the craft's zenith. Then if the gimbal systems of the star follower and magnetic inclination seeking element are rotated clockwise from True North such that they ae oriented to a direction in the craft less than 5° West of Magnetic North (3° West for example), the longitude determined by the navigation device will be greater than 90° West, since the error in direction of the gimbal systems would cause the fourth gimbal ring 8 in the star follower to rotate in the same direction as if the craft had traveled West in order to maintain the star follower 5 aligned with its selected star. Computer 55 would then determine the correct deviation of Magnetic North from True North to be greater than 5° West at the increased indicated longitude and would accordingly adjust the gimbal systems in a counter-clockwise direction to properly correct the error in direction of the gimbal systems. Similarly if the gimbal systems were rotated counter-clockwise from True North such that the gimbal systems were oriented to a direction greater than 5° West of Magnetic North (7° West for example) at the assumed position of the craft, the indicated longitude would be less than 90° West, computer 55 would determine the correct deviation of Magnetic North from True North to be less than 5° West at the descreased indicated longitude and would accordingly adjust the gimbal systems in a clockwise direction to properly correct the error in direction of the gimbal systems. Thus it is seen that computer 55 would adjust the direction of the gimbal systems until the deviation of the gimbal systems from Magnetic North equalled the deviation of Magnetic North from True North as determined by computer 55 at the indicated position of the craft, where the gimbal systems would be properly oriented with respect to True North. It is also seen that deviation of the gimbal systems from the null point at True North would result in a magnified correction signal from computer 55 due to the resulting error in indicated longitude, which would reduce the error in direction of the gimbal systems from the null point necessary to produce a corrective signal from computer 55, thus resulting in more precise orientation of the gimbal systems with respect to True North. Due to the gyro stabilization of the gimbal systems with respect to True North by True North seeking gyroscope 29, the rate of precession of True North seeking gyroscope 29 would be slower than the rate of adjustment of the fourth gimbal ring 8 with respect to the third gimbal ring 6 to maintain star follower 5 aligned with its elected star, therefore the error in indicated longitude would diminish to zero when the gimbal systems were properly oriented with respect to True North, and the magnified corrective signal from computer 55 would diminish to zero when the gimbal systems were properly oriented with respect to True North, thus preventing overshooting of the null point by computer 55 and preventing spurious corrections of the gimbal systems with respect to True North. Since frame 1 of the star follower is gyro stabilized in direction by True North seeking gyroscope 29, and frame 33 of the magnetic inclination seeking element is gyro stabilized in direction by gyroscope 41 as previously described, the direction of frame 33 being slaved to the direction of frame 1, there would always be a negligible error between the direction of frame 33 and frame 1, and any error which occurred in the direction of frame 33 would have a negligible effect in creating errors in the inclination of the Earth's magnetic field as determined by the magnetic inclination seeking element.

II. Assume the craft to be at a longitude of 80° West at some latitude in the United States where the known deviation of Magnetic North from True North is 5° West. Then if the gimbal systems are rotated clockwise from True North such that they are oriented to a direction in the craft greater than 5° East of Magnetic North (7° East for example), the fourth gimbal ring 8 in the star follower will again be rotated in a direction as if the craft had moved West, causing an increase in indicated longitude. Computer 55 would then determine the correct deviation of Magnetic North from True North to be less than 5° West at the increased indicated longitude and would accordingly adjust the gimbal systems in a counter-clockwise direction to properly correct the error in direction of the gimbal systems. Rotation of the gimbal systems counter-clockwise from True North under the stated conditions would similarly result in a proper clockwise correction of the gimbal systems to True North. Thus it is seen that computer 55 properly orients the gimbal systems to True North regardless of whether the deviation of Magnetic North is East or West of True North as indicated in Examples I and II.

III. Assume an aircraft to be at a latitude of 35° North and flying West at some position in the United States. Assume the craft rolled violently counter-clockwise so suddenly and quickly that the second gimbal ring 2b in the star follower was temporarily displaced counter-clockwise from a true vertical in a North-South plane. (Such a supposition is unlikely since the reaction time and speed of operation of the mechanism adjusting gimbal ring 2b would most likely be sufficient to cope with any situation so that such errors would be negligible.) It is plausible to assume that the rate of adjustment of the third gimbal ring 6 with respect to the second gimbal ring 2b in the star follower to maintain orientation of the star follower 5 with its selected star would be approximately equal to or slightly greater than the rate of adjustment of the first gimbal ring 2a with respect to frame 1. Thus any sudden error which occurred in the position of gimbal rings 2b and 2a would be half way corrected by the time star follower 5 was realigned with its selected star, at which point the position of gimbal ring 2a with respect to frame 1 and the position of gimbal ring 6 with respect to gimbal ring 2b would be adjusted to their correct positions at equal speed in maintaining star follower 5 aligned with its selected star, therefore the error in indicated latitude would be negligible at the time gimbal ring 2b were properly oriented with respect to a true vertical, and the maximum error in indicated latitude would be approximately one half the maximum deviation of gimbal ring 2b from a true vertical. In the stated deviation of gimbal ring 2b from a true vertical, gimbal ring 2b would be in a position as if the deviation of the earth's magnetic field in a North-South direction from a true vertical were less than that which actually occurred at the craft's true position. The error in position of gimbal ring 6 with respect to gimbal ring 2b would produce a decrease in indicated latitude, since gimbal ring 6 would be initially rotated with respect to gimbal ring 2b in a direction as if the craft had moved South in order to maintian star follower 5 aligned with its selected star. Computer 55 would then determine that the deviation of the Earth's magnetic field in a North-South direction from a true vertical was greater at the descreased indicated latitude than that which actually occurred at the craft's true position (since the Earth's magnetic field rotates in a counter-clockwise direction in a North-South plane with Southern movement), and computer 55 would consequently properly adjust gimbal ring 2b clockwise in a North-South plane to correct the error. It is also seen that deviation of gimbal ring 2b from a true vertical in a North-South plane would result in a magnified corrective signal from computer 55 due to the error in indicated latitude which would occur and that the magnified corrective signal would diminish to zero when gimbal ring 2b were properly oriented to a true vertical, since the error in indicated latitude would be negligible at this point as previously described. Thus computer 55 would not overshoot the null point of gimbal ring 2b and spurious corrections of gimbal ring 2b would not occur, the temporary error in indicated latitude resulting under the stated conditions being only approximately half the initial error in position of gimbal ring 2b. Rotation of gimbal ring 2b clockwise from a true vertical in a North-South plane would of course similarly result in a proper counter-clockwise correction of gimbal ring 2b by computer 55.

IV. Assume an aircraft to be also flying NOrth under the conditions stated in Example I and the craft rolled violently clockwise so quickly and suddenly that the second gimbal ring 2b in the star follower was temporarily displaced clockwise from a true vertical in an East-West plane. (Such a supposition is unlikely since the reaction time and speed of operation of the mechanism adjusting gimbal ring 2b would most likely be sufficient to cope with any situation so that such errors would be negligible. Rotation of the second gimbal ring 2b in the star follower from a true vertical under the stated conditions would produce a decrease in indicated longitude (equal approximately to one half the initial error in position of gimbal ring 2g similarly as in Example III), since the initial movement of the fourth gimbal ring 8 with respect to the third gimbal ring 6 to maintain star follower 5 aligned with its selected star would be as if the craft had moved East. Suppose the decrease in indicated longitude due to rolling of the craft clockwise was greater than the increase in inidicated longitude due to the deviation of the gimbal systems from True North (in Example I), and that the resulting decrease in indicated longitude was of such magnitude that computer 55 determined that the correct deviation of Magnetic North from True North was not only less than 5° West but less than the deviation of the gimbal systems from Magnetic North in Example I (2° West for example). Computer 55 would then momentarily adjust frame 1 clockwise in the wrong direction to correct the error in direction of frame 1, however further divergent adjustment of frame 1 from a correct direction would be prevented due both to the resulting increase in indicated longitude which would occur from clockwise adjustment of frame 1 (as illustrated in Example I) and due to the resulting increase in indicated longitude which would occur from normal reorientation of gimbal ring 2b to a true vertical in an East-West plane by computer 55. Thus all components of error in the gimbal systems due to either deviation from True North or deviation from a true vertical would be properly corrected by computer 55. It may be noted that inclination of the Earth's magnetic field in an East-West direction does not appreciably vary with longitude at the craft's stated position, therefore errors in indicated longitude resulting from deviation of gimbal ring 2b from a true vertical in an East-West plane would not produce magnified corrective signals from computer 55 as occurred in Examples I, II, and III. It is also to be noted that due to the very precise orientation of frame 1 with respect to True North and gyro stabilization of frame 1 as described in Example I, and due to the negligible errors which would occur from rolling of the craft as described in Example III, the combination of errors described in Example IV would not likely be of the magnitude described.

In the above Examples I and II, it may be similarly demonstrated that if the craft were in a geographical location directly between the North Geographic Pole and the North Magnetic Pole, selection of a star South of the craft's zenith for navigation would tend toward spurious divergent orientation of the gimbal systems from True North by computer 55, actual divergent orientation depending upon the magnitudes of deviation of Magnetic North from True North as determined by computer 55. (For instance in Example I, if computer 55 determined the correct deviation of Magnetic North from True North under the stated conditions to be less than 5° West, computer 55 would be tending toward divergent orientation of the gimbal systems from True North, but actual divergent orientation of the gimbal systems would not be reached until computer 55 determined the correct deviation of Magnetic North from True North to be less than 3° West under the stated conditions in Example I.) However, selection of a star North of the craft's zenith for navigation between the North Geographic Pole and the North Magnetic Pole would provide proper convergent orientation of the gimbal systems with respect to True North, similarly as illustrated in Examples I and II. This condition would prevail for some distance East or West of the stated geographical position until a line of demarcation was reached beyond which normal convergent orientation of the gimbal systems with respect to True North would be maintained by selection of a star South of the craft's zenith for navigation at all geographical locations North of the Magnetic Equator except as noted, similarly as illustrated in Examples I and II. Thus there would be an oval line of demarcation in the vicinity of the Geographic and Magnetic North Poles inside of which proper convergent orientation of the gimbal systems with respect to True North would be achieved by selection of a star for navigation North of the craft's zenith. This would be no particular disadvantage, since destination selection means are provided in the present invention which automatically transfer navigation to different stars at selected destinations. It may be noted at the line of demarcation as described, variations in values of deviation of Magnetic North from True North would be so slight on either side of the line that selection of a star for navigation either South or North of the craft's zenith would provide proper convergent orientation of the gimbal systems with respect to True North near the line of demarcation, such that proper operation of the navigation system would be easily achieved by the stated transfer of navigation to appropriate stars when the craft approached the line of demarcation. At geographical positions South of the magnetic equator, proper convergent orientation of the gimbal systems with respect to True North would be achieved by selection of a star NOrth of the craft's zenith for navigation, except for a similar oval line of demarcation in the vicinity of the geographical and magnetic South Poles within which a star would be selected for navigation South of the craft's zenith. However, deviations of Magnetic North from True North either side of the magnetic equator would probably be so slight that stars could be selected for navigation either South or North of the craft's zenith when the craft was at considerable distances either South or North of the magnetic equator such that the Sun could be selected for proper navigation in the equatorial regions of the Earth. The stated lines of demarcation could be easily determined from known deviations of Magnetic North from True North as a function of longitude and latitude, similarly as illustrated in Examples I and II.

Proper convergent orientation of the gimbal systems with respect to a true vertical by computer 55 is not affected by geographical location or selection of stars, since movement of a craft South is always accompanied by rotation of the Earth's magnetic field with respect to a true vertical in a North-South plane, the stated rotation always occurring in a counter-clockwise direction with such Southern movement regardless of geographical location to provide resulting convergent orientation of gimbal ring 2b to a proper position with respect to a true vertical in a North-South plane, as illustrated in Example III. Inclination of the Earth's magnetic field in an East-West direction does not appreciably vary with changes in longitude and latitude except near the magnetic poles East or West of the magnetic poles where rotation of the Earth's magnetic field with respect to a true vertical in an East-West plane with changes in longitude would result in convergent orientation of gimbal ring 2b to a proper position with respect to a true vertical in an East-West plane, similarly as gimbal ring 2b is properly oriented with respect to a true vertical in a North-South plane as illustrated in Example III.

In the above Examples I and II, if the craft were located near the magnetic poles East or West of the magnetic poles, the resulting increase in indicated longitude due to rotation of the gimbal systems clockwise from proper orientation with respect to True North would cause computer 55 to rotate gimbal ring 2b clockwise from a true vertical in an East-West plane until the position of gimbal ring 2b were appropriate to an error in longitude somewhat less than the original error in longitude, since the Earth's magnetic field would rotate counterclockwise from a true vertical in an East-West plane with increase in longitude. The resulting deviation of gimbal ring 2b from a true vertical and resulting slight reduction in error in longitude under the stated conditions would not affect proper orientation of the gimbal systems with respect to True North as described in Examples I and II.

In the above Examples I and II, if a star were selected for navigation East of the craft's zenith, rotation of the gimbal systems clockwise from proper orientation with respect to True North under the stated conditions would cause the fifth axis in gimbal ring 6 (about which the fourth gimbal ring 8 rotates in the star follower) to rotate clockwise from a position parallel to the Earth's axis of rotation (in a North-South plane), creating an initial decrease in indicated latitude, since the third gimbal ring 6 would be rotated with respect to the second gimbal ring 2b in a direction as if the craft moved South to maintain the star follower 5 aligned with its selected star. Computer 55 would then determine that the deviation of the Earth's magnetic field in a North-South direction from a true vertical were greater at the decreased indicated latitude than that which actually occurred at the craft's position and would accordingly adjust gimbal ring 2b clockwise from a true vertical in a North-South plane until the deviation of the Earth's magnetic field from a true vertical at the craft's actual position (as determined by the position of gimbal ring 2b with respect to the magnetic inclination seeking element 41) equalled the deviation of the Earth's magnetic field from a true vertical as determined by computer 55 at the craft's position as indicated by the navigation device. Thus gimbal ring 2b would be rotated clockwise from a true vertical in a North-South plane until the position of gimbal ring 2b were appropriate to an error in indicated latitude somewhat less than the original error in latitude. Rotation of the gimbal systems counter-clockwise from True North under the stated conditions would similarly result in a slight increase in indicated latitude and would cause gimbal ring 2b to rotate counter-clockwise from a true vertical in a North-South plane. Selection of a star for navigation West of the craft's zenith under the stated conditions would reverse the errors in indicated latitude and reverse the direction of deviation of gimbal ring 2b from a true vertical in a North-South plane upon rotation of the gimbal systems from True North.

At geographical locations on the Earth where the direction of the Earth's magnetic field is nearer East or West than North or South and a star is selected for navigation East or West of the craft's zenith, the error in determined latitude resulting from deviation of the gimbal systems from True North is not only greater than the error in determined longitude, but the resulting error in deviation of Magnetic North from True North as determined by computer 55 at the error in indicated position would also be more affected by errors in latitude than errors in longitude, therefore the resulting error in indicated latitude under the stated conditions would predominate to properly orient the gimbal systems with respect to True North, similarly as the resulting error in indicated longitude predominated to properly orient the gimbal systems with respect to True North in Examples I and II where the Earth's magnetic field is in a North-South direction and a star is selected for navigation South of the craft'zenith. At geographical locations West of the North Magnetic Pole and North of the magnetic equator or West of the South Magnetic Pole and South of the magnetic equator, stars would be selected for navigation West of the craft's zenith to assure convergent orientation of the gimbal systems with respect to True North, since then deviation of the gimbal systems clockwise from True North would create an error in latitude to the North and computer 55 would determined that the deviation of True North from Magnetic North at the indicated postion was greater in a counter-clockwise direction than that which actually occurred at the craft's true position, resulting in counter-clockwise adjustment of the gimbal systems to proper orientation with respect to True North, similarly as illustrated in Examples I and II. Similarly at geographical locations Eact of the North Magnetic Pole and North of the magnetic equator or East of the South Magnetic Pole and South of the magnetic equator, stars would be selected for navigation East of the craft's zenith to assure convergent orientation of the gimbal systems with respect to True North, since then deviation of the gimbal systems clockwise from True North would create an error in latitude to the South and computer 55 would determine that the deviation of True North from Magnetic North at the indicated position was greater in a counter-clockwise direction than that which actually occurred at the craft's true position, resulting in counter-clockwise adjustment of the gimbal systems to proper orientation with respect to True North, similarly as illustrated in Examples I and II.

It may be noted that since selection of stars South or North of the craft's zenith would create greater errors in indicated longitude than indicated latitude with deviation of the gimbal systems from proper orientation with respect to True North, that selection of stars South or North of the craft's zenith in accordance with the craft's geographical location (as previously described) would minimize or eliminate tendencies toward divergent orientation of the gimbal systems from True North by computer 55 (depending upon the direction of the Earth's magnetic field with respect to True North at the craft's geographical location) regardless of whether the star selected for navigation were East or West of the craft's zenith in accordance with the craft's geographical location as previously described. Similarly proper selection of stars East or West of the craft's zenith in accordance with the craft's geographical location would minimize or eliminate tendencies toward divergent orientation of the gimbal systems from True North by computer 55 (depending upon the direction of the Earth's magnetic field with respect to True North at the craft's geographical location) regardless of whether the star selected for navigation were North or South of the craft's zenith in accordance with the craft's geographical location. However, regardless of the craft's geographical location, stars could always be selected in a proper direction which would positively result in convergent orientation of the gimbal systems with respect to True North by computer 55.

Computer 55 also orients the position of gimbal ring 27, which supports True North seeking gyroscope 29 in a pendulum position below gimbal ring 27, until the spin axis of gyroscope 29 is aligned perpendicular to a true vertical, similarly as computer 55 orients the first gimbal ring 2a in the star follower, the plane of gimbal ring 27 then being parallel to the plane of gimbal ring 2a, pendulum axis 479 then being aligned parallel to the third axis about which the second gimbal ring 2b rotates, and the spin axis of gyroscope 29 being parallel to the pendulum axis 479. Computer 55 properly positions a microsyn signal transmitter in positioning device 19 with respect to a true vertical, the microsyn signal transmitter being responsive to the position of gimbal ring 27 to create signals torquing the vertical supporting axis 18 of the star follower until gyroscope 29 precesses to a position where the pendulum axis 479 and spin axis of gyroscope 29 are perpendicular to a true vertical as determined by computer 55. Thus rotation of the gimbal system from proper orientation with respect to True North causes deviation of gimbal ring 2b from a true vertical in a North-South plane as previously described and similarly causes deviation of gimbal ring 27 and pendulum axis 479 from a position perpendicular to a true vertical, rotation of the gimbal systems clockwise from True North causing clockwise rotation of gimbal ring 2b and gimbal ring 27 from a true vertical when a star is selected for navigation East of the craft's zenith, and rotation of the gimbal systems counter-clockwise from True North under the stated conditions causing counter-clockwise rotation of gimbal ring 2b and gimbal ring 27 from a true vertical. Selection of a star for navigation West of the craft's zenith would reverse the stated direction of deviation of gimbal rings 2b and 27 from a true vertical upon rotation of the gimbal systems from True North. The resulting torque of the Earth's gravity upon pendulum suspended gyroscope 29 when the gimbal systems deviate from proper orientation with respect to True North would cause precession of gyroscope 29 to adjust frame 1 until the gimbal systems were again properly oriented with respect to True North. The direction of spin of gyroscope 29 could be made to accomodate selection of a star for navigation either East or West of the craft's zenith, however, computer 55 would also override the torque of the Earth's gravity upon gyroscope 29 by torquing gimbal ring 27 through torquer 30 such that the gimbal systems would always be properly oriented with respect to True North by computer 55 regardless of whether stars were selected for navigation East or West of the craft's zenith in accordance with the direction of spin of gyroscope 29.

Obviously any conventional True North seeking gyroscope could simply be attached to gimbal ring 27 with its spin axis in the position of axis 470, signals from its pendulum operating a torquer to properly torque gimbal ring 27 upon deviation of the gimbal systems from True North, similarly as computer 55 operates torquer 30, computer 55 normally overriding the True North seeking gyroscope except in the event of malfunctioning of computer 55.

It may be noted that since deviation of Magnetic North from True North decreases with increased distance from the magnetic poles of the Earth, the variations in deviation of Magnetic North from True North in the equatorial regions of the Earth and in the Northern Hemisphere opposite from the North Magnetic Pole and in the Southern Hemisphere opposite from the South Magnetic Pole would be of small magnitude with changes in longitude and latitude, therefore in the stated regions of the Earth computer 55 would most likely properly orient the gimbal systems with respect to True North and a true vertical regardless of whether stars were selected for navigation East, West, North, or South of the craft's zenith in accordance with the geographical location of the craft as previously described. However, destination selection means are provided in the present invention to automatically transfer navigation to different stars at pre-set geographical locations such that stars could always be automatically selected for navigation in a porper direction in accordance with the craft's geographical location to properly orient the gimbal systems with respect to True North and a true vertical.

Thus it is seen that it is the angular position of star follower 5 with respect to the angular position of magnetic inclination seaking element 41 which actually determines the craft's longitude and latitude and the direction of True North and a true vertical, the gimbal systems and computer 55 serving as computing means to determine the correct values as previaously described. It is believed that the reaction time of modern star trackers and computers with memory elements would be sufficiently rapid to prevent errors in proper orientation of the gimbal systems with respect to True North and a true vertical, and that any momentary error which occurred in indicated position of the craft due to momentary errors in orientation of the gimbal systems would be promptly corrected before the guidance system reacted to adjust the craft to a spurious position, as will become apparent as the description proceeds. Also gyro stabilization of the magnetic inclination seeking element in a properly oriented position with respect to True North and a true vertical as previously described would provide an instantaneous course and attitude reference from which any craft or vehicle utilizing the navigation device could be stabilized to prevent errors in orientation of the gimbal systems due to inadvertent rolling, pitching, or yawing of the guided craft.

Since the magnetic inclination seeking element serves as a gyro-stabilized True North and true vertical reference from which to provide instantaneous course and attitude corrections preventing inadvertent rolling, pitching, or yawing of the guided craft, the craft itself would serve somewhat as a gyro stabilized platform to prevent errors in orientation of the gimbal systems of the star follower, and true North seeking gyroscope 29 further gyro stabilizes the gimbal systems of the star follower with respect to True North. It is obvious that the second gimbal ring 2b in the star follower could further be gyro stabilized with respect to a true vertical if desired by a gyroscope attached to gimbal ring 2b in a suspended position below gimbal ring 2b similarly as gyroscope 42 stabilizes the second gimbal ring 34b of the magnetic inclination seeking element and as was originally illustrated in the star follower of FIG. 1 in patent application Ser. No. 545,415, filed on Nov. 7, 1955, now abandoned, of which the present invention is a continuation, signals from computer 55 of course providing precession of such a gyroscope through proper torquing of gimbal rings 2a and 2b of the star follower in FIG. 6 to maintain gimbal ring 2b properly oriented with respect to a true vertical as previously described.

Figure 1:
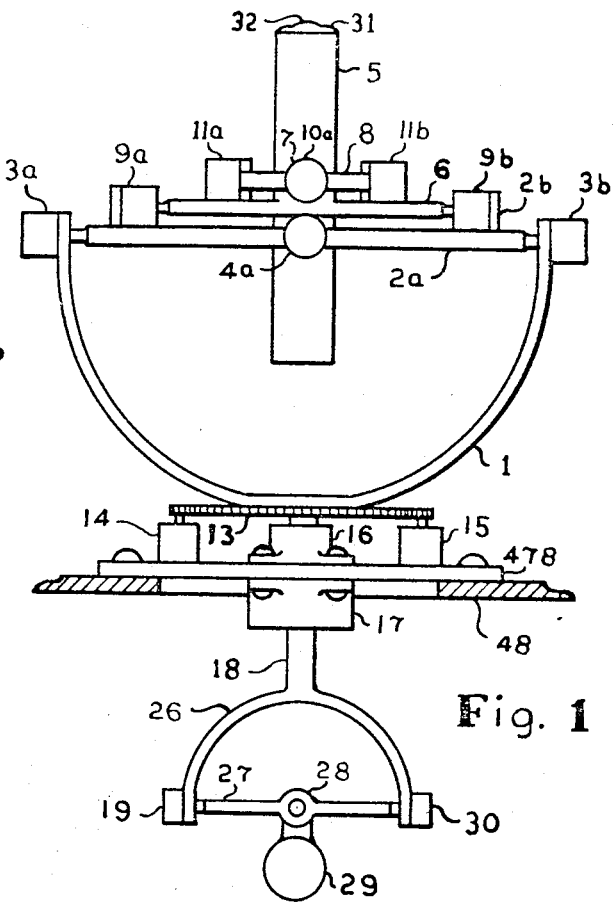
FIG. 1 is a front view of the star tracking device.
Figure 2:
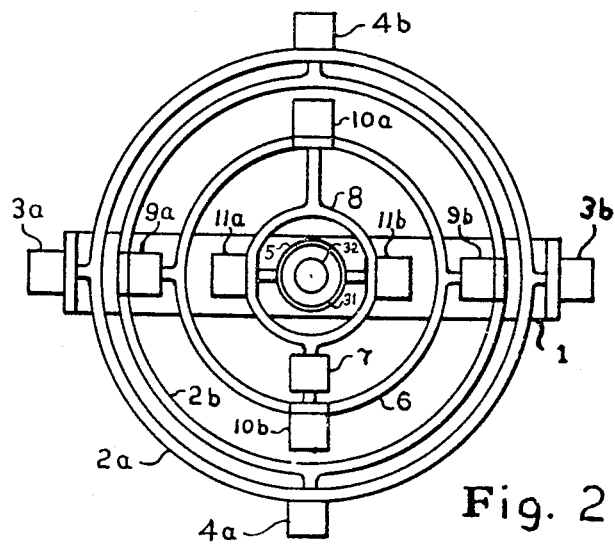
FIG. 2 is a top view of the apparatus of FIG. 1.

In FIGS. 1 and 2 semi-circular supporting frame 1 is mounted in an upright position in the craft by vertical shaft 18 in bearing 17 such that frame 1 may rotate in azimuth with respect to the craft. Bearing 17 is attached to circular mounting plate 478 permitting the navigation device to be lowered into an opening of the craft's structure 48 and fastened in place such that telescope 5 may track a celestial object. Gimbal rings 2a and 2b are bearing mounted in rotating frame 1 such that gimbal ring 2b may achieve a horizontal position with respect to the Earth's surface. Devices 3a, 3b, 4a, and 4b are conventional torquers and microsyn signal generators permitting precision positioning of gimbal rings 2a and 2b from a remote sourse. Integral planetary gearing may be employed in the torquers and signal generators to increase the positioning accuracy, the torquers and signal generators then rotating a greater number of revolutions than the positioned gimbal rings. Gimbal ring 6 is bearing mounted in gimbal ring 2b, torquer 9a and signal generator 9b permitting precision positioning of gimbal ring 6 with respect to gimbal ring 2b. Gimbal ring 8 is similarly mounted to rotate with respect to ring 6, the axis of rotation of ring 8 being perpendicular to the axis of rotation of ring 6. Torquer 10a and signal generator 10b permit precision positioning of ring 8 with respect to ring 6. In FIG. 2 torquer 10a rotates gimbal ring 8 and the housing of combined torquer and signal generator 7 with respect to gimbal ring 6, torquer 7 then further rotating signal generator 10b with respect to the housing of torquer and signal generator 7, however in FIG. 6 combined torquer and signal generator 7 is eliminated. Telescope 5 is bearing mounted in gimbal ring 8, torquer 11a and signal generator 11b permitting precision positioning of telescope 5 with respect to gimbal ring 8, the axis of rotation of telescope 5 being perpendicular to the axis of rotation of gimbal ring 8. Semicircular yoke 26 is attached to shaft 18 and True-North seeking gyroscope 29 is attached to yoke 26 through gimbal ring 27 as illustrated. Device 19 on yoke 26 orients the spin axis of pendulum suspended gyroscope 29 tangent to the craft's meridian in a manner to be described later such that gyroscope 29 acts as a True-North seeking gyroscope.

A True-North seeking gyroscope manufactured by Arma Corporation provides a gyroscope mounted on a two-axis stabilized platform with means to maintain the platform and spin axis of the gyroscope tangent to the craft's meridian in accordance with the latitude of the craft. A pendulum suspended below the platform deviates from a perpendicular position with respect to the platform and gyro spin axis due to the Earth's rotation whenever the gyro spin axis is not aligned with True North, and the deviation of the pendulum from such a perpendicular position creates signals torquing the gyroscope until the gyro spin axis is again aligned with True North. The pendulum suspension of gyroscope 29 in FIG. 6 similarly provides a torque on gyroscope 29 whenever the spin axis of gyroscope 29 is not aligned with True North, causing gyroscope 29 to precess until the gyro spin axis is aligned with True North, as previously described. Obviously, gyroscope 29 could be replaced with any conventional True North seeking gyroscope being manufactured is desired.

Thus True North seeking gyroscope 29 may orient frame 1 with respect to True North such that the axis of rotation of gimbal ring 8 is parallel to the Earth's axis of rotation when the angle of telescope 5 with respect to gimbal ring 8 is adjusted to the declination of a star and the longitudinal or optical axis of telescope 5 is aligned with the selected star as previously described. The angle of gimbal ring 6 with respect to gimbal ring 2b then indicates the craft's latitude and the angle of gimbal ring 8 with respect to gimbal ring 6 indicates the craft's longitude when properly differentiated with time as previously described. POsitioning device 7 in FIG. 2 provides for correction in longitude due to refraction of light by the Earth's atmosphere directly in the star tracking device, the corrections in longitude being transmitted to positioning device 7 by a refraction computer to to described later.

The axis of rotation of gimbal ring 6 might be raised slightly above the axis of rotation of gimbal ring 2b and the axis of rotation of gimbal ring 8 raised slightly above the axis of rotation of gimbal ring 6 as illustrated in FIGS. 1 and 2 to provide an unobstructed line of sight for tracking telescope 5 through 180° of rotation in any direction. Counter weights might then also be attached to the affected axes to eliminate any unbalanced torques. However, the arrangement illustrated in FIG. 1 would introduce some error due to refraction of light rays caused by the difference in density of external and internal air of the astrodome since there would be translation of the adjusting axes of telescope 5 from the center of curvature of the astrodome. In FIG. 6 all adjusting axes of the tracking device intersect at a point on vertical supporting shaft 18 thus eliminating any translation of the adjusting axes of telescope 5 from the center of curvature of the astrodome.

Figure 3:
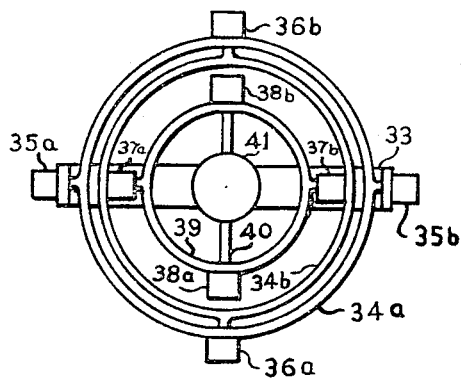
FIG. 3 is a top view of the magnetic inclination seeking element which determines the inclination of the Earth's magnetic field in a North-South and East-West direction within the craft.
Figure 4:
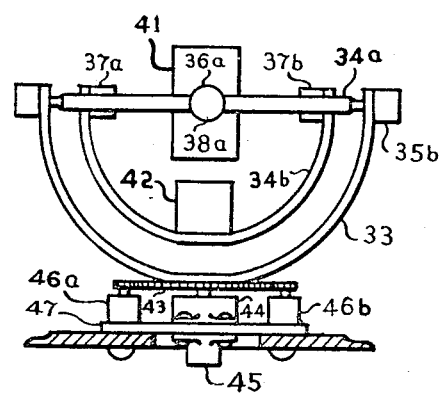
FIG. 4 is a front view of the apparatus of FIG. 3.

The magnetic inclination seeking element and vertical reference mechanism is mounted in a manner somewhat similar to the navigation device as illustrated in FIGS. 3 and 4 in addition to FIG. 6. Semi-circular supporting frame 33 is mounted in an upright position in the craft by a vertical shaft in bearing 44 such that frame 33 may rotate in azimuth with respect to the craft. Bearing 44 is attached to circular mounting plate 47 permitting the vertical reference device to be lowered into an opening in the craft's structure and fastened in place. It would be desirable that the structure of the craft supporting rotating frames 1 and 33 be as rigid as possible to maintain the supporting shaft of frame 33 perfectly parallel to the supporting shaft of frame 1. Bearings 17 and 44 might also be attached to a common mounting plate maintaining the supporting shaft of frame 33 parallel to the supporting shaft of frame 1 and permitting precision alignment of the vertical reference device with the navigation device before installation into the craft. Gimbal rings 34a and 34b are bearing mounted in rotating frame 33 such that gimbal ring 34 b may achieve a horizontal position with respect to the Earth's surface. Vertical seeking device 42 is attached to a semi-circular yoke attached to gimbal ring 34b and operates conventional torquing devices 35a and 36a in a conventional manner to align gimbal ring 34b horizontal to the Earth's surface. Vertical seeking device 42 may consist of two levels of the type disclosed in FIG. 1 of U.S. Pat. No. 2,367,465 granted to H. Kunzer on Jan. 16, 1945, one level having its length perpendicular to the axis of rotation of gimbal ring 34a and the other level having its length perpendicular to the axis of rotation of gimbal ring 34b. Vertical seeking device 42 may also consist of a conventional vertical seeking gyroscope or any other conventional vertical seeking means. Devices 35b and 36b are conventional microsyn transmitters or precision position transducers capable of accurately transmitting the position of gimbal ring 34a and 34b to other devices. Gimbal ring 39 is bearing mounted in gimbal ring 34b, and magnetic inclination seeking device 41 is bearing mounted in gimbal ring 39 by shaft 40, shaft 40 being perpendicular to the axis of rotation of gimbal ring 39. Torquers 37a and 38a permit precision positioning of magnetic inclination seeking device 41 with respect to gimbal ring 39 and precision positioning of gimbal ring 39 with respect to gimbal ring 34b, precision position transducers 37b and 38b transmitting the position of gimbal ring 39 and magnetic inclination seeking device 41 to other devices.

The principle of the navigation system is further illustrated in FIG. 6 where $\lambda_c$ represents the longitude of the craft, $\phi_c$ represents the latitude of the craft, $\alpha$ represents sidereal hour angle or the angle of gimbal ring 8 with respect to gimbal ring 6, $\beta$ represents the declination of a selected star, $\alpha_D$ represents the differnce between the sidereal hour angle of the Sun and a selected star, $\Delta\lambda_c$ represents the correction in longitude to compensate for refraction of light in the Earth's atmosphere, $\Delta\beta$ represents the correction in declination to compensate for refraction of light in the Earth's atmosphere, $\Omega$ represents the time in accordance with the longitude at the point of departure, D. R. C. represents dead-reckoning computer, A represents the azimuth supplied to the dead-reckoning computer, V represents the velocity supplied to the dead-reckoning computer, $A_c$ represents the azimuth of the craft's longitudinal axis, and T. A. S. represents the true air speed of the craft.

Device 54 may be a gyrosyn compass or any other conventional Magnetic North seeking device capable of accurately determining and transmitting the direction of Magnetic North to computer 55. The longitude and latitude of the craft as determined by the navigation device is also supplied to computer 55. Computer 55 determines the deviation of Magnetic North from True North at the craft's position and operates torquer 30 coupled to gimbal ring 27 causing True-North seeking gyroscope 29 to precess until frame 1 of the navigation device is properly oriented with respect to True North, gear 13 attached to shaft 18 operating precision position transducer 14 attached to mounting plate 478 to provide computer 55 with the position of frame 1 relative to the craft. Gyroscope 29 is pendulum suspended below gimbal ring 27 on axis 479 by bearings 28, axis 479 being at right angles to the axis of rotation of gimbal ring 27, and the spin axis of gyroscope 29 being parallel to axis 479. Since axis 479 and the axis of rotation of gimbal ring 2b are both horizontal to the Earth's surface, yoke 26 is parallel to frame 1, axis 479 is parallel to the axis of rotation of gimbal ring 2b, and axis 479 and the axis of rotation of gimbal ring 2b are both aligned with True North.

Computer 55 may be similar to the Librascope AN-/ASN-24 airborne digital computer which employs a magnetic drum as computer memory to store such data as magnetic variation as a function of heading, declination, and sidereal hour angle of stars to determine heading, declination, and sidereal hour angle of stars to determine the true heading of the craft. The described computer or a computer with any other type of conventional memory unit might also be used to store the deviation of Magnetic North from True North as a function of geographical location in longitude and latitude and thus properly orient frame 1 with respect to True North as previously described. Computer 55 also operates torquer 46a attached to mounting plate 47 to orient the magnetic inclination seeking element with respect to True North through gear 43 attached to the supporting shaft of frame 33 such that frame 33 is parallel to frame 1, precision position transducer 46b attached to mounting plate 47 being operated by gear 43 to provide computer 55 with the position of frame 33. It would be preferable that Magnetic North seeking compass device 54 be attached to a mounting plate common to both the navigation device and the vertical reference device to eliminate errors due to deflection of the craft's structure.

Magnetic inclination seeking device 41 contains a conventional gyroscope supported by shaft 40 in gimbal ring 39, the gyro spin axis being perpendicular to shaft 40. Magnetic inclinometer 47 is attached atop device 41 with its axis of rotation perpendicular to shaft 40 and magnetic inclinometer 48 is attached atop device 41 with its axis of rotation parallel to shaft 40 as illustrated such that inclinometer 47 determines the inclination of the Earth's magnetic field in a North-South direction and inclinometer 48 determines the inclination of the Earth's magnetic field in an East-West direction. The plane of the supporting frames of inclinometer 47 and 48 is perpendicular to the spin axis of gyroscope 41. Light source 49 consists of a conventional parabolic reflector or lens system attached atop device 41 to project parallel rays of light to precision optical transducer 50 such that inclinometer 47 intercepts the light rays to the center of transducer 50 when the inclinometer needle is parallel to the spin axis of gyroscope 41, the light rays being parallel to the axis of rotation of the inclinometer needle. Light source 51 projects parallel rays of light to precision optical transducer 52 in a similar manner such that inclinometer 48 intercepts the light rays to the center of transducer 52 when the inclinometer needle is parallel to the spin axis of gyroscope 41. Optical transducers 50 and 52 might consist of a simple semi-conductor cell developed by Electro-Optical System, Inc., 170 North Daisy Ave., Pasadena, California, called a radiation tracking transducer which is a photo-voltaic unit that can resolve the angular position of a source of visible or infrared radiation to better than 0.1 second of arc when used with a simple lens system producing an image of the radiation source on the photo-voltaic unit. The output of the optical transducer is a direct current voltage whose polarity indicates whether the radiation source is to the right or left of the cell's centerline and whose magnitude is proportional to radiation source displacement from centerline. The manufacturer states that a radio-active source emitting particles in the range of 100 to 500 kev might be attached to the lower tip of the inclinometer needle to serve as a radiation source replacing light sources 49 and 51. Otherwise the optical transducers would have to be responsive to the position of the shadow of the inclinometer needles falling upon their sensitive surfaces.

Optical pickoff means for the specific purpose of positioning an element in accordance with the position of a compass needle oriented by the Earth's magnetic field as illustrated in FIG. 6 of the present invention is similarly illustrated in FIG. 15 and described on page 4, lines 9 to 29 inclusive of U.S. Pat. application Ser. No. 382,400 on an Electronic Pilot Control, filed Sept. 25, 1953, now abandoned, of which Patent Application Ser. No. 545,415, now abandoned is a continuation, the present invention being a continuation of U.S. Pat. application Ser. No. 454,415. In FIG. 15 of U.S. Pat. application Ser. No. 382,400 as described, a series of small photo-electric cells are located on a compass housing to coincide with the curved path of the compass needle tip, a light source also located on the compass housing to illuminate the photo-cells, the tip of the compass needle passing between the light source and the photo-cells to cast a shadow on the photo-cells. The photo-cells energize relays such that when the shadow of the compass needle tip falls on any one of the photo-cells, the relays provide signals properly orienting the compass housing to a desired position with respect to the compass needle. Since that is the express purpose of optical transducers 50 and 52 in FIG. 6, it is obvious that either two or a series of tiny photo-cells could be located in each of optical transducers 50 and 52 to match the path of the magnetic needle tips of inclinometers 47 and 48. Thus a series of relays with normally closed contacts would be respectively energized by the described series of photo-cells in optical transducers 50 and 52, the relays providing signals properly torquing gyroscope 41 whenever the shadow of the magnetic needle tips fell on any one of the photo-cells, causing gyroscope 41 to progressively precess to a proper position with respect to the inclinometer needles as previously described, the tiny photo-cells on one side of the center line of optical transducers 50 and 52 operating relays to produce a positive output voltage, and the tiny photo-cells on the other side of the center line of optical transducers 50 and 52 operating relays to produce a negative output voltage when the shadow of the inclinometer needle tips falls on any one of the photo-cells. The accuracy of the inclinometers would then be dependent upon the dimension of the photo-cells either side of the center line of optical transducers 50 and 52, the smaller the dimension, the greater the positioning accuracy, it being understood that the photo-cells on each side of the center line would be placed sufficiently close together to provide progressive precession of gyroscope 41 to a position where the shadow of the inclinometer needle tips would be at the center line of the optical transducers. Photo-cells of the voltaic type would probably be most practical for the described application, conventional amplification means being provided if necessary to operate the described relays. Any optical pick-off means capable of accurately determining the position of the inclinometer needles could be used, gyroscopes 41, 42, and any other devices creating a magnetic disturbance being magnetically shielded to eliminate magnetic errors.

In FIG. 6, the signal output of optical transducer 50 is then amplified by conventional means to operate torquer 38a causing magnetic inclination seeking gyroscope 41 to precess until its spin axis lies in an East-West plane inclined parallel or tangent to the Earth's magnetic lines of force. The signal output of optical transducer 52 is similarly amplified to operate torquer 37a causing gyroscope 41 to precess until its spin axis lies in a North-South plane inclined parallel or tangent to the Earth's magnetic lines of force. The memory element of computer 55 may then be utilized to store the known angle of magnetic inclination seeking device 41 with respect to gimbal ring 39 and the known angle of gimbal ring 39 with respect to gimbal ring 34b when the plane of gimbal ring 34b is perpendicular to a true vertical through the center of the Earth and the axis of rotation of gimbal ring 34b is aligned with True North, the described known values being a function of the longitude and latitude of the craft and also a function of the altitude of the craft if the variations in altitude of the craft create an appreciable difference in such values. Since the memory element in computer 55 utilized for storing the deviation of Magnetic North from True North as a function of longitude and latitude would be separate and distinct from the memory elements in computer 55 utilized for storing the deviation of the Earth's magnetic field from a true vertical (in a North-South and East-West direction) as a function of longitude and latitude, the memory element storing the deviation of Magnetic North from True North as a function of geographical location will be designated first computing means, and the memory elements in computer 55 utilized for storing the deviation of the Earth's magnetic field from a true vertical as a function of geographical location will be designated second computing means for purposes of reference.

The difference between the described known inclination of the Earth's magnetic field with respect to a true vertical and the values supplied to computer 55 by precision position transducers 37b and 38b can then be added to or subtracted from the respective values supplied by precision position transducers 35b and 36b in a conventional manner by computer 55 such that computer 55 may properly orient the plane of gimbal ring 2b of the navigation device perpendicular to a true vertical through torquers 3a, 4a, and pick-offs 3b and 4b, gimbal ring 2a being properly oriented with respect to gimbal ring 34a and gimbal ring 2b being properly oriented with respect to gimbal ring 34b. Computer 55 might also utilize the described known inclination of the Earth's magnetic field to operate the appropriate torquers to orient the plane of gimbal ring 34b in the magnetic inclination seeking element perpendicular to a true vertical rather than gimbal ring 34b being oriented by vertical seeking device 42, vertical seeking device 42 then being used as an auxiliary source of vertical reference in the event of a malfunction of computer 55, computer 55 then normally overriding vertical seeking device 42.

Magnetic North seeking compass device 54 in FIG. 6 might also utilize the described principle of optical pick-off means attached to a gimbal mounted compass housing to determine the position of a horizontal compass needle, the principle of optical pick-off means for such a compass being originally described and illustrated in FIG. 15 of U.S. Pat. application Ser. No. 382,400, now abondoned, filed Sept. 25, 1953, as previously described. The signal output of such precision optical transducers could thus be amplified to operate a torquer rotating a vertical shaft supporting the gimbal mounted compass, similarly as torquer 46a rotates frame 33, to properly orient the compass housing with respect to Magnetic North.

One preferred mounting of the described compass 54 with the described optical pick-off means is indicated in FIG. 4, compass 54 being attached to device 42 with the compass housing mounted to rotate on axis Z, axis Z being perpendicular to the plane of gimbal ring 34b, and torquer 46c being provided to rotate the compass housing 54 with respect to device 42 on axis Z. Electromagnetic fields within the vicinity of compass 54 would of course be magnetically shielded to prevent errors in compass 54. The optical transducer of the magnetic compass 54 then operates torquer 46c to properly orient the compass housing with respect to Magnetic North, and computer 55 operates torquer 46a to properly orient frame 33 with respect to True North as previously described, the necessary precision position transducer of course being provided in combination with torquer 46c on axis Z to provide computer 55 with the rotated position of compass housing 54 with respect to element 42 to indicate deviation of frame 33 from Magnetic North. It would then be preferred that computer 55 maintain the plane of gimbal ring 34b perpendicular to a true vertical as previously described, thus obviously eliminating the need of a gimbal mounting of compass housing 54 on axis Z such that the horizontal plane of compass housing 54 would be always perpendicular to axis Z, gimbal ring 34b thus actually serving as the gimbal mounting for compass 54. Torquers 35a and 36a would have greater operating torque than torquers 37a and 38a to properly maintain the plane of gimbal ring 34b perpendicular to a true vertical, thus preventing torquers 37a and 38a from causing deviation of gimbal ring 34b from a true vertical in aligning gyroscope 41 with the magnetic lines of force of the Earth, the gyroscope in vertical seeking device 42 providing gyro stabilization of gimbal ring 34b as previously described.

Since the gyroscope in magnetic inclination seeking element 41 provides azimuth stabilization of the magnetic inclination seeking device, and True North seeking gyroscope 29 provides further azimuth stabilization of the star follower, it is believed that further gyro stabilization of compass 54 on axis Z with respect to element 42 would be unnecessary, although it could be provided if desired.

In the mounting of True North seeking gyroscope 29, or any conventional True North seeking gyroscope as previously described, yoke 26 is attached to vertical supporting axis 18 in a position parallel to frame 1, the axis of rotation of gimbal ring 27 is perpendicular to axis 479, gimbal ring 27 is parallel to gimbal ring 2a, axis 479 is parallel to the axis of rotation of gimbal ring 2b, the spin axis of the True North seeking gyroscope is parallel to axis 479, and thus the spin axis of the True North seeking gyroscope is perpendicular to a true vertical when the gimbal systems of the star follower are properly oriented with respect to True North as previously described. Device 19 attached to yoke 26 provides for orientation of the spin axis of gyroscope 29 perpendicular to a true vertical. Computer 55 operates torquer 20 to properly orient precision position transducer 25 with respect to a true vertical, planetary reduction gear 21 providing precision orientation of shaft 22 supported by bearings 23 to adjust transducer 25, precision position transducer 24 providing computer 55 with the position of shaft 22 and transducer 25. Computer 55 then operates torquer 15 attached to mounting plate 478 to torque shaft 18 through gear 13, causing gyroscope 29 to precess until its spin axis is perpendicular to a true vertical whereupon the signal output of transducer 25 to computer 55 is zero. Thus gimbal ring 27 is maintained parallel to gimbal ring 2a to provide the proper deviation of gimbal ring 27 from a true vertical upon deviation of the gimbal systems and axis 479 from True North necessary for functioning of the True North seeking gyroscope as previously described. Torquer 30 has greater operating torque than torquer 15 to provide for precise orientation of frame 1 with respect to True North through computer 55 even though torquer 15 happened to be in operation at the time of adjustment.

In FIG. 6 star tracking mechanism 56 may be any conventional device capable of orienting tracking device 5 with a selected star, motors 102 and 136 being operated by the signal output of radiation sensitive means in tracking device 5 to align the longitudinal axis of tracking device 5 with its selected stars, the signal output from radiation sensitive means in tracking device 5 enabling the tracking mechanism 56 to provide signal voltage through normally closed contacts of relay #29a to properly rotate motors 102 and 136 as indicated in FIG. 6, motors 102 and 136 further operating syncros 103 and 137 to properly align tracking device 5 in accordance with the rotated position of motors 102 and 136. Relay #29a disconnects motors 102 and 136 from tracking mechanism 56 during automatic transfer of navigation to different stars as will be described later. Tracking device 5 might also be a conventional radio sextant tracking an artificial satellite emitting radio signals. Motor 102 operates microsyn signal transmitter 103 to rotate gimbal ring 8 with respect to gimbal ring 6 through microsyn signal generator 10b, a phase sensitive amplifier, and torquer 10a in a conventional manner, the phase sensitive amplifier comparing the phase of the signal outputs of microsyn signal transmitter 103 and microsyn signal generator 10b to provide signals operating torquer 10a to synchronize signal transmitter 103 and signal generator 10b, torquer 10a thus rotating gimbal ring 8 with respect to gimbal ring 6 in accordance with the rotated position of motor 102. Motor 136 operates microsyn transmitter 137 to rotate gimbal ring 6 with respect to gimbal ring 2b in a similar manner through microsyn signal generator 9b and torquer 9a.

Figure 29:
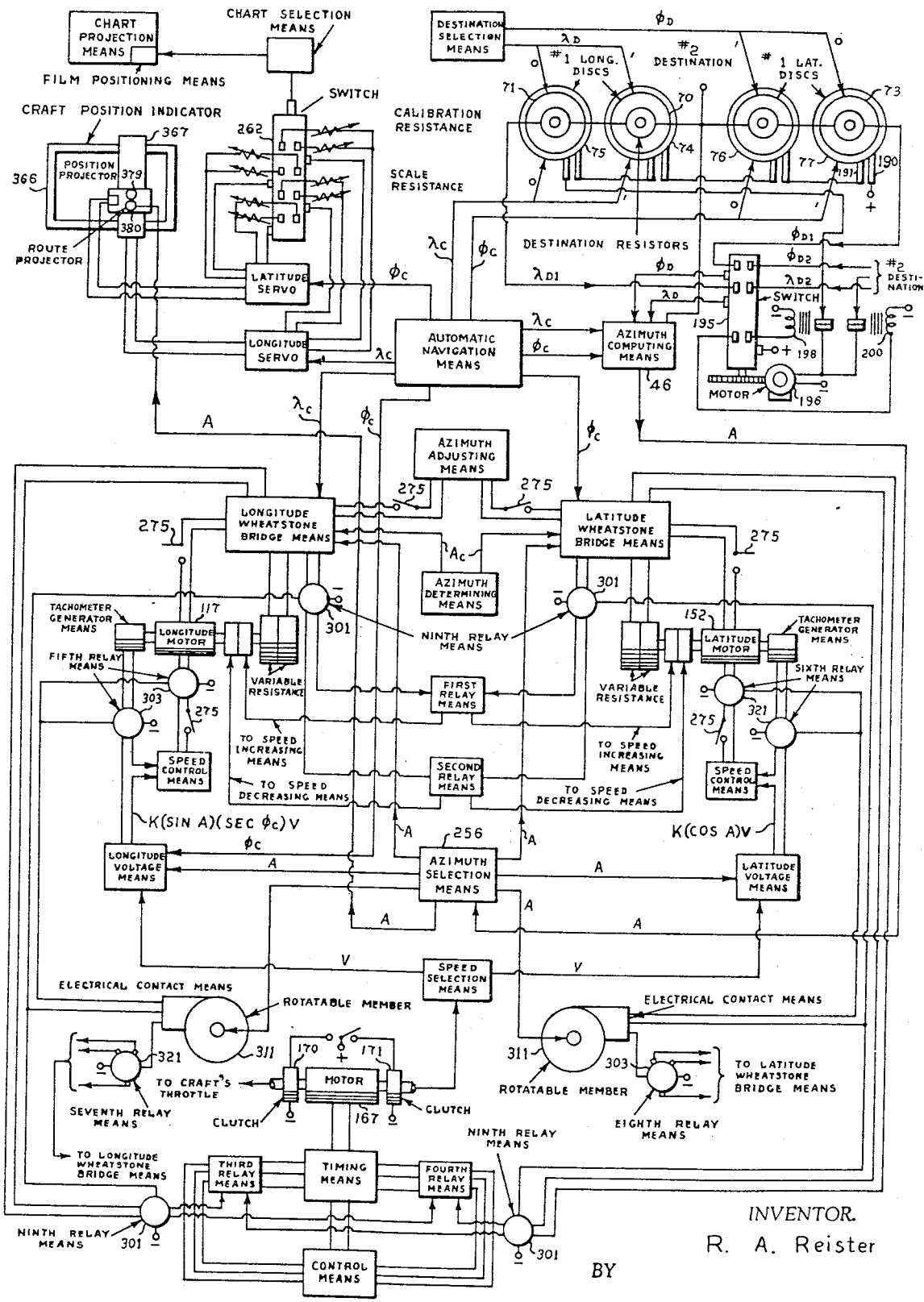
FIG. 29 is a block diagram illustrating the fundamental principle of the guidance mechanism and the relationship of the principal guidance components.

Thus the rotated position of motors 102 and 136 are respectively an indication of the craft's longitude and latitude when the rotated position of motor 102 is properly differentiated with Greenwich Meridian Time. A preferred manner of determining indicated longituide and latitude from the rotated position of motors 102 and 136 is illustrated in FIG. 7. Motor 102 normally rotates microsyn signal transmitter 103 and the housing of planetary gear 95 through electro-magnetic clutch 105, electro-magnetic clutch 104 providing automatic gear shifting for rapid transfer of navigation to different stars. The worm gear drive on the housing of planetary gear 95 is merely illustrative, it being understood that any desired gear ratio drive of the planetary gear housing by motor 102 could be provided. Chromometer motor 108 provides differential operation of the planetary gear 95 such that the output shaft 110 of planetary gear 95 provides a true indication of longitude, output shaft 110 rotating inside supporting shaft 111 as illustrated. Supporting shaft 111 is attached to the housing of planetary gear 95 such that the variable resistors adjusted by shaft 111 through the illustrated gear drive are adjusted in accordance with the angle of gimbal ring 8 with respect to gimbal ring 6 in the star follower for use in a refraction computer and positioning circuit for automatic transfer of navigation to different stars. It is to be understood that the illustrated low gear ratio drive of the variable resistors is specifically for adjustment of a unique multiple turn linear variable resistor of extremely high accuracy provided in the present invention, and that suitable gear ratio drives of any desired operating speed could be provided for adjustment of conventional variable resistors to achieve any desired rate of adjustment of gimbal ring 8 with respect to gimbal ring 6. Variable resistors #1 and #2 adjusted by shaft 110 through electro-magnetic clutch 94 and the illustrated gear drive are utilized in a guidance circuit for automatic guidance of the craft, means being provided for automatic adjustment of variable resistors #1 and #2 to an initial starting position midway between maximum and minimum resistance, such that automatic guidance of the craft may be maintained through 180° of longitude in either an Eastern or Western direction. Shafts 78 and 79 are adjusted through electro-magnetic clutches 91 from the adjustment of variable resistors #1 and #2 such that the angular position of shafts 78 and 79 respectively indicate minutes and degrees of longitude. Variable resistors #94 and #95 adjusted by shafts 78 and 79 are utilized in a positioning circuit providing a visual display of the craft's position on a projected map. Discs 74 and 75 adjusted by shafts 78 and 79 are utilized to operate electrical contact means at a selected destination to activate any desired apparatus at the selected destination and particularly to energize motor 196 to adjust multi-position switch 195 as indicated in FIGS. 8 and 29 as described later, switch 195 providing automatic transfer of navigation to different stars and other functions at selected destinations as described later. During automatic transfer of navigation to different stars, electro-magnetic clutch 94 is disengaged and shafts 78 and 79 are adjusted by syncro 93 in accordance with the longitude determined by a dead-reckoning computer utilized for automatic guidance of the craft.

Motor 136 similarly normally rotates microsyn signal transmitter 137 and shaft 143 through electromagnetic clutch 139, electro-magnetic clutch 138 providing automatic gear shifting for rapid transfer of navigation to different stars. Shafts 80 and 81 are adjusted by shaft 143 through the illustrated gear drive to respectively indicate minutes and degrees of latitude, shafts 80 and 81 adjusting variable resistors in a refraction computer, automatic guidance circuit, and positioning circuit for visual display of the craft's position on a projected map, in addition to adjusting discs 76 and 77 utilized to operate electrical contact means at a selected destination for the purpose of adjusting multi-position switch 195 in FIGS. 8 and 29 as previously mentioned and as later described in more detail. It is to be understood that the illustrated low gear ratio drive of the variable resistors is specifically for adjustment of a unique multiple turn linear variable resistor of extremely high accuracy provided in the present invention, and that suitable gear ratio drives of any desired operating speed could be provided for adjustment of conventional variable resistors to achieve any desired rate of adjustment of gimbal ring 6 with respect to gimbal ring 2b in the star follower.

Thus shaft 110 and shaft 143 in FIG. 7 respectively provide an instantaneous indication of changes in longitude and latitude whenever the star tracking apparatus 56 in FIG. 6 receives a signal from the star follower 5 to adjust motors 102 and 136. Corrections in longitude and latitude due to refraction of light rays in the Earth's atmosphere or due to the proximity to Earth of an artificial satellite utilized for navigation are accomplished directly in the star follower by adjustment in declination of the star follower 5 in gimbal ring 8 and by adjustment of syncro device 7 (in FIG. 2) further controlling the indicated position of gimbal ring 8 with respect to gimbal ring 6 as determined by signal generator 10b, the stated adjustments being provided by a refraction computer in the present invention. Variations in refraction with small changes in longitude and latitude would be insignficant compared to the changes in longituide and latitude, therefore changes in refraction values would have an insignificant effect on the instantaneous indication of longitude and latitude by shafts 110 and 143. In reality, shafts 110 and 143 would indicate changes in longitude and latitude before the syncros adjusting gimbal ring 6 and 8 actually adjusted the star follower 5, thus allowing computer 55 time to simultaneously operate the syncros adjusting gimbal ring 2b with respect to a true vertical in accordance with the indicated longitude and latitude, such that the star follower 5 and gimbal ring 2b would be adjusted to their correct positions simultaneously to prevent spurious indications of longitude and latitude, as was described in Example III discussing operation of the navigation system.

Figure 10:
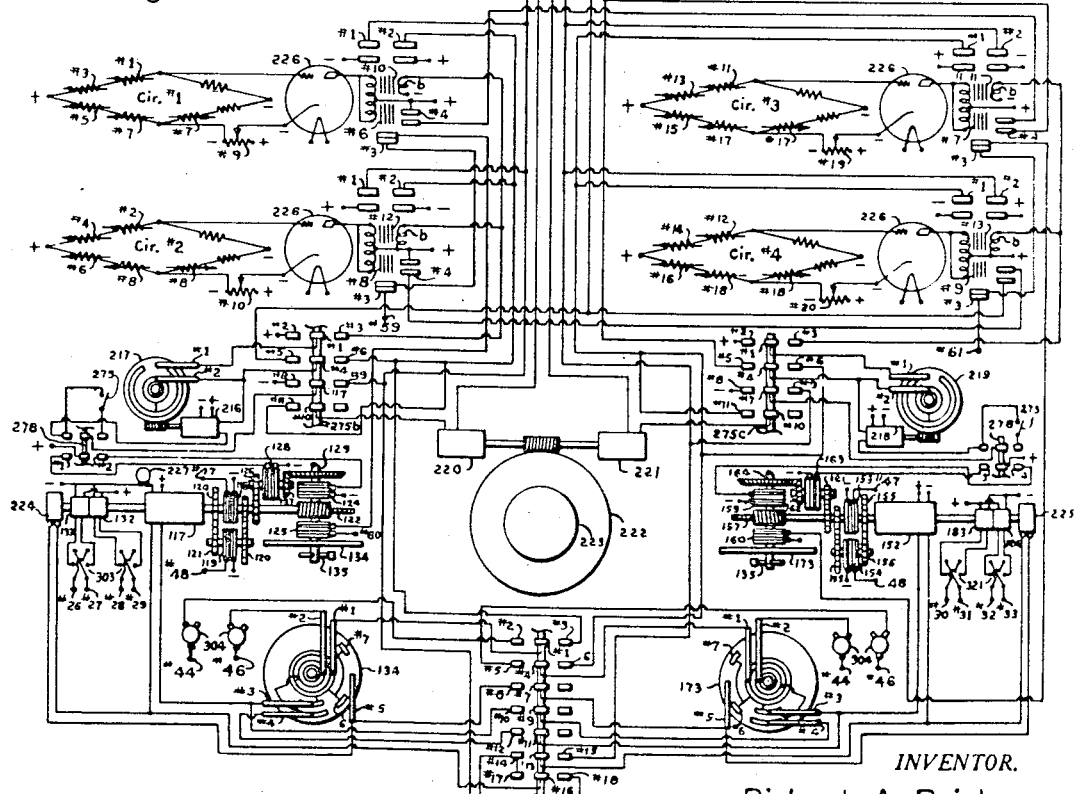
FIG. 10 is an illustration of the guidance circuit which automatically corrects the craft's heading to eliminate drift from a selected ground route and adjusts the craft's velocity to a desired ground speed.

The automatic guidance circuits illustrated in either FIG. 10 or FIG. 30 adjust the azimuth control 223 of a conventional auto-pilot to maintain the craft on a selected route, therefore the speed of adjustment of azimuth control 223 could be made appropriate such that errors in indicated longitude and latitude due to deviation of gimbal ring 2b from a true vertical could be corrected before the azimuth control 223 adjusted the craft to a spurious position. Also the gyro stabilized True North and true vertical reference provided by the magnetic inclination seeking element (or the star follower) in FIG. 6 would provide the conventional auto pilot with an instantaneous course and vertical reference to prevent inadvertent yawing, rolling, or pitching of the craft which might cause deviation of gimbal ring 2b from a true vertical.

Motor 102 in FIG. 6 also rotates contact arms 57 and 58, adjusts linear variable resistors #118 and #119 connected to positioning circuits #25 and #26, adjusts linear variable resistors #51 and #52 connected to positioning circuits #9 and #10, and provides refraction computer 480 with the sidereal hour angle of gimbal ring 8 with respect to gimbal ring 6. Motor 136 also provides refraction computer 480 and other components with the latitude of the craft as determined by the angle of gimbal ring 6 with respect to gimbal ring 2b. Positioning circuits #9 and #10 operate motor 102 to properly adjust gimbal ring 8 with respect to gimbal ring 6 to initially align star follower 5 with a selected star or to automatically transfer navigation to a different star, relay #29a disconnecting motors 102 and 136 from the star tracking apparatus 56 during operation of positioning circuits #9 and #10 in a manner to be described. Positioning circuits #11 and #12 operate motor 230 to adjust star follower 5 with respect to gimbal ring 8 in accordance with the declination of the star selected for navigation, the declination of the selected star also being supplied to refraction computer 480 by motor 230 as indicated, refraction computer 480 determining the correction in declination necessary to compensate for refraction of light rays in the Earth's atmosphere, refraction computer 480 providing positioning circuits #11 and #12 with the necessary correction in declination as indicated. (Positioning circuits #9, #10, #11, and #12 are illustrated in more detail in FIG. 12.) Positioning circuits #25 and #26 in FIG. 6 operate motor 65 to adjust shaft 68 to the indicated longitude through electro-magnetic clutch 66, chronometer motor 108 properly differentiating positioning circuits #25 and #26 with respect to time through adjustment of linear variable resistors #122 and #123 connected in circuits #25 and #26 such that shaft 68 properly indicates longitude. Positioning circuits #25 and #26 in FIG. 6 also provide for correction of indicated longitude due to refraction of light rays in the Earth's atmosphere as determined by refraction computer 480. (The preferred manner of differentiating the position of gimbal ring 8 with respect to time to determine indicated longitude is by means of chronometer motor 108 and planetary gear 95 as illustrated in FIG. 7 and as previously described, refraction computer 480 then properly adjusting syncro device 7 in FIG. 2 to further adjust signal generator 10b in angular position with respect to gimbal ring 8 to compensate for refraction of light rays in the Earth's atmosphere, such that the indicated angular position of gimbal ring 8 with respect to gimbal ring 6 as determined by signal generator 10b accurately indicates longitude when properly differentiated with respect to time as previously described.)

Multi-section, multiposition switch 64 in FIG. 6 provides for insertion of variable resistors into positioning circuits #9 and #10 pre-adjusted to the difference in sidereal hour angle from the Sun of various selected stars, and provides for insertion of variable resistors into positioning circuits #11 and #12 pre-adjusted to the declination of various selected stars, thus providing automatic transfer of navigation to differnt stars in a manner to be described. When gimbal ring 8 approaches some pre-determined limit for practical navigation in a clockwise direction, contact arm 57 connected to a voltage source engages a contact to energize electro-magnetic clutch 63 and contact arm 58 engages contact 59 to energize solenoid 61, causing rotation of a shaft supported by bearing 65 to adjust multi-section, multi-position switch 64 to its next position in a clockwise direction. A lever is attached to the shaft supported by bearing 65, two curved arms concentric to the shaft attached to the extremity of the lever, one curved arm passing through the center of solenoid coil 61 and the other curved arm passing through the center of solenoid coil 62 such that energization of solenoid 61 or 62 causes rotation of the shaft but in opposite directions. A lever attached to the adjusting shaft opposite the torque arms to engage springs provides for return of the adjusting shaft to a neutral position when solenoids 61 and 62 are de-energized similarly as contact 400 is returned to a neutral position by springs 402 in FIG. 30. When gimbal ring 8 approaches some predetermined limit for practical navigation in a counter-clockwise direction, contact arm 57 engages a contact to energize electro-magnetic clutch 63 and contact arm 58 engages contact 60 to energize solenoid 62, causing rotation of switch 64 to its next position in a counter-clockwise direction. Thus repeated energization of solenoids 61 or 62 advances switch 64 to a series of incremental positions in either a clockwise or counter-clockwise direction. Rotor sections of switch 64 are connected to positioning circuits #9, #10, #11, and #12 such that incremental positions of switch 64 connect a series of $\alpha_D$ variable resistors into circuits #9 and #10 and connect a series of $\beta$ variable resistors into circuits #11 and #12, the $\alpha_D$ resistors being pre-adjusted to the difference between the sidereal hour angle of the Sun and various selected stars and the $\beta$ resistors being pre-adjusted to the declination of various stars.

The position of gimbal ring 8 with respect to gimbal ring 6 then adjusts variable resistors #118 and #119, causing positioning circuits #25 and #26 to correspondingly rotate motor 65 in a clockwise or counter-clockwise direction until variable resistors #120 and #121 properly balance circuits #25 and #26. Shaft 69 is initially adjusted to the local meridian hour angle with respect to the Sun for the craft's known longitude at the point of departure to adjust linear variable resistors #122 and #123 connected to positioning circuits #25 and #26 and also adjust the housing of linear variable resistors #45 and #46, navigation switch 277 then being turned on which connects a voltage source to electromagnetic clutch 112 and chronometer motor 108 to maintain adjustment of resistors #45, #46, #122, and #123 in accordance with time through the gear drive as illustrated. Variable resistors #122 and #123 may be initially adjusted to minimum resistance at the start of the operation by appropriate adjustment of the resistor housing to provide maximum time of operation before positioning circuits #25 and #26 reach their limit of operation. Shaft 68 is initially adjusted to the craft's known longitude, and navigation switch 277 when turned on connects a voltage source to energize electromagnetic clutch 66 such that shaft 68 is then differentially adjusted by the position of gimbal ring 8 with respect to gimbal ring 6 and the local time at the point of departure to properly indicate the craft's longitude. Shaft 485 is initially adjusted to the craft's known latitude, motor 65 and motor 136 then respectively providing the craft's longitude and latitude to automatic guidance means 481 as illustrated. Dead-reckoning computer 482 operates longitude motor 117 and latitude motor 152 in accordance with a selected azimuth and velocity to also provide automatic guidance means 481 with the craft's desired longitude and latitude at any instant, whereupon automatic guidance means 481 operates azimuth control means on the craft to maintain the craft's actual longitude and latitude in agreement with the craft's desired longitude and latitude. Longitude motor 117 and latitude motor 152 are intially adjusted to the craft's known longitude and latitude in a manner to be described later, longitude motor 117 adjusting the rotor of resistors #45 and #46 to differentially adjust resistors #45 and #46 in accordance with time and the craft's longitude as determined by dead-reckoning computer 482 to properly position star follower 5 during transfer of navigation to a different star.

Positioning circuits #11 and #12 operate motor 230 to adjust microsyn signal transmitter 231 and linear variable resistors #60 and #61, resistors #60 and #61 balancing positioning circuits #11 and #12 when microsyn signal transmitter 231 adjusts tracking device 5 with respect to gimbal ring 8 in accordance with the selected declination connected into circuits #11 and #12 by switch 64. Refraction computer 480 is provided with the angle of gimbal ring 8 with respect to gimbal ring 6 by motor 102, the angle of gimbal ring 6 with respect to gimbal ring 2b by motor 136, and the angle of tracking device 5 with respect to gimbal ring 8 by motor 230. Computer 480 then provides positioning circuits #25 and #26 with the correction in ligitude and longitude positioning circuits #11 and #12 with the correction in declination to properly compensate for refraction of light in the Earth's atmosphere in a manner to be described later.

Switch 64 is initially adjusted either manually or by automatic positioning means to a position connecting $\alpha_D$ variable resistors into circuits #9 and #10 adjusted to 0 difference in sidereal hour angle from the sun and connecting $\beta$ variable resistors into circuits #11 and #12 adjusted to the declination of the Sun. Switch 274 in FIG. 6 when turned on connects a voltage source to energize relay 202, closing normally open contacts #1 and #2 of relay 202. (Contact arm 57, rotated by motor 102 in FIG. 6, similarly connects a voltage source to energize relay 202 when gimbal ring 8 approaches a limiting position for practical navigation, and contact means on destination selection discs to be described later also similarly connect a voltage source to energize relay 202 when switch 195 is adjusted by motor 196 to automatically transfer navigation to a different star at a selected destination as illustrated in FIG. 8.) The closing of contact #1 of relay 202 connects a voltage source through navigation switch 277 as illustrated in FIG. 6 to activate positioning circuits #9 and #10, and the closing of contact #2 of relay 202 closes a circuit to relay #29a and relay #29b allowing relays #29a and #29b to be operated when either relay #38, #19, #20, or #22 is energized, normally open contact #1 of relay #38 and normally open contacts #3 of relays #19, #20, or #22 closing upon energization of the respective relays to connect a voltage source (through contact #2 of relay 202) energizing relays #29a and #29b. Energization of relay #29a closes normally open contact #5 of relay #29a to connect a voltage source energizing a secondary winding on relay 202 locking relay 202 in operation such that switch 274 may be temporarily closed and then opened and relay 202 will remain in operation. Energization of relay #29a further causes normally closed contact #1, #2, #3, and #4 of relay #29a to open thus disconnecting motors 102 and 136 from the star tracking mechanism. Activation of positioning circuits #9 and #10 closes normally open contacts #1 and #2 of relay #19 or #20 connecting a direct current voltage source to respectively rotate motor 102 in a clockwise or counterclockwise direction to properly align the longitudinal axis of tracking device 5 with the Sun. Before placing the navigation system in operation, the components orienting frame 1 and the vertical reference system with respect to the Earth's magnetic lines of force would be turned on first. Navigation switch 277 when turned on provides a voltage source to the appropriate components such as the star tracking mechanism, positioning circuits, etc. to properly maintain navigation, therefore to place the navigation system in operation, shaft 69 would be adjusted to some time in advance, switch 274 would be turned on as the pre-set time approached, switch 277 would be turned on at the pre-set time, after which switch 274 would be turned off.

Positioning circuits #9, #10, #11, and #12 upon operating motors 102 and 230 to properly adjust gimbal ring 8 and tracking device 5 respectively to the sidereal hour angle and declination of the Sun (gimbal ring 6 having been previously adjusted to the latitude of the craft by motor 136) would become balanced whereupon relays #19, #20, #21, and #22 would all become de-energized to de-energize relays #29a and #29b, thus unlocking relay 202 and permitting the star tracking mechanism to track the selected star. The opening of contact #2 of relay 202 upon de-energization of relay 202 prevents further operation of relays #29a and #29b when positioning circuits #11 and #12 are making correction in declination to compensate for refraction of light in the Earth's atmosphere except when transfer of navigation to a different star is being accomplished. When the practical limit of navigation by a selected star is reached, contact arms 57 and 58 would engage contacts as illustrated to energize relay 202 and adjust switch 64 as previously described thus causing automatic transfer of navigation to a different star. During transfer of navigation to a different star while the craft is in flight, energization of relay #29b causes normally closed contact #1 of relay #29b to open thus de-energizing electro-magnetic clutch 66, and causes normally open contacts #2 and #3 of relay #29b to close thus coupling shaft 483 of longitude motor 117 to longitude shaft 68 and coupling shaft 484 of latitude motor 152 to latitude shaft 485 to maintain navigation by means of dead-reckoning computer 482 while transfer of navigation to a different star is being accomplished. Device 116 on shaft 483 might be a fine positioning microsyn signal transmitter and device 67 on shaft 68 a fine positioning microsyn signal generator and torquer, a conventional phase sensitive amplifier operating the torquer in a conventional manner such that shaft 68 is coupled to rotate with shaft 483 at the instant of energization of relay #29b, conventional course positioning means being eliminated from position transducers 116 and 67. Thus transducer 67 responds to a signal from transducer 116 to couple shaft 68 to shaft 483 upon energization of relay #29b, similarly as microsyn signal generator 10b and torquer 10a on gimbal ring 6 in the star follower respond to microsyn signal transmitter 103 to couple gimbal ring 8 to motor 102. Devices 182 and 151 might be similar fine positioning transducers such that shaft 485 is coupled to rotate with shaft 484 upon energization of relay #29b. Contacts #2 and #3 of relay #29b could also energize conventional electro-magnetic clutches to couple shaft 483 with shaft 68 and couple shaft 484 with shaft 485 upon energization of relay #29b, such that dead-reckoning computer 482 would maintain navigation during transfer of navigation to a different star. The differential adjustment of resistors #45 and #46 by longitude motor 117 and chronometer motor 108 would properly orient gimbal ring 8 with respect to gimbal ring 6 and the coupling of shaft 484 with shaft 485 would properly orient gimbal ring 6 with respect to gimbal ring 2b in accordance with the position of the craft during automatic transfer of navigation to a different star. Any errors in navigation by dead-reckoning computer 482 during transfer of navigation to a different star would be automatically corrected upon de-energization of relays #29a and #29b when tracking device 5 then became precisely oriented with the selected star by tracking mechanism 56.

Relay #29 in FIG. 12 is energized and performs the same functions similarly as relays #29a and #29b in FIG. 6 during automatic transfer of navigation to a different star.

Movable double-pole double-throw contacts #5 and #6 of relay #29 are in addition connected to a voltage source to de-energize electro-magnetic clutches 105 and 94 and energize electro-magnetic clutch 104 in FIG. 7 upon energization of relay #29 such that the illustrated automatic gear shifting provided by gears 107 and 106 in FIG. 7 automatically increases the speed of rotation of microsyn signal transmitter 103 by motor 102 to increase the rate of adjustment of gimbal ring 8 with respect to gimbal ring 6 during automatic transfer of navigation to a different star, gear 106 being coupled to gear 107 upon energization of electromagnetic clutch 104. (Terminals #21 and #22 of normally closed contacts #5 and #6 of relay #29 are respectively connected to electro-magnetic clutches 105 and 94 and terminal #23 of normally open contact #6 of relay #29 is connected to electro-magnetic clutch 104 as indicated in FIG. 7. Terminal #17 of normally open contact #5 of relay #29 is connected to the secondary winding of relay 202 in FIG. 9 as indicated, similarly as normally open contact #5 of relay #29a is connected to the secondary winding of relay 202 in FIG. 6). Obviously the illustrated automatic gear shifting means could also be utilized to similarly increase the rate of adjustment of star follower 5 in gimbal ring 8 in accordance with a change in declination as controlled by positioning circuits #11 and #12 in FIG. 6 and 12 during automatic transfer of navigation to a different star. Normally open single-pole single-throw contacts #7, #8, #9, and #10 of relay #29 electrically connect all necessary operating components of syncro 93 with syncro 116 and electrically connect all necessary operating components of syncro 151 with syncro 182 in FIG. 7 upon energization of relay #29 such that longitude motor 117 and latitude motor 152 in the dead-reckoning computer maintain navigation during automatic transfer of navigation to a different star (electro-magnetic clutch 94 being de-energized to uncouple shaft 110 of planetary gear 95 upon energization of relay #29 as previously stated) similarly as previously illustrated and described in FIG. 6, syncros 93, 116, 151, and 182 in FIG. 7 being similar to and operated in the same manner as syncros 67, 116, 151, and 182 in FIG. 6. An electro-magnetic clutch could be utilized to replace syncros 93 and 116 and an electro-magnetic clutch could be utilized to replace syncros 151 and 182 in FIG. 7 similarly as was previously described for replacement of syncros 67, 116 and syncros 151, 182 in FIG. 6.

A true air speed measuring device is shown diagramatically in FIG. 6 as a pitot tube arrangement 391 with the open end facing the air stream and connected to the interior of a bellows 390 within a chamber 389 connected to a constant speed, motor-driven pump 388, of the centrifugal type. Such a pump will supply to the chamber 389 a static pressure which varies inversely with atmospheric air density, so that the movement of the bellows instead of being responsive to indicated air speed, as is a standard air speed indicator, is responsive to true air speed. Such an arrangement is shown in the patent to Hanson, U.S. Pat. No. 2,391,896, dated Jan. 1, 1946. Movement of said bellows 390 turns a transmitter, such as selsyn transmitter 392, which may be connected to a selsyn signal generator to operate torquing means adjusting any desired device in a conventional manner. Transmitter 392 might also be a non-linear or linear variable resistor, depending upon the characteristics of bellows 390, to properly indicate the true air speed. Means, such as relays with normally closed contacts when de-energized, are provided within the tracking mechanism 56 to connect a voltage source energizing relays 202 and #38 when radiant energy to tracking device 5 from the object being tracked is temporarily interrupted, such as when the craft flies through dense clouds. Thus energization of relays 202 and #38 causes navigation to be maintained and tracking device 5 to be properly oriented in accordance with the craft's position by dead-reckoning computer 482, as previously described, when radiant energy to tracking device 5 is temporarily interrupted. Switch 273 when turned on connects a voltage source to the appropriate components in automatic guidance means 481 to maintain automatic guidance, including the auto-pilot system. When switch 273 is turned off, allowing manual operation of the craft's controls, such as at take-offs or landings, the energizing coil of relay #39 is connected to contact #2 of switch 273 in series with normally open contact #2 of relay #38 connected to a voltage source. Therefore when switch 273 is off and radiant energy to tracking device 5 is temporarily interrupted, energization of relay #38 further causes energization of relay #39 to transfer adjustment of the azimuth and velocity selection means of dead-reckoning computer 482 from automatic guidance means 481 respectively to computer 55 and true air speed transmitter 392. The azimuth and velocity selection means of dead-reckoning computer 482 might be adjusted by torque means operated by the signal output of a selsyn signal generator through a conventional phase sensitive amplifier, the said azimuth and velocity selsyn signal generators being respectively connected to the movable contacts of double-throw contacts of relay #39 such as contacts #1 and #2, the normally closed contacts being respectively connected to azimuth and velocity selsyn transmitters in the automatic guidance system 481, the normally open contacts being respectively connected to an azimuth selsyn transmitter in computer 55 indicating the true azimuth of the craft and selsyn transmitter 392 indicating the true air speed of the craft. It is to be understood that an appropriate number of such double-throw contacts on relay #39 would be provided, contacts #1 and #2 being illustrative of the principle involved. Contacts such as #3 and #4 of relay #39 maintain proper operation of dead-reckoning computer 482 when automatic guidance means 481 is turned off by switch 273 and radiant energy to tracking device 5 is temporarily interrupted to energize relay #39 in a manner to be described later. Thus navigation would be maintained and tracking device 5 properly oriented with respect to a selected star when radiant energy to tracking device 5 was temporarily interrupted whether or not automatic guidance means 481 were in operation.

Some details of the navigation and guidance system showing adjustment of variable resistors are illustrated in FIG. 7. Motor 102 rotates selsyn transmitter 103 and the housing of planetary gear 95 through a worm gear drive as illustated, selsyn transmitter 103 being electrically connected to selsyn signal generator 10b in FIG. 2 to operate torquer 10a through a conventional phase sensitive amplifier, torquer 10a and selsyn signal generator 10b adjusting the position of gimbal ring 8 with respect to gimbal ring 6 through precision planetary reduction gearing such that the revolutions of torquer 10a and selsyn signal generator 10b are greater than the revolutions of gimbal ring 8 to increase the accuracy of positioning, as previously described. Planetary gear 95 may be similar to planetary gear 49 illustrated in FIG. 5 where disk 51 is attached to a driven shaft (similar to shaft 110 in FIG. 7) bearing mounted to rotate within housing 49 on the far side, gears 52 being bearing mounted on short shafts attached to disc 51 at 120° intervals as illustrated, gears 52 meshing with a driving gear 53 and a surrounding gear 50 attached to housing 49, gear 53 being attached to a driving shaft (similar to shaft 109 in FIG. 7) bearing mounted to rotate within housing 49 on the near side. In FIG. 7 the planetary gear housing 95 is also mounted to rotate on shaft 111 within bearings 101 as illustrated. Chronometer motor 108 rotates shaft 109 through a worm gear or reduction gear drive of proper ratio such that when the craft is stationary and tracking device 5 is tracking a selected star, shafts 111 and 109 rotate in opposite directions in accordance with the Earth's rotation to maintain shaft 110 in a stationary position. Thus when the craft is moving, shaft 110 is differentially adjusted by shafts 109 and 111 to properly indicate the craft's longitude. Thus various resistors such as resistors #51, #52, #21, #22, #25, #26, #114, and #115 may be adjusted by rotation of shaft 11 through appropriate gear drives to properly indicate the position of gimbal ring 8 with respect to gimbal ring 6. Linear variable resistors #51 and #52 are of such a type that each revolution of gear 96 adjusts the resistors operated by gear 97 in increments of resistance equal to the maximum resistance of the resistors adjusted by gear 96 as the resistors adjusted by gear 96 pass from maximum to minimum or minimum to maximum resistance in a manner to be described later, the resistors adjusted by gear 96 being connected in series with the resistors adjusted by gear 97 to provide a linear variable resistance of very accurate resolution. Thus appropriate gear ratios could be provided between gear 96, 97, and the other driving gears such that shaft 100 would be rotated through some convenient angle, such as approximately 350°, while gimbal ring 8 rotated 180° with respect to gimbal ring 6, and gear 96 rotated through 360° for each 1° change in the position of gimbal ring 8 with respect to gimbal ring 6, the angle of gear 96 then indicating the position of gimbal ring 8 in minutes of arc. A one to one gear ratio is provided between gears 97, 98, and 99 for purposes of illustration, although the resistors adjusted by gears 98 and 99 could of course simply be adjusted by gear 97 or shaft 100. Contact arms 57 and 58 in FIG. 6 would then also be attached to shaft 100 to cause automatic transfer of navigation to different stars. Shaft 110 rotates gears 180 and 181 through electromagnetic clutch 94, gears 180 and 181 adjusting linear variable resistors #1 and #2 similarly as gears 96 and 97 adjust resistors #51 and #52. Gears 180 and 181 also respectively rotate shafts 78 and 79 through electro-magnetic clutches 91, shafts 78 and 79 adjusting linear variable resistors #94 and #95 similarly as resistors #1 and #2 are adjusted. The gear ratio between shafts 78 and 79 is 360 to 1 such that shaft 79 indicates degrees of longitude and shaft 78 indicates minutes of longitude. Longitude motor 117 operated by dead-reckoning computer 482 rotates shaft 129 through worm gear drive 122, shaft 129 rotating gears 130 and 131 to adjust linear variable resistors #3 and #4 similarly as resistors #1 and #2 are adjusted. Gears 130 and 131 also rotate the housing of linear variable resistors #45 and #46, chronometer motor 108 rotating gears 113 and 114 through electromagnetic clutch 112 to adjust the rotors of resistors #45 and #46 such that resistors #45 and #46 are differentially adjusted by longitude motor 117 and chronometer motor 108 as previously indicated in FIG. 6, electrical connections to resistors #45 and #46 being made through brushes contacting slip rings on the resistor housing as illustrated in FIG. 7. Resistors #1 and #2 are connected to the automatic guidance system to indicate the craft's actual longitude and resistors #3 and #4 are connected to the automatic guidance system to indicate the craft's desired longitude as determined by the dead-reckoning computer. Motor 136 rotates selsyn transmitter 137 and shaft 143 through worm gear drive 142, selsyn transmitter 137 being electrically connected to selsyn signal generator 9b in FIG. 2 to operate torquer 9a adjusting gimbal ring 6 similarly as gimbal ring 8 is adjusted, as previously described. Shaft 143 rotates shafts 80 and 81 through a gear drive as illustrated, the gear ratio between shafts 80 and 81 being 360 to 1 such that shaft 81 indicates degrees of latitude and shaft 80 indicates minutes of latitude. Shafts 80 and 81 adjust linear variable resistors #11, #12, #104, #105, #84, and #85 similarly as resistors #1 and #2 are adjusted, a one to one gear ratio being provided between gears 145, 146, and 147 such that the resistors adjusted by gears 146 and 147 are adjusted to degrees of latitude. Latitude motor 152 operated by dead-reckoning computer 482 rotates shaft 164 through worm gear drive 157, shaft 164 rotating gears 165 and 166 to adjust linear variable resistors

13 and #14 similarly as resistors #11 and #12 are adjusted. Resistors #11 and #12 are connected to the automatic guidance system to indicate the craft's actual latitude and resistors #13 and #14 are connected to the automatic guidance system to indicate the craft's desired latitude as determined by the dead-reckoning computer.

When the automatic guidance system is turned off, variable resistors #3 and #4 are automatically adjusted equal to the resistance of variable resistors #1 and #2, and variable resistors #13 and #14 are automatically adjusted equal to the resistance of variable resistors #11 and #12 by the guidance circuit in FIG. 30 in a manner to be described. Thus when variable resistors #1 and #2 in FIG. 7 are intiially adjusted midway between maximum and minimum resistance at the start of the operation, variable resistors #3 and #4 are also adjusted midway between maximum and minimum resistance by the guidance circuit in FIG. 30, the housing of variable resistors #45 and #46 then being adjusted to a pre-determined position by the stated adjustment of variable resistors #3 and #4 such that adjustment of shaft 115 in FIG. 7 to the local meridian hour angle with respect to the Sun at the initial known longitude of the craft properly adjusts the resistance of variable resistors #45 and #46 to properly align the star follower 5 with the Sun when a resistor properly adjusted to zero difference in sidereal hour angle from the Sun is inserted into positioning circuits #9 and #10 by switch 64 in FIG. 6. Chronometer motor 108 in FIG. 7 maintains adjustment of variable resistors #45 and #46 in accordance with the local time at the point of departure as previously described, variable resistors #45 and #46 in FIG. 6 being similarly adjusted.

Variable resistors #1 and #2 in FIG. 7 may be initially adjusted midway between maximum and minimum resistance at the start of the operation by switch 278 providing for energization of electro-magnetic clutch 90 and solenoid 92, switch 278 also operating motor means to adjust gear 181 through electro-magnetic clutch 90, solenoid 92 engaging lug 179 to halt adjustment of gear 181 when variable resistors #1 and #2 are adjusted midway between maximum and minimum resistance. A more preferred manner of initial adjustment of variable resistors #1, #2, #3, #4, #45, and #46 is described later.

REFRACTION COMPUTER

To compensate for refraction of light in the Earth's atmosphere, the refraction computer illustrated in diagrammatic form in FIG. 31 provides for a slight correction in rotation of the star follower 5 in a clockwise direction with respect to gimbal ring 8 in FIGS. 2 and 6 when gimbal ring 6 rotates counter-clockwise with respect to gimbal ring 2b from a position parallel with each other and vice versa, the corrections being a maximum when gimbal ring 8 is parellel to gimbal ring 6, and calibration circuits diminishing the corrections when gimbal ring 8 rotates either clockwise or counter-clockwise from this parallel position. The computer provides a slight correctional decrease in the indicated longitude when gimbal ring 8 rotates clockwise with respect to gimbal ring 6 from a position parallel with each other and vice versa, the corrections being a maximum when gimbal ring 6 is parallel to gimbal ring 2b, and calibration circuits diminishing the corrections when gimbal ring 6 rotates either clockwise or counter-clockwise from this parallel position. Rotation of the optical axis of the star follower 5 from a position perpendicular to the plane of gimbal ring 8 in adjustment to the declination of a star selected for navigation provides corrections in the position of star follower 5 with respect to gimbal ring 8 and calibration of the corrections in longitude similarly as the position of gimbal ring 6 with respect to gimbal ring 2b. Further calibration means decrease the refraction corrections with increase in altitude. Provision is made in the refraction computer of FIG. 31 to similarly provide appropriate corrections in longitude and the position of star follower 5 with respect to gimbal ring 8 when star follower 5 is replaced with a signal seeking radio antenna aligned with a navigation satellite emitting radio frequency signals and orbiting in space in the plane of the Earth's equator in a constant position with respect to the Earth, the corrections being necessary due to the proximity of the satellite to the Earth in comparison with the Earth's diameter.

Wheatstone bridge positioning circuits #5 and #6 in FIG. 12 are typical of the other wheatstone bridge positioning circuits illustrated and utilized in a refraction computer. A direct current voltage source is applied to the input of the wheatstone bridge circuits #5 and #6 as illustrated, the signal voltage output being applied to the grid and cathode of a conventional gas type tube 226 such that the gas ionizes at a critical bias voltage to provide a large surge in plate current, relays #15 and #16 being operated by the surge in plate current. A direct current voltage source is applied across potentiometers #43 and #44 to provide an adjustable bias voltage, the bias voltage being connected in series with the signal voltage output of circuits #5 and #6 and adjusted to the critical bias voltage of tubes 226 such that the signal voltage output of circuits #5 and #6 is zero when they are balanced. Positioning variable resistors #37 and #38 respectively increase and decrease in resistance together or vice versa upon adjustment to cause relay #15 to be energized when resistors #37 and #38 are adjusted in one direction of rotation from their null point and causing relay #16 to be energized when the resistors are adjusted in the other direction from their null point, the polarity of the input voltages to circuits #5 and #6 being the same. However, if the polarity of the input voltage to circuit #6 were reversed from the polarity of the input voltage to circuit #5, positioning resistors #37 and #38 would increase in resistance simultaneously and decrease in resistance simultaneously. Energization of relay #15 closes normally open contacts to rotate motor 227 in one direction and energization of relay #16 closes normally open contacts to rotate motor 227 in the opposite direction, rotation of motor 227 adjusting variable resistors #41 and #42 to return circuits #5 and #6 to their null point, rotation of motor 227 further rotating selsyn transmitter 228 to adjust any desired device in accordance with the position of resistors #37 and #38. Resistors #41 and #42 are linear variable resistors, however resistors #37 and #38 could be either linear or non-linear depending upon the positioning requirements. Wheatstone bridge circuits #7 and #8 are similar to circuits #5 and #6 except that scale variable resistors #25, #26, #27, #28, #29, #30, #31, and #32 are provided in the bridge circuits as illustrated such that a given change in the resistance of positioning resistors #21, #22, #23, and #24 may produce a varying change in the position of motor 229, depending upon the adjustment of the scale variable resistances. The corresponding scale variable resistances in circuits #7 and #8 are always respectively equal in resistance to each other and increase or decrease in resistance simultaneously, for example the two resistors #25 in circuit #7 are always eaual in resistance to each other and always equal in resistance to the two resistors #26 in circuit #8. Thus circuits #7 and #8 may serve as computer positioning circuits. FIG. 31 is a diagram of one type of refraction computer utliizing computer circuits #7 and #8. The sidereal hour angle of gimbal ring 8 with respect to gimbal ring 6 in the navigation device adjusts positioning variable resistors #21 and #22 connected into circuits #7a and #8a as illustrated in FIGS. 7, 12, and 31, resistors #21 and #22 being adjusted midway between maximum and minimum resistance when gimbal ring 8 is parallel to gimbal ring 6 in FIGS. 2 and 6, circuits #7a and #8a controlling the position of motor 229a as illustrated to provide the correction in longitude to compensate for refraction of light in the Earth's atmosphere. Motor 229a would thus rotate linear positioning variable resistors connected into positioning circuits #25 and #26 of FIG. 6 such that the craft's indicated longitude would be slightly decreased below the normal indicated longitude as tracking device 5 approached the Eastern horizon and the craft's indicated longitude would be slightly increased above the normal indicated longitude as tracking device 5 approached the Western horizon. When utilizing the navigation device illustrated in FIG. 2, motor 229a would rotate a selsyn transmitter electrically connected to selsyn signal generator and torquer 7 to correct the indicated longitude in a similar manner. The resistance of positioning variable resistors #21 and #22 varies in an appropriate manner to properly correct the craft's indicated longitude to compensate for refraction of light at all angles of gimbal ring 8 with respect to gimbal ring 6 at 0° latitude, 0° declination, at sea level. The craft's actual latitude or angle of gimbal ring 6 with respect to gimbal ring 2b in the navigation device adjusts positioning variable resistors #23a and #24a connected into circuits #7b and #8b as illustrated in FIGS. 7, 12, and 31, resistors #23a and #24a being adjusted midway between maximum and minimum resistance at 0° latitude, circuits #7b and #8b controlling the position of motor 229b as illustrated to provide the correction in declination to compensate for refraction of light in the Earth's atmosphere. Motor 229b adjusts linear positioning variable resistors #39 and #40 connected into circuits #11 and #12 as illustrated in FIGS. 12 and 31, resistors #39 and #40 being adjusted midway between maximum and minimum resistance at 0° latitude, circuits #11 and #12 controlling the position of motor 230 to adjust tracking device 5 to the declination of a selected star as illustrated in FIGS. 6 and 12. Motor 229b thus adjusts resistors #39 and #40 such that tracking device 5 is rotated slightly counterclockwise with respect to gimbal ring 8 when gimbal ring 6 rotates clockwise with respect to gimbal ring 2b and vice versa since a star at the North or South horizon would appear to be slightly above the horizon due to refraction of light in the Earth's atmosphere. The resistance of positioning variable resistors #23a and #24a varies in an appropriate manner to properly correct the angle of declination to compensate for refraction of light at all angles of latitude when the declination of a selected star is zero and gimbal ring 8 is parallel to gimbal ring 6 at sea level.

The angle of gimbal ring 8 with respect to gimbal ring 6 would further affect the correction in declination, the angle of gimbal ring 6 with respect to gimbal ring 2b would further affect the correction in longitude, and the angle of tracking device 5 with respect to gimbal ring 8 would further affect both the correction in longitude and declination to compensate for refraction of light in the Earth's atmosphere. Therefore the sidereal hour angle of gimbal ring 8 with respect to gimbal ring 6 adjusts scale variable resistors #25 and #26 connected into circuits #7b and #8b as illustrated in FIGS. 7, 12, and 31, resistance elements #25 and #26 being center-tapped such that resistors #25 and #26 have minimum resistance when gimbal ring 8 is parallel to gimbal ring 6 and resistors #25 and #26 appropriately increase in resistance when gimbal ring 8 is rotated in either direction from the described parallel position, the correction in declination for any given latitude thus being a maximum when gimbal ring 8 is parallel to gimbal ring 6 and a minimum when gimbal ring 8 is rotated 90° in either direction from the described parallel position. Altitude scale variable resistances would be provided in the upper legs of circuits #7b and #8b similarly as scale variable resistors #25 and #26 are provided in the upper legs of circuits #7 and #8 of FIG. 12, and conventional altimeter means adjusting the altitude scale variable resistors to a minimum resistance at 0 altitude and the altitude scale variable resistances appropriately increasing in resistance with altitude such that the correction in declination would be a maximum at sea level and would approach zero as the craft left the Earth's atmosphere. Scale variable resistors #25 and #26 might be placed in the lower legs of circuits #7b and #8b rather than in the upper legs as illustrated, the extremities of resistor elements #25 and #26 being connected together then such that resistors #25 and #26 would have maximum resistance when gimbal ring 8 is parallel to gimbal ring 6 and would appropriately decrease in resistance to minimum resistance when gimbal ring 8 is rotated 90° in either direction from the described parallel position. The craft's latitude or angle of gimbal ring 6 with respect to gimbal ring 2b adjusts scale variable resistors #27 and #28 connected into circuits #7a and #8a as illustrated in FIGS. 7, 12, and 31, resistance elements #27 and #28 being center-tapped such that resistors #27 and #28 have minimum resistance at 0° latitude and appropriately increase to maximum resistance at 90° North or South latitude, the correction in the craft's indicated longitude thus being a maximum at 0° latitude and a minimum at 90° North or South latitude. Altitude scale variable resistances would be provided in the upper legs of circuits #7a and #8a and adjusted similarly as described for circuits #7b and #8b. In FIG. 31 motor 230 further adjusts the rotors of positioning variable resistors #23b, #24b and the rotors of scale variable resistors #31 and #32, provision being made for rotation of the housing of resistors #23b, #24b, #31, and #32 for purposes of calibration. Positioning variable resistors #23b and #24b are similar to positioning variable resistors #23a and #24a and are similarly connected into circuits # 7b and # 8b, resistors # 23b and # 24b being adjusted midway between maximum and minimum resistance at 0° declination, however while resistors # 23a and # 24a might respectively increase in resistance with increasing latitude, resistors # 23b and # 24b would then respectively decrease in resistance with increasing declination. Scale variable resistors # 31 and # 32 are connected into circuits # 7a and # 8a as illustrated in circuits # 7 and # 8 of FIG. 12, the extremities of resistance elements # 31 and # 32 being connected together such that resistors # 31 and # 32 have maximum resistance at 0° declination and their resistance appropriately decreases to minimum resistance at 90° North or South declination. Thus resistors # 23b, # 24b, # 31, and # 32 respectively counter-act or neutralize resistors # 23a, # 24a, # 27, and # 28 whenever the angle of declination equals the angle of latitude similarly as if both the latitude and declination were zero. It is to be understood that all resistors described as being connected into the various positioning circuits would be connected in series with each other similarly as illustrated in FIG. 12. The present state of the art in computer design might also provide conventional components to resolve the angle of gimbal ring 6 with respect to gimbal ring 2b, the angle of gimbal ring 8 with respect to gimbal ring 6, and the angle of tracking device 5 with respect to gimbal ring 8 into the azimuth and altitude of the selected star, compute the angle of refraction for the determined altitude, and appropriately correct the declination and the craft's indicated longitude as illustrated in FIG. 6 and indicated in FIG. 2 by utilization of syncro device 7 as previously described.

In the event artificial satellites emitting radio signals were used as the navigation reference, the orbit of the satellites being in the plane of the Earth's equator and the angular velocity of the satellites around the Earth being equal to the angular velocity of the Earth's rotation such that the satellites always remained in the same position relative to a pre-determined meridian at the Earth's equator, the direction of radio signals from the navigation satellites to the Earth would have the reverse effect on declination and the craft's indicated longitude that refraction of light in the Earth's atmosphere would have due to the rather large radius of the Earth in proportion to the proximity of the satellites to the Earth. Thus a slight modification of the computer circuit of FIG. 31 could be used when the navigation reference is a navigation satellite. Since the declination of the navigation satellites would always be zero, resistors # 23b, # 24b, # 31, and # 32 would be eliminated. Resistors # 21 and # 22 would be adjusted by the angle of gimbal ring 8 with respect to gimbal ring 6 similarly as previously described except that as tracking device 5 approached the Eastern horizon, the craft's indicated longitude would be appropriately increased slightly above the normal indicated longitude and as tracking device 5 approached the Western horizon, the craft's indicated longitude would be appropriately decreased slightly below the normal indicated longitude in accordance with the effect of the Earth's radius on the trigonometric relationship with respect to the navigation satellite. Resistors # 23a and # 24a would be adjusted by the angle of gimbal ring 6 with respect to gimbal ring 2b similarly as previously described except that as gimbal ring 6 rotated clockwise with respect to gimbal ring 2b, tracking device 5 would be also rotated slightly clockwise with respect to gimbal ring 8 and vice versa to properly compensate for the effect of the Earth's radius on the trigonometric relationship with respect to the navigation satellite. Resistors # 25 and # 26 would be adjusted identically as previously described except with appropriate variation to properly compensate for the effect of the position of gimbal ring 8 with respect to gimbal ring 6 on the correction in declination. Resistors # 27 and # 28 would also be adjusted identically as previously described except with appropriate variation to properly compensate for the effect of latitude on the correction in indicated longitude. Altitude scale variable resistance means adjusted by any conventional altimeter means might be connected into the lower legs of wheatstone bridge circuits # 7a, # 8a, # 7b, and # 8b, the altitude scale variable resistors being adjusted to minimum resistance at 0 altitude and appropriately increasing in resistance with altitude to properly increase the correction in declination and indicated longitude as the altitude increased, however the effect of altitude would be negligible except in cases where the craft left the Earth's atmosphere to a considerable distance in proportion to the Earth's radius.

THE STAR FOLLOWER

Electro-Optical Systems, Inc. manufacture an optical transducer consisting of a simple semi-conductor cell without any moving parts which can be used to determine direction to any object which radiates visible or infrared radiation when used with a simple lens system. The transducer is a photo-voltaic unit that can resolve the angular position of a souce of visible or infrared radiation along a single axis or two mutually perpendicular axes. The output is a D. C. voltage whose polarity indicates whether the radiation source is to the right or left of the cell's centerline and whose magnitude is proportional to radiation source displacement from centerline. The transducers can resolve the angular position of a radiation source to better than 0.1 seconds of arc (as previously described for optical pick-off of the magnetic inclinometers). Obviously such an optical transducer in conjunction with an appropriate simple lens system could simply be provided in tracking device 5 of FIGS. 6 or 39, the signal output of the optical transducer being supplied to the input of an appropriate servo amplifier provided in tracking device 56 to properly operate longitude and latitude tracking motors 102 and 136 in FIGS. 6 and 39. The star tracking devices as described in U.S. Pat. Nos. 2,513,367 and 2,966,823 would also be suitable for operation of tracking motors 102 and 136.

One embodiment of a tracking device described in the present invention utilizes a principle whereby longitude motor 102 and latitude motor 136 are alternately rotated and each motor is alternately rotated in small increments first in one direction and then in the opposite direction by electrical pulsing means, optical focusing and radiation sensitive means being provided in star follower 5 to quickly halt such pulses of rotation whenever the star follower moves away from alignment with its selected star such that the star follower always progresses in a direction toward alignment with its selected star.

The interior of one embodiment of tracking device 5 is illustrated in FIG. 34. Lens 32 is a circular convergent lens focusing radiant energy on a small diameter circular photo-electric cell 239 centrally located in the base of telescope 5, the diameter of the focused radiant energy field from lens 32 matching the diameter of photo-cell 239 at the plane of photo-cell 239. Lens 31 is an annular convergent lens, concentric to lens 32, focusing radiant energy in a thin circular band within the inner circumference of annular photo-electric cell 238, photo-cell 238 being located in the base of telescope 5 concentric to photo-cell 239. The outer diameter of the focused radiant energy field from lens 31 is slightly smaller than the inner diameter of photo-cell 238 at the plane of photo-cell 238. When the longitudinal axis of telescope 5 is aligned with a selected star, the focused radiant energy field of circular lens 32 is concentric to circular photo-cell 239 and the focused radiant energy field of annular lens 31 is concentric to annular photo-cell 238 such that movement of the longitudinal axis of telescope 5 away from alignment with a selected star causes a decrease in radiant energy on circular photo-cell 239 and an increase in radiant energy on annular photo-cell 238. Photo-cells 238 and 239 may be photo-conductive, voltaic, or emissive. The star follower is described in more detail in the patent application Ser. No. 777,534 for a Radiant Energy Tracking Device, filed on Nov. 10, 1958, now abondoned.

One embodiment of a star tracking mechanism is illustrated in FIG. 12, although it is to be understood that any conventional star tracking apparatus could be utilized, the present state of art providing numerous devices for properly orienting a star follower with a selected star. In FIG. 12, disc 236 is rotated by motor 235 to provide electrical pulses of energy alternately to direct current shunt wound motors 102 and 136 and alternately provide pulses of energy of opposite polarity respectively to each motor such that motors 102 and 136 rotate first in one direction and then in the opposite direction. A direct current voltage source is applied to brushes # 1 and # 2 making contact with slip rings on disc 236 electrically connected to commutator segments to alternately provide pulses of energy first to brushes # 3 and # 4 then to brushes # 5 and # 6. Brushes # 3 and # 4 are respectively connected in series with normally closed contacts # 3 and # 4 of relay # 29 and in series with normally closed double-throw contacts # 3 and # 4 of relay # 31 to the armature winding of motor 136. Brushes # 5 and # 6 are respectively connected in series with normally closed contacts # 1 and # 2 of relay # 29 and in series with normally closed double-throw contacts # 1 and # 2 of relay # 31 to the armature winding of motor 102. The movable contacts of contacts # 1, # 2, # 3, and # 4 on relay # 31 are connected to the armature windings of motors 102 and 136 such that energization of relay # 31 halts operation of motors 102 and 136 by rotating disc 236 and short circuits their armature windings as illustrated to electro-dynamically brake motors 102 and 136 to a quick halt. Since motors 102 and 136 alternately rotate gimbal ring 8 and gimbal ring 6 in the navigation device (through syncros 103 and 137 as previously described in detail), the longitudinal axis of tracking device 5 either moves toward or away from the alignment with a selected star upon each pulse of motors 102 and 136. The signal output of photo-cells 238 and 239 are transformer or capacitively connected in series in the input of amplifier 237 operating relay # 31, but with opposite polarity such that an increase in radiant energy on photo-cell 239 and a decrease in radiant energy on photo-cell 238 does not energize relay # 31, but a decrease in radiant energy on photo-cell 239 and an increase in radiant energy on photo-cell 238 energizes relay # 31. Normally open contact # 5 of relay # 31 closes upon energization of relay # 31 to close an electrical circuit through resistor 242, the normally closed contacts 241 of relay # 30 to ground or a negative terminal of the voltage source operating amplifier 237 such that any momentary energization of relay # 31 locks relay # 31 in operation. Commutator segments on rotating disc 236 electrically connected to the positive slip ring make contact with brush # 7 to momentarily energize relay # 30 immediately preceding each pulse of current to brushes # 3, # 4, # 5, and # 6. Thus when motors 102 and 136 cause the longitudinal axis of telescope 5 to move toward alignment with a selected star, their operation is not interrupted by relay # 31 but when motors 102 and 136 cause the longitudinal axis of telescope 5 to move away from alignment with the selected star, energization of relay # 31 quickly halts the motors, the locking of relay # 31 in operation preventing vibratory action of relay # 31 upon halting of the motors. Rotation of disc 236 then momentarily energizes relay # 30 to unlock relay # 31 preceding the next pulse of energy to motors 102 and 136 such that the cycle of operation progressively aligns the longitudinal axis of telescope 5 with the selected star. Energization of relay # 29 during automatic transfer of navigation to a different star disconnects motors 102 and 136 from operation by rotating disc 236 as previously described and illustrated in FIG. 6. It would be preferable that normally closed contacts of relay # 29 also be provided and connected in series with the relay winding of relay # 31 to prevent energization of relay # 31 upon energization of relay # 29 during automatic transfer of navigation to a different star.

If tracking telescope 5 were directed toward a group of stars, the longitudinal axis of telescope 5 would become aligned with the star from which a maximum intensity of radiation was received, since deviation from such an alignment would cause a decrease in radiation intensity on photo-cell 239 and an increase in radiation intensity on photo-cell 238, lens 31 and photo-cell 238 providing a relatively wide angle of search to orient tracking device 5 with respect to the star from which a maximum intensity of radiation was received. Thus if radiant energy from a selected star of maximum radiation was interrupted for a considerable length of time, a large deviation from the selected ground path could occur while navigation was being maintained by the dead-reckoning computer, as previously described, and the tracking mechanism would be capable of realigning tracking telescope 5 with the selected star to accurately correct any error in navigation which had occurred. The described tracking mechanism would also be capable of tracking an artifical navigation satellite emitting radio signals, as previously described, any conventional directional receiving antenna capable of maximum signal output when aligned with the navigation satellite serving as tracking device 5, amplifier 237 amplifying the signal output of the receiving antenna to operate relay # 38 as previously described, the navigation satellite transmitting an unmodulated signal and amplifier 237 consisting of conventional radio equipment to rectify and amplify the carrier wave received from the navigation satellite.

Figure 5:
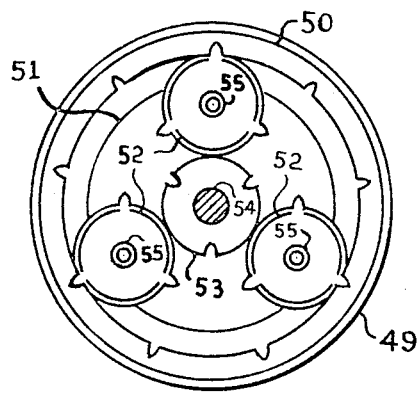
FIG. 5 is a view of gearing providing accurate transmission of shaft positions.

A planetary gear is illustrated in FIG. 5 which might provide increased positioning accuracy economically when utilized with the torquers and selsyn signal generators of the navigation device, as previously described. The gear system utilizes the conventional principle of planetary gearing, however friction drive is utilized as the pirncipal means of torque transmission with a minimum number of gear teeth of ultra precision accuracy maintaining accurate orientation of the respective gears. Driving shaft 54 rotates gear 53 to rotate disc 51 through gears 52, disc 51 being attached to the driven shaft, as previously described. A thin film of material with a high coefficient of friction on steel, such as rubber or synthetic rubber, is bonded to the driving surface of gears 52 as illustrated, the film of rubber coming in contact with the driving surface of gear 53 and surrounding gear 50. The driving surface of gears 50, 52, and 53 may be properly tapered such that translation of disc 51 and the driven shaft along the axis of the driven shaft increases or decreases the pressure between the driving surfaces of gears 50, 52, and 53. Driving shaft 54 and gear 53 are positioned axially in the planetary gear housing by tapered roller bearings, disc 51 and the driven shaft being positioned axially in the planetary gear housing by adjustable tapered roller bearings, internally or externally threaded adjusting nuts providing for axial adjustment of the adjustable tapered roller bearings in the gear housing to provide the proper pressure between the driving surfaces of the respective gears. Gears 52 are positioned axially by tapered roller bearings on the short shafts supporting gears 52 on disc 51. Axial adjustment of the tapered roller bearings supporting gears 52 and shaft 54 would probably be unnecessary except to eliminate wobble and end play. A minimum number of ultra precision cogs are provided on gears 52 to engage matching ultra precision recesses in gears 50 and 53 to accurately maintain orientation of the respective gears. The surfaces of the driving or orienting cogs and recesses would not necessarily be tapered axially although they could be very slightly tapered axially to eliminate backlash through axial adjustment of disc 51 and the driven shaft as previously described. A thin film of rubber might also be bonded to the driving surfaces of gears 50 and 53 although it probably would be unnecessary.

DESTINATION SETTING MEANS

An embodiment of destination setting means utilizes a principle whereby destination setting discs are rotatably mounted on longitude and latitude indicating shafts of the navigation system, means being provided to adjust the destination setting discs to the longitude and latitude of a selected destination in degrees and minutes, similar discs being attached to the longitude and latitude indicating shafts of the navigation system with electrical contact means between adjacent pairs of discs to provide an electrical pulse of energy to activate any desired apparatus when the craft arrives at a preselected destination. Disc 74 in FIG. 7 is attached to shaft 78 while disc 75 is attached to shaft 79 and driven at a 360 to 1 gear ratio by shaft 78, the position of discs 74 and 75 then corresponding to the longitude of the craft in minutes and degrees respectively. Disc 70 is mounted on shaft 78 by roller bearings as illustrated to rotate freely, disc 71 being mounted in an identical manner on shaft 79 with a 360 to 1 gear ratio between discs 70 and 71. Shaft 85 adjusts discs 71 and 70 through electro-magnetic clutch 83 and the illustrated gear drive to the longitude of some destination as described later, it being understood that the gear drive could be applied directly to disc 71 as illustrated or directly to disc 70 in a similar manner. Discs 76 and 77 are attached to shafts 80 and 81, their position corresponding to the latitude of the craft in minutes and degrees respectively. Discs 72 and 73 are mounted by roller bearings on shafts 80 and 81 to rotate freely, as illustrated for disc 70, and their position adjusted to the latitude of some destination respectively in minutes and degrees through shaft 89, electro-magnetic clutch 87 and the illustrated gear drive similarly as discs 70 and 71. A detail of discs 73 and 77 is shown in FIG. 8. Brushes 190 and 191 make contact with slip rings on the face of disc 73 which in turn are connected to brushes 192 and 193 attached to the opposite face of disc 73. Brush 193 makes contact with a slip ring on the face of disc 77. the slip ring being electrically connected to commutator segment 194 on disc 77. Thus when brush 192 makes contact with commutator segment 194 on the face of disc 77, an electrical circuit is closed between brushes 190 and 191. Discs 72, 76, 70, 74, 71, and 75 are constructed in an identical manner. The brushes of the longitude and latitude discs may be connected in series respectively but in parallel collectively as illustrated in FIG. 8 so a selected destination may be established on either the longitude or latitude discs at which some device is automatically operated, or all the discs may be connected in series as illustrated in FIG. 29 so a selected destination must be established on both the longitude and latitude discs. Provision is made for automatic adjustment of multi-section, multi-position switch 195 when the craft arrives at a pre-set destination. A voltage source is connected in series with the brushes of the destination setting discs and in series with normally closed contacts 199 of relay 198 to operate motor 196 when the craft arrives at a pre-set destination as illustrated in FIG. 8, motor 196 then adjusting switch 195 through an appropriate gear drive to the next incremental position where a voltage source connected to the rotor of one section of switch 195 energizes relay 198 to halt operation of motor 196. Any number of sets of similar destination discs may be provided to operate motor 196 through additional relays similar to relay 198 such that switch 195 is rotated through a series of incremental positions as the craft arrives at a series of pre-set destinations.

In FIG. 8, energization of relay 202 and adjustment of switch 195 upon arrival at a selected destination provides automatic transfer of navigation to a different star similarly as energization of relay 202 and adjustment of switch 64 provide automatic transfer of navigation to a different star in FIG. 6. Relay # 29 in FIG. 12 is energized and performs the same functions similarly as relay # 29a and # 29b in FIG. 6 and in addition de-energizes electro-magnetic clutches 105 and 94 in FIG. 7 and energizes electro-magnetic clutch 104 in FIG. 7 during automatic transfer of navigation to a different star such that motor 102 rotates selsyn transmitter 103 through speed increasing gears 106 and 107 to provide rapid transfer of navigation to a different star, as previously described. Terminals # 19 and # 20 of normally open contacts # 2 of relay 202 in FIG. 9 are connected respectively to terminal # 19 and # 20 in FIG. 12 to provide the previously described operation of the various relays as illustrated in FIG. 6. Thus switch 195 in FIG. 8 may be utilized to automatically transfer navigation to a proper star at a selected destination to achieve convergent orientation of the gimbal systems of the star follower with respect to True North and a true vertical by computer 55 as previously discussed. Obviously appropriate contacts of switch 195 could also be utilized to properly reverse torquing of gimbal ring 27 by conventional True North seeking gyroscope means in FIG. 6 at a selected destination where navigation was transferred from a star West of the craft's zenith to a star East of the craft's zenith or vice versa to achieve convergent orientation of the gimbal systems of the star follower with respect to True North and a true vertical by computer 55 as previously described, the proper torquing of gimbal ring 27 then providing proper operation of the True North seeking gyroscope under the stated conditions as previously described. Obviously switch 195 in FIG. 8 could also be used in combination with switches similar to switch 64 in FIG. 6 to provide both automatic transfer of navigation to a different star at a selected destination and to provide automatic transfer of navigation to a different star at predetermined limits of adjustment of gimbal ring 8 with respect to gimbal ring 6. Switch 195 in FIG. 8 may also be connected to automatic guidance means to provide automatic guidance through a series of pre-set destinations and flight conditions as described later.

The memory unit in computer 55 might be a cubical memory unit with access to appropriate memory elements in three dimensional X, Y, and Z coordinates, the X and Y coordinates providing values of the Earth's magnetic field as a function of the craft's longitude and latitude, and the Z coordinate providing values of the Earth's magnetic field as a function of the craft's altitude above the surface of the Earth. Conventional interpolating means could provide intermediate values not specifically stored in the computer memory. Thus three such memory units would be required, one for deviation of Magnetic North from True North, one for inclination of the Earth's magnetic lines of force in an East-West direction, and one for inclination of the Earth's magnetic lines of force in a North-South direction as previously described. Diurnal variation in azimuth and inclination of the Earth's magnetic field at the selected destination could be properly compensated for by non-linear variable resistors or other convention resolvers in computer 55 properly adjusted by a chronometer motor to properly orient frame 1 and gimbal ring 2b in FIG. 6 as previously described. If it were desired to compensate for diurnal variation of the Earth's magnetic field over the entire route of the craft and the diurnal variation differed significantly over various portions of the route, a series of non-linear variable resistors or other conventional resolvers could be adjusted by a chronometer motor with switch 195 of FIG. 8 (or FIG. 29 as described later) connecting the appropriate resolvers into the positioning circuits of computer 55 at appropriate destinations to precisely orient frame 1 and gimbal ring 2b as previously described over the entire route of the craft.

THE GUIDANCE SYSTEM

The Earth's magnetic lines of force might be replaced as a reference for determining true north by a second star tracking mechanism similar to FIGS. 1 and 2 tracking a polar star such as the north star. A star tracking device similar to tracking device 5 would then be mounted in a second tracking mechanism similar to FIGS. 1 and 2 with gimbal ring 6 being replaced by the second star tracking device such that the second star tracking device could simply be aligned in azimuth and altitude to the north star. A positioning circuit similar to circuits # 9 and # 10 in FIG. 12 would then be employed to initially adjust the altitude of the second star tracking device with respect to gimbal ring 2b in accordance with the craft's latitude, the second star tracking device thus being adjusted parallel to the plane of ring 2b at 0° latitude and perpendicular to the plane of ring 2b at 90° latitude. The earth's magnetic field and computer 55 would serve to initially orient the frame of the second tracking mechanism with respect to true north identically as frame 1 in FIG. 6 is oriented after which a tracking apparatus similar to tracking apparatus 56 in FIG. 6 would track the north star through the use of appropriate relays similar as tracking device 5 in FIG. 6 is initially oriented with a selected star. Thus the dead-reckoning computer would also serve to properly orient the second star tracking device with respect to the north star when radiant energy from the north star were temporarily interrupted in a manner similarly as tracking device 5 is properly oriented with its selected star under similar conditions. An auxiliary computer memory would be employed providing the deviation in azimuth of the north star from true north as function of time and the craft's longitude and latitude to properly orient frame 1 in FIG. 6 with respect to true north when the north star were used as a bearing reference similarly as the memory unit of computer 55 is utilized to orient frame 1 when the earth's magnetic field is used as a bearing reference. The present state of art provides many types of polar star trackers which may be utilized in determining true north.

The guidance apparatus of the present invention is similar to that as described in U.S. Pat. No. 3,249,326 from Column 41, line 65 to Column 69, line 26 inclusive.

POSITION AND ROUTE INDICATOR

In some cases it is necessary that a pilot have at his disposal a selection of different maps or types of maps, perhaps some of a limited area in magnified detail etc., therefore an apparatus is illustrated in FIG. 29 enabling a pilot to conveniently and rapidly select such maps. A translucent projection screen is provided in the pilot's compartment upon which conventional projection means may project a series of maps, the projector being positioned on the opposite side of the screen from the pilot. Conventional precision positioning means may be utilized to accurately position the map film in the projector through chart selection means. A craft position projector 379 and route projector 380 are further located on the opposite side of the projection screen from the pilot, the position projector and route projector being adjustable horizontally and vertically with respect to the projection screen by longitude and latitude servo means responsive to the craft's actual longitude and latitude as determined by the navigation system. The chart selection means further adjusts multi-pole, multi-position switch 262 in accordance with the selected chart to connect appropriate scale and calibration resistances into the longitude and latitude servo means, the scale and calibration resistance means being pre-adjusted such that position projector 379 properly indicates the craft's position on the selected chart and route projector 380 properly indicates the craft's route from the indicated position on the selected chart, azimuth selection means 256 rotating the route projector 380 in accordance with the selected route.

The mechanism for adjustment of position projector 379 and route projector 380 with respect to the projected map is illustrated in more detail in FIG. 27 and 28. Assembly 367 is adjustable horizontally on supporting frame 366 by selsyn signal generator and motor 370 attached to the under side of assembly 367 to rotate gears meshing with gear racks 369 on the upper and lower channels of frame 366, bearings attached to the under side of assembly 367 supporting the adjusting shafts of motor 370. Assembly 367 is supported on frame 366 by rollers attached to assembly 367 rolling on the upper and lower channels of frame 366 and the gears meshing with gear racks 369. Assembly 374 is adjustable vertically on assembly 367 by selsyn signal generator and motor 377 attached to the upper side of assembly 374 rotating gears meshing with gear racks 378 on each side of assembly 367, the adjusting shaft being supported by bearings attached to the under side of assembly 374 and rotated either directly or through appropriate gears, such as gears 375 and 376, by motor 377. Assembly 374 is supported on assembly 367 by rollers 372 attached to assembly 374 rolling on the under side of assembly 367, rollers 373 attached to assembly 374 rolling on parallel bars 371 attached perpendicular to the under surface of assembly 367 as illustrated, and the gears meshing with gear racks 378. The rollers attached to assembly 367 are arranged to support assembly 367 on frame 366 similarly as the rollers attached to assembly 374 are arranged to support assembly 374 on assembly 367. Position projector 379 is attached to the upper surface of assembly 374 and may consist of conventional projection means such as a conventional light source, conventional reflector, and conventional lens system to focus light rays in a small diameter circle on the projected map to indicate the craft's position. Route projector 380 is supported on the upper surface of assembly 374 by bearings and rotated by selsyn signal generator and motor 381 similarly as frame 33 is supported and rotated on mounting plate 47 in FIG. 4, brushes making contact with slip rings attached to the adjusting shaft to provide a voltage to the light source in a conventional manner, the axis of rotation of route projector 380 intersecting the craft's indicated position on the projected map. Route projector 380 may consist of conventional projection means such as a conventional light source, conventional reflector and lenses to provide parallel rays of light through a radial slit extending from the axis of rotation of route projector 380 to the cylindrical housing of projector 380, and a conventional lens system to project the radial slit on the projected map with appropriate magnification to indicate the craft's route from the craft's position on the projected map. The maps might be projected on the projection screen in color and the craft's position and route projected on the screen in a contrasting color to clearly indicate the craft's position and route on the projected map.

Positioning circuits # 15 and # 16 in FIG. 24 are similar to positioning computer circuits # 7 and # 8 in FIG. 12 and serve to properly position assembly 367 on frame 366 in FIGS. 27 and 28, circuits # 15 and # 16 operating motor 342 to adjust linear variable resistors # 98 and # 99 to balance circuits # 15 and # 16 at a zero signal output, motor 342 further rotating selsyn signal transmitter 343 to properly adjust selsyn signal generator and motor 370 through phase sensitive amplifying means in a conventional manner. Linear positioning variable resistors # 94 and # 95 in circuits # 15 and # 16 are adjusted by the craft's longitude as determined by the navigation means, identical scale variable resistors # 96 and # 97 are identically adjusted by scale selection means in accordance with the scale of a selected map and connected into circuits # 15 and # 16 by multi-pole, multi-position switch 262 as illustrated, and linear calibration variable resistors # 92 and # 93 are connected into circuits # 15 and # 16 by switch 262 as illustrated, rotor contacts of switch 262 being connected to circuits # 15 and # 16 such that each position of switch 262 connects a different set of pre-adjusted scale and calibration variable resistances into circuits # 15 and # 16. Scale variable resistances # 96 and # 97 appropriately decrease in resistance with increasing scale of the selected maps.

Positioning circuits # 17 and # 18 in FIG. 24 are similar to circuits # 15 and # 16 and serve to properly position assembly 374 on assembly 364, circuits # 17 and # 18 operating motor 344 to adjust linear variable resistors # 110 and # 111 to balance circuits # 17 and # 18 at a zero signal output, motor 344 further rotating selsyn signal transmitter 345 to properly adjust selsyn signal generator and motor 377 in a conventional manner, however identical scale variable resistors # 108 and # 109 are connected into the lower legs of circuits # 17 and # 18 as illustrated, resistors # 108 and # 109 being center-tapped and adjusted by the craft's latitude as determined by the navigation means to provide minimum resistance at 0° latitude and appropriately increase in resistance with latitude to properly position assembly 374 on assembly 367 in accordance with rectangular coordinates of longitude and latitude. Linear positioning variable resistors # 104 and # 105 are adjusted by the craft's latitude as determined by the navigation means, identical scale variable resistors # 106 and # 107 are identically adjusted in accordance with the scale of the selected maps and connected into circuits # 17 and # 18 by switch 262, and linear calibration variable resistors # 102 and # 103 are connected into circuits # 17 and # 18 by switch 262 similarly as previously described for circuits # 15 and # 16. Thus the different sets of calibration and scale variable resistances may be respectively preadjusted to the selected maps such that the craft's actual position and route are properly indicated on any selected map.

THE CONTROL PANEL

A control panel 428 with a central selective system for setting various values into the navigation control is illustrated in FIG. 36. Azimuth selection dial 256 and speed selection dial 259 have dial pointers as illustrated and previously described for convenient and rapid establishment of a selected azimuth and speed, toggle switches 272 operating an electric motor 291 as previously described to rapidly adjust dials 256 and 259, knobs 267 and 269 respectively providing fine adjustment of dials 256 and 259 upon release of toggle switches 272. Speed selection dial 259 may be coupled to directly adjust speed selection resistors # 80 and # 81 in FIG. 7 as previously described. Rectangular openings 469 and 470 in panel 428 respectively provide visual indication of the craft's latitude in degrees and minutes on horizontal drum dials 472 and 473, in FIG. 37, drums 472 and 473 being rotated by two concentric shafts from planetary gearing 434 in accordance with the craft's latitude as determined by the navigation system. Rectangular openings 467 and 468 in panel 428 similarly provide visual indication of the craft's longitude in degrees and minutes as determined by the navigation system. If desired, conventional computing means could be provided to indicate the distance to a selected destination through rectangular opening 471 in a similar manner. Toggle switch 273 provides for turning the automatic guidance system on or off, toggle switch 277 provides for turning the automatic navigation system on or off, toggle switch 274 provides for initial orientation of the star tracker to the selected star as previously described and might also be used for dead-reckoning navigation when turned on. Toggle switch 281 provides for turning the position projector 379 on or off, toggle switch 282 provides for turning the route projector 380 on or off, and toggle switch 283 provides for either automatic adjustment of speed selection dial 259 to the craft's actual ground speed or automatic adjustment of the craft's ground speed to that selected by dial 259. Toggle switch 275 a provides for conversion of the automatic guidance circuits to azimuth control circuits of a conventional auto-pilot as previously described and illustrated in FIG. 33, and toggle switch 274 provides for turning azimuth computer 46 on or off. Normally open contacts of switch 275 a could be connected to relay #39 and contact #2 of relay #38, similarly as illustrated for switch 273 in FIG. 6, such that when switch 275 a were operated to convert the guidance circuits to azimuth control circuits of a conventional auto-pilot, relay #39 would be energized upon temporary interception of radiant energy to the star tracker to properly maintain navigation and orientation of the star tracker with the selected star through the dead-reackoning computer as previously described. Normally closed contacts of relay #39 in FIG. 6, similar to contacts #4, would be provided to disconnect longitude motor 117 and latitude motor 152 from respective operation by longitude circuits #1b, #2b and latitude circuits #3b, #4b in FIG. 33, and normally open contacts of relay #39, similar to contacts #3, would be provided to connect terminals #70, #71 and terminals #72, #73 in FIG. 30 respectively to the armature winding of longitude motor 117 and latitude motor 152 upon energization of relay #39 such that normal dead-reckoning computer operation of motors 117 and 152 would be provided upon energization of relay #39 to properly maintain navigation and orientation of the star tracker with the selected star. If a star tracker similar to that illustrated in FIG. 34 were utilized, normally closed contacts of a first relay operated by photo-cell 238 would be connected in series with normally closed contacts of a second relay operated by photo-cell 239 to a voltage source and relays 202 and #38 such that de-energization of both the described first and second relays upon temporary interception of radiant energy to the star tracker would cause energization of relays 202 and #38 as indicated in FIG. 6. Thus regardless of the position of switches 275 a or 273, proper navigation and orientation of the star tracker with the selected star would be maintained by the dead-reckoning computer upon temporary interception of radiant energy to the star tracker.

A partial cross-sectional view of control panel 428 in FIG. 36 illustrating details of the central selective system is illustrated in FIG. 37. The central selective system consists primarily of a master serve control operated by a Wheatstone bridge circuit #27 – #28 to set desired parameters into the navigation and guidance system such is sidereal hour angle and declination of stars for navigation, longitude and latitude of destinations, etc. Parameter setting means are provided to adjust a variable resistor in the Wheatstone bridge circuit to a desired value, indicating means indicating the value to which the parameter setting means has been adjusted. Any of a series of adjustable parameter elements may then be adjusted by the master servo control to the indicated value set into the master serve control, multi-position selection means or switches 432 and 433 being utilized to connect a variable resistor of the parameter element being adjusted into the Wheatstone bridge circuit, the multi-position selection means or switches further providing adjustment of the desired parameter element by a meter 291 of the master serve control through a series of electro-magnetic clutches until the Wheatstone bridge circuit is properly balanced at its null point, the selected parameter element then being properly adjusted to the indicated value set into the master serve control. The multiple position selection means includes a series selection means 432 and an individual selection means 433, the series selection means providing selection of any one series out of more than one series of paramter elements, and the individual selection means providing selection of any one individual parameter element out of more than one parameter element in any one series of parameter elements. A push button 431 is provided to activate the Wheatstone bridge circuit after the master servo control has been adjusted to the desired value and the parameter element to be adjusted has been selected. Upon activation, the Wheatstone bridge circuit locks the push button in operation until the Wheatstone bridge circuit is properly balanced at its null point, unlocking of the push button by solenoid 443 indicating that the selected parameter element has been adjusted to the desired value. Rectangular push button 430 in FIG. 37 slides in a rectangular opening of panel 428 to operate a pawl 448 engaging teeth 439 in a ratchet wheel on vertical drum dial 435 to rotate dial 435, digital numbers 0 through 9 being provided on the surface of drum 435 which are visible through rectangular opening 429 in panel 428, rotation of drum dial 435 adjusting a variable resistance in the master serve control Wheatstone bridge circuit #27 – #28 . in a manner to be described. Bracket 441 is attached to panel 428 to support a guiding rod upon which push button 430 slides as illustrated, spring 440 returning push button 430 to an outward limiting position when pressure is released from push button 430 such that pawl 448 engages the next tooth in the ratchet wheel. A semi-spherically rounded end of spring 437 fits into matching semi-spherical depressions in the side of drum dial 435, spring 437 being attached to panel 428 such that spring 437 properly positions the digits on drum dial 435 within the rectangular opening 429. A partial cross section through the drum dial 435 and variable resistor 450 is illustrated in FIG. 38. Bracket 436 is attached to panel 428 to support variable resistor 450 and drum dial 435 in proper position on panel 428 such that the digits on drum dial 435 are visible through rectangular opening 429. Rotor shaft 451 of variable resistor 450 is attached to the center of drum dial 435, spring contact 452 being attached to the resistor housing or bracket 436 to make contact with the end of rotor shaft 451, spring contact 452 being properly insulated from its mounting to constitute the rotor terminal of variable resistor 450. Rotor brush 449 is attached to rotor shaft 451 to make contact with identically spaced contacts 453 connected to the resistance element of resistor 450 such that push button 430 may adjust resistor 450 in identically equal increments of resistance. Depressions 438 might be located on drum dial 435 to provide respective contact of brush 449 on one, two, three, or more adjacent contacts 453, corresponding to a similiar number of digits, with a single push of push button 430 thus providing convenient and rapid adjustment of resistor 450. A similar push button 430, rectangular opening 429, drum dial 435, and variable resistor 450 is provided for each digit of selected degrees and minutes as illustrated in FIG. 36, all the variable resistances being connected in series and appropriately varying respectively in units of 10, 100, 1,000, 10,000, and 100,000 ohms resistance. For example, a setting of 156 degrees, 30 minutes might be represented by a total adjusted resistance of 156,500 ohms, the degrees being represented by thousands of ohms, 30 minutes being one half a degree, and therefore 30 minutes being represented by the corresponding fraction of 1,000 equalling 500 ohms. Obviously the minute resistance drums could appropriately vary in fractional increments of resistance such that the digits on the minute drums would read directly in minutes of angle, the digits on the degree resistance drums of course reading directly in degrees of angle. Rows of push buttons operated similarly as the keys of an adding machine might be utilized to make electrical connection to appropriate fixed resistances, however the described selection means would occupy a minimum of space on the control panel. The total resistance of the selection dials is then connected into wheatstone bridge positioning circuits # 27 and # 28 to accurately position any desired device similarly as previously described, circuits # 27 and # 28 respectively operating relays # 45 and # 46 to respectively rotate motor 291 in opposite directions of rotation through double-pole double-throw contacts # 1 and # 2 of the said relays. The armature of direct current motor 291 is connected to the movable contacts # 1 and # 2 of relays # 45 and # 46, the normally closed contacts # 1 and # 2 of the said relays being short circuited through normally closed contacts of toggle switch 272 of dial 256 in series with normally closed contacts of toggle switch 272 of dial 259 to provide electro-dynamic braking of motor 291 upon de-energization of relay # 45 or # 46, operation of motor 291 by toggle switches 272 as previously described disconnecting the described electro-dynamic braking of motor 291 until toggle switches 272 are released to their neutral position. A normally closed single-pole single-throw contact operated by relay # 45 would be connected in series with the short-circuiting of motor 291 by relay # 46, and a normally closed single-pole single-throw contact operated by relay # 46 would be connected in series with the short-circuiting of motor 291 by relay # 45 (similarly as indicated by the normally closed contacts of switch 272 in FIG. 37), such that energization of either relay # 45 or # 46 by circuit # 27 # 28 would disconnect the electro-dynamic braking of motor 291.

Rectangular push button 431 in FIG. 37 slides in a rectangular opening of panel 428 to short circuit terminals 446 and 447 when depressed, spring 442 being attached to bracket 441 to return push button 431 to an outward limiting position, contact arm 444 also being attached to bracket 441 as illustrated. An operating voltage source is connected through terminals 446 and 447 to operate circuits # 27 and # 28 when push button 431 is depressed, the resulting energization of relays # 45 or # 46 closing normally open contacts # 3 of relay # 45 or # 46 to connect a voltage source energizing solenoid 443 to lock push button 431 in a depressed position until circuits # 27 and # 28 are properly balanced at a zero signal output. Soft iron core 445 embedded in push button 431 provides the described locking of push button 431 in a depressed position by solenoid 443. A multiple series of clutch means is provided, each clutch in the multiple series of clutch means having a driving element and a driven element, further clutch means being responsive to series selection switch 432 and in the master servo control means to rotate the driving elements in any one series of the multiple series of clutch means. Individual selection switch 433 may then engage the driven element in any one clutch of the series of clutch means selected by the series switch 432 to properly adjust a parameter element selected by series switch 432 and individual switch 433. Thus motor 291 may respectively rotate bevel spur gears 445 and 456 through bevel spur gears 454 and either electromagnetic clutches 457 or 458, spur gears 455 adjusting either linear variable resistors 463 and shaft 474 or linear variable resistors 464 and shaft 475 respectively through electro-magnetic clutches 459 or 460, and spur gears 456 adjusting either linear variable resistors 465 and shaft 476 or linear variable resistors 466 and shaft 477 respectively through electro-magnetic clutches 461 or 462. Normally open contacts # 3 of relays # 45 and # 46 are connected to rotor contact # 1 of a section of multi-pole, multi-position series selector switch 432, contact # 3 of switch 432 being connected to clutch 457 and rotor contact # 1 of multi-pole, multi-position individual selector switch 433, contact # 5 of switch 433 being connected to clutch 459, contact # 9 of switch 433 being connected to clutch 460, contact # 5 of switch 432 being connected to clutch 458 and rotor contact # 2 of switch 433, contact # 6 of switch 433 being connected to clutch 462, and contact # 10 of switch 433 being connected to clutch 461 as illustrated. Rotor contact # 1 of switch 433 engages either contact # 3 or # 5, rotor contact # 1 of switch 433 engages either contact # 5 or # 9, and rotor contact # 2 of switch 433 engages either contact # 6 or # 10, therefore when switch 432 is adjusted counterclockwise to energize clutch 457 upon energization of relay # 45 or #46, shaft 474 and resistors 463 are adjusted by motor 291 when switch 433 is adjusted counter-clockwise to energize clutch 459, and shaft 475 and resistors 464 are adjusted by motor 291 when switch 433 is adjusted clockwise to energize clutch 460. Similarly when switch 432 is adjusted clockwise to energize clutch 458 upon energization of relay # 45 or # 46, shaft 477 and resistors 466 are adjusted by motor 291 when switch 433 is adjusted counter-clockwise to energize clutch 462, and shaft 476 and resistors 465 are adjusted by motor 291 when switch 433 is adjusted clockwise to energize clutch 461. Resistors 463, 464, 465, and 466 are similarly connected into positioning circuits #27 and #28, rotor contacts of switch 432 similar to contact #2 being connected to circuits #27 and #28, rotor contacts of switch 433 similar to contacts #3 and #4 being respectively connected to contacts of switch 432 similar to contacts #4 and #6, and contacts of switch 433 similar to contacts #7, #11, #8, and #12 being respectively connected to resistors 463, 464, 477, and 476 such that the set of resistors being adjusted by motor 291 are connected into positioning circuits #27 and #28 to balance circuits #27 and #28 at a zero signal output when the resistance of said resistors equals the total resistance of the selection dials 435. Thus individual switch 433 may be utilized for setting the longitude and latitude of a selected destination, and series switch 432 may be utilized to set any number of selected destinations into the control system, linear variable resistors of the type illustrated in FIG. 35 being adjusted by the desired parameter, the described linear variable resistors being connected into positioning circuits #27 and #28 of FIG. 37 and adjusted to a desired value by the central selective system of FIG. 36 and 37 similarly as variable resistors 463, 464, 465, and 466 in FIG. 37. Any other desired variable such as sidereal hour angle and declination of various selected stars may be set into the control in a similar manner, the selection dials 435 being adjusted to the desired value, switches 432 and 433 being adjusted to the desired variable, and push button 431 then being depressed to set the desired variable into the navigation control, push button 431 popping out when the desired variable has been properly set into the control system.

Selection dials 435 may also be used to select desired altitudes at selected destinations through utilization of positioning circuits #13 and #14 in FIG. 20. Since computer 55 in FIG. 6 determines a horizontal reference with respect to the Earth's surface, conventional computing means may be utilized in computer 55 to determine the attitude of the craft's longitudinal axis with respect to the Earth's surface and adjust linear variable resistor 328 in circuits #13 and #14 accordingly, resistor 328 being adjusted midway between maximum and minimum resistance when the craft's longitudinal axis is parallel to the Earth's surface. Linear variable resistors 327 or any similar resistors may be connected into circuits #13 and #14 by switch 195 at selected destinations, rotor contacts of switch 195 being connected to circuits #13 and #14. Circuits #13 and #14 operate relays #32 and #33 as previously described to rotate motor 329 in the proper direction to properly adjust variable resistors #90, #91, and the horizontal control surfaces of the craft through shaft 368. Circuits #13 and #14 are then properly balanced by resistors #90 and #91 as the craft's longitudinal axis is adjusted to an attitude with respect to the Earth's surface determined by resistors 327 or similar resistors whereupon the elevator control surfaces will have a zero angle of attack. In the guidance of a craft in a ballistic trajectory, resistances 327 may be connected into circuits #13 and #14 by switch 195 at take-off which are adjusted by conventional computing means in accordance with a proper function of the craft's acceleration, velocity, and selected range, while at some pre-determined destination as the craft re-enters the Earth's atmosphere switch 195 may connect resistors into circuits #13 and #14 adjusted by conventional computing means to maintain a proper glide path to reach the selected destination at a selected altitude. In the guidance of a conventional aircraft, any conventional altitude determining means may be used in conjunction with positioning circuits #13a and #14a (not illustrated) similar to circuits #13 and #14 such that circuits #13a and #14a are balanced by linear variable resistors adjusted to a selected altitude and by linear variable resistors adjusted to the actual altitude of the craft, circuits #13a and #14a operating relays #32a and #33a (not illustrated) similarly as circuits #13 and #14 operate relays #32 and #33. Normally closed double-pole, double-throw contacts of relay #32a are connected in series with normally closed double-pole, double-throw contacts of relay #33a to connect proper fixed resistances into circuits #13 and #14 which maintain the craft's longitudinal axis parallel to the Earth's surface when relays #13a and #14a are de-energized. Normally open double-pole, double-throw contacts of relay #13a connect fixed resistances into circuits #13 and #14 upon energization of relay #13a to maintain the craft's longitudinal axis in a proper angle of climb, and normally open double-pole, double-throw contacts of relay #14a connect fixed resistances into circuits #13 and #14 upon energization of relay #14a to maintain the craft's longitudinal axis in a proper angle of glide until the craft's actual altitude equals the craft's selected altitude, switch 195 being utilized to connect variable resistors pre-adjusted to selected altitudes into circuits #13a and #14a rather than into circuits #13 and #14 at selected destinations.

Variable resistors #1 and #2 in FIG. 7 could be initially adjusted to a midway position between maximum and minimum resistance by the central selective system of FIG. 36, variable resistors #3 and #4 then being also initially adjusted to a midway position between maximum and minimum resistance upon operation of switch 275a in FIG. 36. However, it would be more appropriate that variable resistors #1, #2, #45, #46, #11, #12 and all similar resistors be of the type illustrated in FIG. 35, gear 113 in FIG. 7 then adjusting the rotor of resistors #45 and #46 and gear 130 adjusting the resistor housing of resistors #45 and #46 similarly as previously described and illustrated, gear 180 adjusting the rotor of resistors #1 and #2 and gear 130 also adjusting the resistor housing of resistors #1 and #2 similarly as described for resistors #45 and #46, gear 144 adjusting the rotor of resistors #11 and #12 and gear 165 adjusting the resistor housing of resistors #11 and #12 imilarly as described for resistors #45 and #46. Variable resistors #3, #4, #13, and #14 would then be eliminated, clutch 91 would be eliminated, and the rotor of resistors #1 and #2 would simply be adjusted to the initial longitude of the craft, variable resistors #1, #2, #11, and #12 then being initially adjusted midway between maximum and minimum resistance upon operation of switch 275a when such described variable resistors were utilized in circuits #1a, #2a, #3a, #4a, #1b, #2b, #3b, and #4b of FIG. 33 similarly as previously described and illustrated. Variable resistors #1, #2, #11, and #12 would then continue to be adjusted midway between maximum and minimum resistance at all times when the craft was on the selected route as determined by the dead-reckoning computer and the craft's ground speed equalled the selected speed. Since gear 130 would then adjust the resistor housing of resistors #45 and #46 to the craft's longitude, gear 113 in FIG. 7 adjusting the rotor of variable resistors #45 and #46 would then also adjust the rotor of a linear variable resistor of the type illustrated in FIG. 35 connected into positioning circuits #27 and #28 in FIG. 37 by the central selective system of FIGS. 36 and 37, such that the central selective system of FIGS. 36 and 37 could be utilized to initially adjust gear 113 to Greenwich Meridian Time at the start of the operation, chronometer motor 108 in FIG. 7 maintaining proper alignment of gear 113 with respect to time as previously described. Variable resistors #45 and #46 would then be properly adjusted in resistance such that positioning circuits #9 and #10 in FIGS. 6 and 12 would properly orient the star follower 5 with the Sun or any selected star upon initial operation of the system or during automatic transfer or navigation of a different star as previously described. The hours of Greenwich Meridian Time would then simply be represented by digits of from 0 to 24 and the hour and minutes set by push buttons 430. The resistor housing of resistors #45 and #46 could also be adjusted by gear 180 rather than by gear 130 thus perhaps eliminating some error in the adjustment of resistors #45 and #46 since the craft's desired longitude as determined by gear 130 would not always be precisely equal to the craft's actual longitude as determined by gear 180. Shaft 69 in FIG. 6 could then also be initially adjusted to Greenwich Meridian Time similarly as gear 113 in FIG. 7, although adjustment of gear 113 to Greenwich Meridian Time would be the preferred manner of operation as previously described.

In determining a selected route to a selected destination without the aid of azimuth computer 46, it would simply be necessary for the pilot to adjust azimuth selection dial 256 until the craft's projected route intersected the desired destination on the projected map selected by map selector switch 262.

ELECTRO-MECHANICAL LONGITUDE DIFFERENTIAL

The fundamental principle of modifications in the navigation system illustrated in FIG. 39 having been briefly described in the introductory summary, the modifications are described in more detail in the following specification. The gimbal mounted star tracking element 5 and magnetic inclination seeking element 41 in FIG. 39 are identically the same as illustrated in FIG. 6 with the exception of some minor modifications to be described. Positioning circuits #9a and #11a and the associated relay mechanism for automatically transferring navigation to a different star in FIG. 39 are also the same as in FIGS. 6 and 12, although conventional servo amplifier circuits may be utilized such that circuit #9a (similar to circuit #9 in FIG. 12) and circuit #11a (similar to circuit #11 in FIG. 12) may be utilized to operate the associated relays #19, #20, #21, and #22 similar as in FIG. 6. (Circuit #29 in FIG. 40 illustrates one manner of operating a dual system of such relays from a single Wheatstone bridge circuit as described later.) A preferred manner of adjusting resistors #45a and #51a in circuit #9a is illustrated in FIG. 39 (resistors #45a and #51a in FIG. 39 corresponding to resistors #45 and #51 in circuit #9 of FIG. 12) enabling circuit #9a to be utilized as a positioning circuit to both provide proper reorientation of gimbal ring 8 in sidereal hour angle during automatic transfer of navigation to a different star and to provide electronic differentiation of the hour angle of gimbal ring 8 with respect to Greenwich Meridian Time to determine longitude of the craft, circuit #9a in FIG. 39 thus serving the function of circuits #9, #10, #25, and #26 in FIG. 6.

In FIGS. 6 and 7, variable resistor #51 was adjusted by motor 102 in accordance with the position of gimbal ring 8 with respect to gimbal ring 6 as previously described and illustrated. however, in FIG. 39 motor 102 adjusts the rotor of multi-turn linear variable resistor #51a while chronometer motor 108 adjusts the housing of resistor #51a in accordance with Greenwich Meridian Time. In FIGS. 6 and 7, variable resistor #45 was differentially adjusted by the craft's longitude and Greenwich Meridian Time, however, in FIG. 39 the motor of multi-turn linear variable resistor #45a may be adjusted in accordance with the longitude of the craft by motor 65 through electro-magnetic clutch 66, the housing of resistor #45a being fixed, circuit #9a operating motor 65 and clutch 66 through appropriate relays to balance circuit #9a at the null point in accordance with the adjusted resistance of resistor #51a. Therefore relay #47 in FIG. 39 is energized similar as relay #29a in FIGS. 6 and 39 upon transfer of navigation to a different star as previously described, the energizing coil of relay #47 being electrically connected in parallel with the energizing coil of relay #29a. The movable contacts of double-pole double-throw contacts #1 and #2 of relay #47 are connected to the normally open double-pole single-throw contacts #1 and #2 of relays #19 and #20 as illustrated, motor 65 being connected to the normally closed contacts #1 and #2 of relay #47, and motor 102 being connected to the normally open contacts #1 and #2 of relay #47. Thus when relay #47 is de-energized during normal operation of the navigation systems, circuit #9a may operate motor 65 to adjust resistor #45a and shaft 68 to the determined longitude of the craft through clutch 66, and upon energization of relay #47 during automatic transfer of navigation to a different star circuit #9a operates motor 102 to adjust resistor #51a to the sidereal hour angle of the new star, inertial navigation means or the dead-reckoning computer providing adjustment of resistor #45a to the longitude of the craft during transfer of navigation to a different star (similarly as previously described). (Relay #29a disconnects motor 102 and 136 from operation by the star tracker during automatic transfer of navigation to a different star similarly as previously described.) In FIG. 39, the sidereal hour angle of gimbal ring 8 is transmitted through shaft 505 to refraction computer 480 in addition to resistor #51a, refraction computer 480 determining the correction in longitude due to refraction of light rays in the Earth's atmosphere as previously described, however in FIG. 39 the correction in longitude is transmitted to positioning circuit #9a rather than positioning circuit #25 and #26 in FIG. 6.

In FIG. 39, the sidereal hour angle of gimbal ring 8 is also transmitted through shaft 505 and gear 504 to planetary gear 503 as indicated, chronometer motor 108 differentially operating planetary gear 503 to provide the longitude of the craft to gears 507 and 508 through electro-magnetic clutch 506 such that resistor # 45a and shaft 68 may be adjusted to the longitude of the craft either through the electronic differential provided by circuit # 9a or through the mechanical differential provided by planetary gear 503. Normally open contacts # 1 and # 2 of relay # 20 and similar contacts of relay # 19 are connected to the energizing coil of relay # 48 as illustrated in FIG. 39 such that energization of either relay # 19 or # 20 by circuit # 9a causes energization of relay # 48. Single-pole double-throw contact # 1 of relay # 48 provides a voltage source energizing electro-magnetic clutch 506 when circuit # 9a is at its null point, the voltage source being connected to the movable contact # 1 of relay # 48 as illustrated, the normally closed contact of relay # 48 being connected through normally closed contact # 1 of relay # 49a and normally closed contact # 1 of relay # 29c to clutch 506. When circuit # 9a is not at its null point, energization of either relay # 19 or # 20 causes energization of relay # 48 to de-energize clutch 506 and energize clutch 66, the normally open contact of relay # 48 being connected through normally closed contact # 2 of relay # 49a and normally closed contact # 2 of relay # 29c to clutch 66 as illustrated. Provision is made for adjustment of shaft 68 and resistor # 45a by either an inertial navigation system or the dead-reckoning computer during automatic transfer of navigation to a different star or during malfunctioning of the celestial navigation system as will be described later, therefore relays # 49a and # 29c provide for disconnection of both clutches 506 and 66 under such circumstances. Mechanical differential 503 provides an instantaneous indication of longitude while there would be some time lag in the response of the electronic differential provided by circuit # 9a, therefore the mechanical differential would normally provide greater accuracy. However, with repeated transfer of navigation to different stars, an accumulation of errors could occur in the adjustment of shaft 68 and resistor # 45a by the inertial navigation system or dead-reckoning computer while clutches 506 and 66 are de-energized, therefore whenever the accumulation of errors under such circumstances causes deviation of circuit # 9a from its null point after reorientation of the star tracker 5 with its selected star, circuit # 9a serves to correct the position of shaft 68 and resistor # 45a through operation of motor 65 and electro-megnetic clutch 66 are previously described.

Dead-reckoning computer 482 operates longitude motor 117 and latitude motor 152 in FIG. 39 similarly as previously described in FIG. 6, longitude motor 117 adjusting the resistor housing of resistor 510 through gears 511 (for purposes of illustration), and shaft 68 adjusting the rotor of resistor 510 to the actual longitude of the craft. Thus linear variable resistor 510 is differentially adjusted by the actual longitude of the craft as determined by the navigation system and the desired longitude as determined by the dead-reckoning computer such that resistor 510 is midway between maximum and minimum resistance when the actual longitude equals the desired longitude of the craft. Resistor 510 is connected in the longitude wheatstone bridge circuit of the guidance system as indicated in wheatstone bridge circuit # 1 of FIG. 30, resistor 510 merely replacing resistors # 1 and # 3, any appropriate closed loop servo amplifier circuit serving to operate relays # 10 and # 12 in FIG. 30 from circuit # 1 alone with elimination of circuit # 2. Latitude motor 152 similarly adjusts the resistor housing of linear variable resistor 514, while shaft 485 adjusts the rotor of resistor 514 to the actual latitude of the craft, shaft 485 indicating latitude of the craft similarly as previously described in FIG. 6. Thus resistor 514 is similarly differentially adjusted midway between maximum and minimum resistance when the actual latitude of the craft equals the desired latitude of the craft, resistor 514 being connected in the latitude wheatstone bridge circuit of the guidance system as indicated in wheatstone bridge circuit # 3 of FIG. 30, resistor 514 merely replacing resistors # 11 and # 13, any appropriate closed loop servo amplifier circuit serving to operate relays # 11 and # 13 in FIG. 30 from circuit # 3 alone with elimination of circuit # 4. Electrical connection to resistors 510 and 514 may be made by flexible leads or slip rings and brushes to provide for rotation of the resistor housings.

It may obviously be noted that resistor 510a (not illustrated but identical to resistor 510 in FIG. 39) may similarly be utilized to replace resistors # 1a and # 3a in longitude circuit # 1a of FIG. 33, and a resistor 510b (not illustrated but also identical to resistor 510 in FIG. 39) similarly utilized to replace resistors # 1b and # 3b in auxiliary longitude circuit # 1b of FIG. 33. Resistors 514a and 514b (not illustrated but identical to resistor 514 in FIG. 39) may be similarly utilized in the latitude circuits # 3a and # 3b (not illustrated but similar to longitude circuits # 1a and # 1b in FIG. 33 as previously described.) The advantage of resistors 510 and 514 in FIG. 39 is that they always remain adjusted approximately midway between the maximum and minimum resistance, so there is no limit to the distance the craft may travel in longitude or latitude in adjusting resistors 510 and 514.

A conventional True-North seeking gyroscope 525 is mounted in gimbal ring 27 in FIG. 39 similarly as gyroscope 29 in FIG. 6, however the gyro spin axis in FIG. 39 coincides with axis 479 in FIG. 6 to eliminate the pendulum suspension of the gyroscope in FIG. 6. The housing of gyroscope 525 in FIG. 39 is rotated on axis 479 by microsyn signal generator and torquer 524 to maintain the vertical sensing element 523 aligned with a true vertical in an East-West direction, computer 55 operating microsyn signal generator and torquer 524 similarly as signal generator 4b and torquer 4a in FIG. 6 to maintain proper orientation of vertical sensing element 523 with respect to a true vertical in an East-West direction. Vertical sensing element 523 detects deviation of gyroscope 525 and gimbal ring 27 from a true vertical in a North-South direction to provide signals through amplifier 604 in a conventional manner operating torquer 30 to cause precession of True North seeking gyroscope 525 to properly orient frame 1 with respect to True North, deviation of frame 1 from True North causing deviation of gimbal ring 27 and gyroscope 525 from a true vertical in a North-South direction as previously described in FIG. 6. However, as previously described when a star is selected for navigation East of the craft's zenith, the direction of torque provided by torquer 30 should be reversed from the direction of torque provided by torquer 30 when a star is selected for navigation West of the craft's zenith, due to the reversal in deviation of gimbal ring 27 from a true vertical under the stated conditions. Therefore in FIG. 39, disc 520 is attached to shaft 505 indicating the position of gimbal ring 8 with respect to gimbal ring 6 in the star tracker of FIGS. 6 and 39. Brushes 522 (connected to amplifier 604) make contact with slip rings on disc 520, the slip rings being connected to a first pair of commutator segments engaged by brushes 521 (connected to torquer 30) to torque gimbal ring 27 in one direction when a star is selected for navigation East of the craft's zenitn, the described slip rings being connected with reversed polarity to a second pair of commutator segments engaged by brushes 521 to torque gimbal ring 27 in the opposite direction when a star is selected for navigation West of the craft's zenith, Thus the described commutator segments on disc 520 operate as a double-pole double-throw reversing switch when tracking element 5 passes from a position East of the craft's zenith to West of the craft's zenith, brushes 521 passing from contact with the first pair of commutator segments to the second pair of commutator segments at the position of disc 520 where gimbal ring 8 is parallel to gimbal ring 6 in the star tracker of FIGS. 6 and 39. The described automatic reversing of torque of torquer 30 by vertical sensing element 523 of true north seeking gyroscope 525 through disc 520 is necessary when the Earth's magnetic field is utilized to determine a true vertical through computer 55, since it is the determination of a true vertical by computer 55 as previously described which creates the reversed torquing of torquer 30 as described. Torquer 30 may consist of two torquing elements, a first torquing element operated by the True North seeking gyroscope, and a second torquing element operated by computer 55, the second torquing element normally overriding the first torquing element except in the event of malfunctioning of computer 55. Switching means may be provided in computer 55 providing operation of the second torquing element alone during normal operation and providing operation of the first torquing element alone during malfunctioning of computer 55, or providing operation of a single torquing element from computer 55 during normal operation and operation of the single torquing element from True North seeking gyroscope 525 during malfunctioning of computer 55. Vertical sensing element 523 might consist of a level of the type previously described for operation of vertical seeking gyroscope 42, the level being attached to gyroscope 525 with the longitudinal axis of the level parallel to the spin axis of gyroscope 525.

INERTIAL NAVIGATION MEANS

Compass 54 is mounted on vertical seeking element 42 in FIG. 39 similarly as previously illustrated and described in FIG. 4, optical transducers in compass 54 providing signals to combined torquer and signal generator 46c to adjust the compass housing to Magnetic North. Signal generator 46c provides the relative azimuth position of compass housing 54 with respect to frame 33 enabling computer 55 to properly orient frame 33 with respect to True North as previously described.

Since vertical seeking element 42 provides a gyroscopically stabilized platform properly oriented with respect both to a true vertical and True North reference as previously described, it provides an ideal platform for mounting of East-West and North-South accelerometers 492 and 493 as illustrated in FIG. 39, the accelerometers providing signals to a conventional inertial navigation means 494 to determine longitude and latitude of the craft. Accelerometers 492 and 493 may be any conventional accelerometers or integrating accelerometers with appropriate sensitivity to provide velocity signals (first integral of acceleration) and displacement signals (second integral of acceleration) by the inertial navigation computer in a conventional manner to determine location of the craft in longitude and latitude, the inertial navigation system itself forming no part of the present invention. The present state of art provides digital or electronic inertial navigation computers with a high degree of accuracy, for example developed by North American or Hughes Aircraft Companies. U.S. Pat. No. 3,048,352, assigned to Hughes Aircraft Co., particularly provides an inertial navigation computer which corrects for centrifugal and coriolis forces resulting from the Earth's rotation and compensates for the oblate spheroid shape of the Earth. Novelty resides in the utilization of the celestial navigation system and vertical reference described in the present invention to provide a gyroscopically stabilized platform accurately oriented with respect to a true vertical and True North, the described celestial navigation system providing accurate determination of longitude and latitude over an indefinite period of time or distance to accurately monitor the inertial navigation system, and the inertial navigation system providing continuous navigation during malfunctioning of the celestial unit or during automatic transfer of navigation to different celestial bodies. The accelerometers 492 and 493 should be located at the center of gravity of the craft or preferably at the intersection of the yaw, roll, and pitch axes of the craft to eliminate spurious signals from the accelerometers due to yaw, roll, or pitch of the craft. If this location is not appropriate for measurement of the Earth's magnetic field, accelerometers 492 and 493 could be mounted on a separate gyroscopically stabilized platform properly oriented with respect to a true vertical and True North similarly as vertical seeking element 42 and first gimbal platform 2b, the present state of art providing many types of gyroscopically stabilized platforms suitable for this purpose.

The present state of art provides many types of malfunction detection means to detect malfunctioning of computers which could be utilized in malfunction detection means 501 in FIG. 39 to operate relays # 49 and # 50, energization of relays # 49 and # 50 providing continuous navigation by inertial navigation computer 494 during malfunctioning of the celestial navigation system. For example in FIG. 6, it is seen that the inclinometer needle tips of inclinometers 47 and 48 would be normally aligned with the center of optical transducers 50 and 52 when gyroscope 41 is properly oriented with respect to the Earth's magnetic field as previously described. Thus any deviation of the inclinometer needle tips from the center of optical transducers 50 and 52 beyond a maximum amount necessary for normal orientation of gyroscope 41 would indicate a magnetic disturbance. Therefore a series of photo-electric cells could be placed at the maximum distance either side of the center of optical transducers 50 and 52 indicating a magnetic disturbance, the signal output from the described series of photo-cells being amplified through appropriate amplifying means to energize relays # 49 and # 50 (similarly as optical transducers 50 and 52 energize torquers 37a and 38a as previously described) whenever the inclinometer needle tips deviate more than a pre-determined maximum distance from the center of optical transducers 50 and 52. Means could also be provided to determine the magnetic flux density at the location of magnetic inclinometers 47 and 48, such means energizing relays #49 and #50 whenever the magnetic flux density exceeds a pre-determined maximum normal for the Earth's magnetic field. Thus lightning flashes or artificial electromagnetic fields exceeding the maximum normal flux density for the Earth's magnetic field would energize relays #49 and #50.

Energization of relay #50 during malfunctioning of the celestial navigation system provides orientation of all components by inertial navigation computer 494 which are normally oriented by computer 55. Thus the movable contacts of double-pole double-throw contacts #1 and #2 of relay #50 are respectively connected to signal generator 46b and torquer 46a to normally connect signal generator 46b and torquer 46a to computer 55 when relay #50 is de-energized as illustrated in FIG. 39, energization of relay #50 causing contacts #1 and #2 to connect signal generator 46b and torquer 46a to inertial navigation computer 494 to provide proper orientation of frame 33 with respect to True North by inertial navigation computer 494 during malfunctioning of the celestial navigation system. Further double-pole double-throw contacts of relay #50 similarly transfer orientation of all other appropriate components (normally oriented with respect to a true vertical and True North by computer 55) from computer 55 to inertial navigation computer 494 during malfunctioning of the celestial navigation system, as indicated by contacts #3 and #4 of relay #50, inertial navigation computer 494 overriding True North seeking gyroscope 525 under such circumstances. True North seeking gyroscope 525 could be utilized to maintain orientation of frame 1 and 33 with respect to True North during malfunctioning of azimuth determining components of computer 55 if desired, unless inertial navigation computer 494 would provide more accurate azimuth orientation under such circumstances.

Energization of relay #49 during malfunctioning of the celestial navigation system provides a continuous indication of longitude and latitude by inertial navigation computer 494, the celestial navigation system providing accurate monitoring of inertial navigation computer 494 upon de-energization of relay #49. An energizing coil of relay #49 is connected in parallel with the energizing coil of relay #29a to provide energization of relay #49 upon transfer of navigation to a different star. Thus the position of longitude indicating shaft 68 of the celestial navigation system in FIG. 39 may be transmitted to the longitude output of inertial navigation computer 494 by microsyn signal transmitter 67, signal generator 496, and torquer 495, phase sensitive amplifier 516 operating torquer 495 through normally closed contact #3 of relay #49 when relay #49 is de-energied to synchronize signal transmitter 67 and signal generator 496. The position of latitude indicating shaft 485 of the celestial navigation system may be similarly transmitted to the latitude output of inertial navigation computer 494 by microsyn signal transmitter 151, signal generator 499, and torquer 498, phase sensitive amplifier 515 operating torquer 498 through normally closed contact #1 of relay #49 when relay #49 is de-energized to synchronize signal transmitter 151 and signal generator 499. Upon energization of relay #49 during malfunctioning of the celestial navigation system or during automatic transfer of navigation to a different star, normally open contact #2 of relay #49 closes to connect a voltage source to the necessary operating components of inertial navigation computer 494 and electro-magnetic clutches 497 and 500, such that inertial navigation computer 494 may Maintain continuous indication of longitude and latitude through clutches 497 and 500 during such periods. It may be noted that longitude shaft 68 and latitude shaft 485 of the celestial navigation system could be respectively coupled directly to the longitude and latitude output of inertial navigation computer 494 with elimination of the described synchronizing components, since during normal operation of the celestial navigation system normally open contact #2 of relay #49 disconnects the operating components in computer 494 providing indication of longitude and latitude by inertial navigation computer 494, however an alternative function of the proposed eliminated synchronizing compOnents is described later.

Normally open contact #1 of relay #29b also provides for energization of electro-magnetic clutches 512 and 513 in FIG. 39 to couple longitude motor 117 and latitude motor 152 of the dead-reckoning computer respectively to longitude shaft 68 and latitude shaft 485 during automatic transfer of navigation to a different star, relay #29b being energized similarly as relay #29a during automatic transfer of navigation to a different star through normally closed contact #4 of relay #49, such that relay #29b is energized only if relay #49 should fail to operate during automatic transfer of navigation to a different star. Thus the dead-reckoning computer maintains a continuous indication of longitude and latitude and consequent proper orientation of the celestial navigation system if relay #49 should fail to operate during automatic transfer of navigation to different stars. Therefore malfunction detection means to detect malfunctioning of inertial navigation computer 494 could be utilized to prevent energization of relay #49 and #50 during malfunctioning of inertial navigation computer 494.

Relay #49a is operated identically as relay #49, and relay #29c is operated identically as relay #29a in FIG. 39, normally closed contacts #1 and #2 of relay #49a respectively disconnecting clutches 506 and 66 during malfunctioning of the celestial navigation system or automatic transfer of navigation to different stars to permit continuous adjustment of longitude indicating shaft 68 by inertial navigation computer 494 during such periods, nOrmally closed contacts #1 and #2 of relay #29c respectively disconnecting clutches 506 and 66 during automatic transfer of navigation to different stars to permit continuous adjustment of longitude indicating shaft 68 by the dead-reckoning computer during such period if relays #49 and #49a should fail to operate. It is to be understood that the contacts of identically operated relays could be combined in a single relay if desired, the identically operated relays merely providing convenience in illustration.

It may be noted that during automatic transfer of navigation to a different celestial body, energization of relay #49 to provide continuous navigation by inertial navigation computer 494 would also provide proper orientation of the gimbal systems with respect to True North and a true vertical by computer 55 as previously described without energization of relay #50. However, if relay #50 were also energized under the stated conditions, the gimbal systems would be accurately oriented with respect to True North and a true vertical by inertial navigation computer 494 in accordance with the longitude and latitude determined by computer 494.

AUTOMATIC STAR SELECTOR

In FIG. 39, automatic star selector 603 adjusts selector switch 64 in accordance with the longitudinal rotation of the Earth (with respect to selected stars or satellites) and the geographical location of the craft on Earth to appropriately transfer navigation to proper stars or artificial radio satellites. Selector switch 64 in FIG. 39 connects appropriate variable resistors into circuits # 9a and # 11a, the variable resistors being preadjusted to the sidereal hour angle and declination of selected stars to be used for navigation similarly as previously described in FIG. 6, however in FIG. 39 selector switch 64 is adjusted by motor 518 through a worm gear or other appropriate gearing adjusting gear 517 attached to the rotor shaft of switch 64, the rotor shaft of switch 64 further adjusting linear variable resistor 519 to balance a positioning circuit to the null point in star selector 603.

Automatic star selector 603 is illustrated in more detail in FIG. 40. Latitude indicating shaft 485 of the celestial navigation system is coupled to properly rotate latitude disc 527 in accordance with the latitude of the craft. Latitude disc 527 in FIG. 40 has commutator segments on its surface to engage appropriate brushes at pre-determined latitudes of the craft, further brushes engaging slip rings electrically connected to the commutator segments on disc 527, such that electrical contact is established between appropriate brushes on latitude disc 527 at pre-determined latitudes. Longitude indicating shaft 68 of the celestial navigation system is coupled to properly rotate longitude disc 526 in accordance with the longitude of the craft. Longitude disc 526 similarly has commutator segments, slip rings, and brushes on its surface to establish electrical contact between appropriate brushes at pre-determined longitudes of the craft. Star selector discs 528 and 529 are rotated in accordance with Greenwich Meridian Time and the longitude of the craft through differential planetary gear 598 such that the rotation of discs 528 and 529 is synchronized with the Earth's rotation and the longitude of the craft to properly indicate the hour angle with respect to the craft of stars selected for navigation, disc 528 indicating the hour angle of stars in the Northern Hemisphere and disc 529 indicating the hour angle of stars in the Southern Hemisphere for convenience in illustration. Star selector discs 528 and 529 have commutator segments on their surfaces to engage appropriate brushes at pre-determined hour angles of the stars with respect to the craft, the commutator segments being arranged in concentric rings with a separate brush engaging each ring of commutator segments. A further brush engages a slip ring on star selector discs 528 and 529, fixed resistors being attached to rotate with discs 528 and 529, the fixed resistors being electrically connected to the common slip ring and the commutator segments of discs 528 and 529 such that the electrical resistance between the brushes engaging the commutator segments and the brush engaging the common slip ring depends upon the angle of rotation of star selector discs 528 and 529 and the particular brush selected engaging the commutator segments. The brushes of latitude disc 527 and longitude disc 526 are electrically connected to appropriately energize relays # 51, # 52, # 53, # 54, # 55, and # 56 at pre-determined longitudes and latitudes. The brushes of longitude disc 526 and latitude disc 527 are further electrically connected in conjunction with the contacts of the mentioned relays to select an appropriate brush of star selection discs 528 and 529 in accordance with geographical location of the craft resulting in the connection of appropriate fixed resistors into positioning wheatstone bridge circuit # 29 in response to rotation of star selector discs 528 and 529. Circuit # 29 thus operates motor 518 through an appropriate closed loop amplifier circuit to adjust switch 64 and linear variable resistor 519 to the null point of circuit # 29, such that switch 64 connects an appropriate resistor into circuits #9a and # 11a (of FIG. 39) to automatically transfer navigation to an appropriate star whenever the previous star reaches the practical limit for navigation. The direction from the craft's zenith of the stars selected for navigation depend upon the brushes selected on star selector discs 528 and 529, therefore the described automatic star selector selects appropriate stars in accordance with time and the craft's geographical location to insure convergent orientation of the gimbal systems by computer 55 as previously described.

For purposes of reference in the claims, the latitude electrical contact means of disc 527 (FIG. 40) may be referred to as latitude activating means, the longitude electrical contact means of disc 526 may be referred to as longitude activating means, and the celestial electrical contact means of star selection discs 528 and 529 may be referred to as celestial activating means, it being understood that the described activating means provide operation of the servo means as defined in the claims.

An illustrative example of one type of closed loop servo amplifier circuit for wheatstone bridge circuit #29 is illustrated in FIG. 40. Fixed resistors # 127 and #128 are connected in series across the signal output of wheatstone bridge circuit # 29, the signal developed by resistors #127 and # 128 being applied either directly or through an appropriate amplifier respectively to the grids of two thyraton tubes 226 such that the signal applied to one tube is 180° out of phase with the signal applied to the other tube, potentiometers # 130 and # 131 being adjusted to provide an appropriate bias to the respective thyraton tubes. Thus when circuit # 29 is adjusted from its null point in one direction, relay # 56 is energized to rotate motor 518 in one direction to balance circuit # 29, and when circuit # 29 is adjusted from its null point in the opposite direction, relay # 57 is energized to rotate motor 518 in the opposite direction to balance circuit # 29. Linear variable resistor #129 in circuit # 29 provides for calibration of circuit # 29 to properly center the rotor of switch 64 with respect to its multiple contact positions upon adjustment of switch 64 by motor 518. The movable contacts of double-pole double-throw contacts #1 and # 2 of relays # 56 and # 57 are connected to motor 518, the normally closed contacts # 1 and # 2 of relays # 56 and # 57 being short circuited to provide electro-dynamic braking of motor 518 when both relays # 56 and # 57 are de-energized as illustrated. The electro-dynamic braking of motor 518 permits very rapid and precise adjustment of switch 64 by motor 518. A normally closed contact #4a of relay #56 upon energization of relay #56 disconnects the short circuiting of motor 518 provided by relay #57, and a normally closed contact #4b of relay #57 upon energization of relay #57 disconnects the short circuiting of motor 518 provided by relay #56 as illustrated. Normally open contacts #3 of relays #56 and #57 connect a voltage source to energize relay 202 in FIG. 39 upon energization of either relay #56 or #57, energization of relay 202 upon adjustment of switch 64 providing automatic transfer of navigation to different stars as previously described. (FIG. 41 merely illustrates the use of fixed resistors #132 and #133 in the dead-reckoning computer circuit #21 of FIG. 12 to provide operation of motor 246 in FIG. 12 similarly as resistors #127 and #128 provide operation of motor 518 in FIG. 40.) The present state of art provides many types of servo circuits which may be utilized, however it is believed the servo circuit illustrated in FIG. 40 would provide sensitive, rapid response with accurate stops of motor 518.

It is to be understood that cam actuated contact points responsive to rotation of discs with radii which vary in accordance to the angle of rotation of the discs could be utilized to duplicate the electrical contact means responsive to rotation of discs 526, 527, 528, and 529, although less torque would be required for rotation of the discs as illustrated in FIG. 40. Any other appropriate contact means responsive to rotation or adjustment of an appropriate selection element could similarly be utilized. Obviously other mechanical, hydraulic, or electrical systems could be utilized to duplicate the described adjustment of multi-position switch 64 in accordance with the hour angle of star selection discs 528 and 529, similarly as servo positioning circuit #29 adjusts switch 64. Resistors connected by star selection discs 528 and 529 could also be directly connected into positioning circuits #9a and #11a of FIG. 39 (similarly as by switch 64) as later described, such that star selection discs 528 and 529 would actually replace and become multi-position switch 64. However, the star selection discs 528 and 529 as illustrated in FIG. 40 provide the most convenient manner of illustrating the principle involved, and multi-position switch 64 would provide more stable electrical contact resistance in circuits #9a and #11a than the multitude of electrical contacts provided by latitude disc 527, longitude disc 526, relays #51, #52, #53, #54, #55, #56, and star selection discs 528 and 529.

The fundamental principle of the automatic star selector in FIG. 40 having been briefly described, details to accomplish the fundamental principle follow. Brush 564 makes contact with slip ring 565 on latitude disc 527, brush 564 being electrically connected to terminal #74 in circuit #29, the position of latitude disc 527 as illustrated being at 0° latitude. Brush 554 makes contact with commutator segment 555 on latitude disc 527 from approximately 20° North latitude to 20° South latitude to represent the equatorial region of the Earth where stars may be selected for navigation either East or West of the craft's zenith at all longitudes as previously described, commutator segment 555 being electrically connected to slip ring 565. Brush 554 is electrically connected to brush 575 on star selection disc 528, brush 575 making contact with either of two 180° commutator segments 576 on disc 528, the two commutator segments 576 each being respectively connected through an appropriate fixed resistor to slip ring 582 (similarly as fixed resistor 570 connects commutator segment 569 to slip ring 582). Slip ring 582 makes contact with brush 581 which is electrically connected to terminal #75 in circuit #29. Thus in the equatorial region of the Earth, latitude disc 527 connects terminal #74 of circuit #29 to brush 575 of star selection disc 528 such that rotation of star selection disc 528 in accordance with time and the craft's longitude provides navigation by one of two stars from the East horizon to the West horizon or from the West horizon to the East horizon of the Earth, depending upon the direction of travel of the craft when the speed of the craft is greater than the rotational speed of the Earth, the two commutator segments 576 on star selection disc 528 connecting the appropriate fixed resistor into circuit #29 to transfer navigation from one star to the other whenever the limit of navigation is reached for the previous star. Only two such commutator segments 576 are indicated for purposes of illustration, however three, four, or more such commutator segments 576 with correspondingly smaller degrees of arc would be provided on disc 528 to appropriately transfer navigation similarly to one of three, four, or more stars nearer the craft's zenith. The gap between commutator segments 576 would be sufficient such that brush 575 makes contact with only one commutator segment at a time when disc 528 rotates through the minimum arc possible in passing contact from one commutator segment to another. It would be preferred that the stars selected by commutator segments 576 be as near the equatorial plane of the Earth as possible.

Brush 556 makes contact with commutator segment 557 on latitude disc 527 from approximately 20° North latitude to 70° North latitude to represent the region in the Northern Hemisphere from the Equatorial Region to the North Magnetic Pole where stars should be selected for navigation East of the craft's zenith at longitudes East of the North Magnetic Pole, and West of the craft's zenith at longitudes West of the North Magnetic Pole (as previously described), commutator segment 557 being electrically connected to slip ring 565. Brush 556 is electrically connected to brush 546 on longitude disc 526, brush 546 making contact with slip ring 547, the position of longitude disc 526 as illustrated being at the longitude of the North Magnetic Pole. 180° commutator segments 531 and 533 on longitude disc 526 are electrically connected to slip ring 527, commutator segment 531 making contact with brush 530 at longitudes East of the North Magnetic Pole, and commutator segment 533 making contact with brush 532 at longitudes West of the North Magnetic Pole. Brush 530 is electrically connected to brush 568 on star selection disc 528, brush 568 making contact with any one of four 90° commutator segments similar to commutator segments 569 and 571, and brush 532 on longitude disc 526 is electrically connected to brush 572 on star selection disc 528, brush 572 making contact with any of four 90° commutator segments similar to commutator segments 573 and 574. The four commutator segments respectively making contact with brushes 568 and 572 on star selection disc 528 are each connected through an individual appropriate fixed resistance attached to disc 528 and electrically connected to common slip ring 582 (as indicated by fixed resistor 570), slip ring 582 making contact with brush 581, and brush 581 being electrically connected to terminal #75 in circuit

29, such that brush 568 provides navigation by stars South and East of the craft's zenith and brush 572 provides navigation by stars South and West of the craft's zenith. Thus at latitudes in the Northern Hemisphere from the Equatorial Region to the North Magnetic Pole, latitude disc 527 connects terminal # 74 of circuit # 29 to brush 546 on longitude disc 526, brush 546 automatically transferring navigation to stars South and East of the craft's zenith when commutator segment 531 makes contact with brush 530 on longitude disc 526 at longitudes East of the North Magnetic Pole, brush 546 automatically transferring navigation to stars South and West of the craft's zenith when commutator segment 533 makes contact with brush 532 on longitude disc 526 at longitudes West of the North Magnetic Pole. It may be noted that the fixed resistors connected into circuit # 29 by brush 568 of star selector disc 528 could be identical in value to the fixed resistors connected by brush 572 of star selector disc 528, however they would be properly synchronized such that the stars selected by brush 568 would always be East of the craft's zenith and the stars selected by brush 572 would always be West of the craft's zenith. The four commutator segments respectively engaged by brushes 568 and 572 are only for purposes of illustration, it being understood that brushes 568 and 572 would each respectively engage 6, 8, or more commutator segments to appropriately transfer navigation to one of 6, 8, or more stars nearer the craft's zenith. The stars selected at latitudes represented by commutator segment 557 on latitude disc 527 could also be near the equatorial plane of the Earth such that some of the stars selected by brushes 568 and 572 could be the same stars selected by brush 575 on star selection disc 528.

Brush 558 makes contact with commutator segment 559 on latitude disc 527 from approximately 20° South latitude to 70° South latitude to represent the region in the Southern hermisphere from the Equatorial Region to the South Magnetic Pole where stars should be selected for navigation East of the craft's zenith at longitudes East of the South Magnetic Pole and West of the craft's zenith at longitudes West of the South Magnetic Pole (as previously described), commutator segment 559 being electrically connected to slip ring 565. Brush 558 is electrically connected to brush 548 on longitude disc 526, brush 548 making contact with slip ring 549. 180° commutator segments 535 and 537 on longitude disc 526 are electrically connected to slip ring 549, commutator segment 535 making contact with brush 534 at longitudes East of the South Magnetic Pole, and commutator segment 537 making contact with brush 536 at longitudes West of the South Magnetic Pole. Commutator segments 535 and 537 are positioned on longitude disc 526 approximately 108° clockwise from commutator segments 531 and 533, since the South Magnetic Pole is approximately 108° West of the North Magnetic Pole, movement of the craft in a Westerly direction causing rotation of longitude disc 526 in a counter-clockwise direction. Brush 534 on longitude disc 526 is electrically connected to brush 583 on star selection disc 529, and brush 536 on longitude disc 526 is electrically connected to brush 589 on star selection disc 529, brushes 583 and 589 being electrically connected through appropriate commutator segments electrically connected to appropriate fixed resistors (as indicated by fixed resistor 588) electrically connected to common slip ring 596 making contact with brush 587 electrically connected to terminal #75 in circuit #29. Brush 583 on star selection disc 529 provides navigation by stars North and East of the craft's zenith, and brush 589 on star selection disc 529 provides navigation by stars North and West of the craft's zenith. Thus at latitudes in the Southern Hemisphere from the Equatorial Region to the South Magnetic Pole, latitude disc 527 connects terminal # 74 of circuit # 29 to brush 548 on longitude disc 526, brush 548 automatically transferring navigation to stars North and East of the craft's zenith when commutator segment 535 makes contact with brush 534 on longitude disc 526 at longitudes East of the South Magnetic Pole, and brush 548 automatically transferring navigation to stars North and West of the craft's zenith when commutator segment 537 makes contact with brush 536 on longitude disc 526 at longitudes West of the South Magnetic Pole. It may be noted that the stars selected by brushes 583 and 589 on star selection disc 529 could be the same stars selected by brushes 568 and 572 on star selection disc 528, although if the stars selected by brushes 583 and 589 were not the same as the stars selected by brushes 568 and 572, the commutator segments engaged by brushes 583 and 589 on star selection disc 529 would be appropriately positioned on disc 529 in accordance with the sidereal hour angle of the stars selected. However, the stars selected by brushes 568 and 572 should always be South of the craft's zenith, and the stars selected by brushes 583 and 589 should always be North of the craft's zenith to insure convergent orientation of the gimbal systems by computer 55 as previously described. It may be noted that a series of artificial radio satellites orbiting in the equatorial plane of the Earth would meet all the stated requirements of star selection. Star selection discs 528 and 529 are illustrated rotating on separate shafts for convenience in illustration, although any number of such discs could be combined on a single shaft appropriately rotated by differential means as described.

Brush 560 makes contact with commutator segment 561 on latitude disc 527 from approximately 70° North latitude to 90° North latitude to represent the region in the Northern Hemisphere North of the North Magnetic Pole where stars should be selected for navigation North of the craft's zenith in the vicinity of the North Magnetic Pole (as previously described). Commutator segment 561 is electrically connected to slip ring 567 on latitude disc 527, slip ring 567 making contact with brush 566 connected to a direct current voltage source. Brush 560 is electrically connected to energize relay #53 when commutator segment 561 makes contact with brush 560 at latitudes North of the North Magnetic Pole. Brush 560 is also electrically connected to brush 550 making contact with slip ring 551 on longitude disc 526, slip ring 551 being electrically connected to 30° commutator segments 539 and 541. Commutator segment 539 makes contact with brush 538 to energize relay # 51 at longitudes from the North Magnetic Pole to approximately 30° East of the North Magnetic Pole, and commutator segment 541 makes contact with brush 540 to energize relay # 52 at longitudes from the North Magnetic Pole to approximately 30° West of the North Magnetic Pole when commutator segment 561 (on latitude disc 527) makes contact with brush 560 at latitudes North of the North Magnetic Pole. Terminal # 74 in circuit # 29 is electrically connected to the movable contact of single-pole double-throw contact #1 of relay #52 and also to the movable contact of single-pole double-throw contact #2 of relay #51 as illustrated in FIG. 40. The normally closed contact #1 of relay #52 is electrically connected in series with a normally closed contact #1 of relay #51 to a normally open contact #1 of relay #53, and the normally closed contact #2 of relay #51 is similarly electrically connected in series with a normally closed contact #2 of relay #52 to normally open contact #1 of relay #53 as illustrated, thus energization of either relay #51 or #52 disconnects terminal #74 from contact #1 of relay #53. Contact #1 of relay #53 is further electrically connected to brush 546 on longitude disc 526, such that upon energization of relay #53 (when relays #51 and #52 are both de-energized) terminal #74 of circuit #29 is connected to brush 546 on longitude disc 526, brush 546 providing transfer of navigation to stars South and East of the craft's zenith at longitudes East of the North Magnetic Pole and to stars South and West of the craft's zenith at longitudes West of the North Magnetic Pole as previously described. Thus at latitudes North of the North Magnetic Pole (where relay #53 is energized) and longitudes more than approximately 30° either East or West of the North Magnetic Pole (where relays #51 and #52 are both de-energized), stars are selected for navigation South and East of the craft's zenith at longitudes more than approximately 30° East of the North Magnetic Pole, and stars are selected for navigation South and West of the craft's zenith at longitudes more than approximately 30° West of the North Magnetic Pole as previously described.

Upon energization of relay #51 by brush 538 (at longitudes from the North Magnetic Pole to approximately 30° East of the North Magnetic Pole and at latitudes North of the North Magnetic Pole), contacts #1 and #2 of relay #51 open both previously described circuits to contact #1 of relay #53 to disconnect terminal #74 of circuit #29 from brush 546 on longitude disc 526, and contact #2 of relay #51 further electrically connects terminal #74 of circuit #29 to brush 579 on star selection disc 528. Brush 579 makes contact with one of two 180° commutator segments 580 on disc 528, each commutator segment being respectively connected through an appropriate individual fixed resistance to slip ring 582 to properly position switch 64 to transfer navigation to one of two stars North and East of the craft's zenith upon energization of relay #51.

Upon energization of relay #52 by brush 540 (at longitudes from the North Magnetic Pole to approximately 30° West of the North Magnetic Pole and at latitudes North of the North Magnetic Pole), contacts #1 and #2 of relay #52 similarly open both previously described circuits to contact #1 of relay #53 to disconnect terminal #74 of circuit #29 from brush 546 on longitude disc 526, and contact #1 of relay #52 further electrically connects terminal #74 to brush 577 on star selection disc 528. Brush 577 makes contact with one of two 180° commutator segments 578 on disc 528, each commutator segment being respectively connected through an appropriate individual fixed resistance to slip ring 582 to properly position switch 64 to transfer navigation to one of two stars North and West of the craft's zenith upon energization of relay #52.

At latitudes North of the North Magnetic Pole required for energization of relays #51 and #52, two stars North of the craft's zenith as described would most likely be sufficient for proper navigation, for the stars would also be near the craft's zenith in an East or West direction at all longitudes and time. In fact one star at the zenith of the North Geographic Pole would most likely provide proper navigation upon energization of either relay #51 or #52. Therefore normally open contact #2 of relay #51 and normally open contact #1 of relay #52 could both simply be connected to one terminal of an appropriate fixed resistor, the other terminal of the resistor being connected to terminal #75 in circuit #29, such that energization of either relay #51 or #52 would position switch 64 to transfer navigation to a North Polar Star. 30° commutator segments 539 and 541 on longitude disc 526 could then also be combined into a single 60° commutator segment energizing a single relay at longitudes within approximately 30° either East or West of the North Magnetic Pole, the single relay accomplishing the same function as either relay #51 or #52.

If navigation from stars nearer the craft's zenith in a Southern direction were desired upon energization of relay #53 and de-energization of relays #51 and #52 (as previously described), the normally open contact #2 of relay #53 could simply be connected to a brush similar to brush 546 on longitude disc 526 rather than being connected to brush 546, the similar brush transferring navigation to stars East of the craft's zenith at longitudes East of the North Magnetic Pole and transferring navigation to stars West of the craft's zenith at longitudes West of the North Magnetic Pole, similarly as brush 546, except that the stars selected by the similar brush would be nearer the craft's zenith in a Southern direction.

Brush 562 makes contact with commutator segment 563 on latitude disc 527 from approximately 70° South latitude to 90° South latitude to represent the region in the Southern hemisphere South of the South Magnetic Pole where stars should be selected for navigation South of the craft's zenith in the vicinity of the South Magnetic Pole (as previously described), commutator segment 563 being electrically connected to slip ring 567. Brush 562 is electrically connected to energize relay #56 when commutator segment 563 makes contact with brush 562 at latitudes South of the South Magnetic Pole. Brush 562 is also electrically connected to brush 552 making contact with slip ring 553 on longitude disc 526, slip ring 553 being electrically connected to 30° commutator segments 543 and 545. Commutator segment 543 makes contact with brush 542 to energize relay #54 at longitudes from the South Magnetic Pole to approximately 30° East of the South Magnetic Pole, and commutator segment 545 makes contact with brush 544 to energize relay #55 at longitudes from the South Magnetic Pole to approximately 30° West of the South Magnetic Pole when commutator segment 563 (on latitude disc 527) makes contact with brush 562 at latitudes South of the South Magnetic Pole. Thus relays #54, #55, and #56 are operated similarly as relays #51, #52, and #53.

The contacts of relay #54 are identical to the contacts of Relay #51, the contacts of relay #55 are identical to the contacts of relay #52, and the contacts of relay # 56 are identical to the contacts of relay # 53. The contacts of relays # 54, # 55, and # 56 are also respectively electrically connected similarly as the contacts of relays # 51, # 52, and # 53 to provide navigation from appropriate stars at latitudes of the craft South of the South Magnetic Pole, similarly as relays # 51, # 52, and # 53 provide navigation from appropriate stars at latitudes of the craft North of the North Magnetic Pole. Thus normally open contact # 1 of relay # 56 is electrically connected to brush 548 on longitude disc 526, normally open contact # 2 of relay # 54 is electrically connected to brush 591 on star selection disc 529, and normally open contact # 1 of relay # 55 is electrically connected to brush 593 on star selection disc 529, to provide transfer of navigation to stars similarly as relays # 51, # 52, and # 53. Therefore energization of relay # 56 and de-energization of relays # 54 and # 55 at latitudes South of the South Magnetic Pole and longitudes remote from the South Magnetic Pole provide transfer of navigation to stars North and East of the craft's zenith at longitudes more than approximately 30° East of the South Magnetic Pole and provide transfer of navigation to stars North and West of the craft's zenith at longitudes more than approximately 30° West of the South Magnetic Pole. Energization of relay # 54 at latitudes South of the South Magnetic Pole and longitudes in the proximity of the South Magnetic Pole similarly provides transfer of navigation to stars South and East of the craft's zenith (or to a South Polar Star similarly as relay # 51) at longitudes within approximately 30° East of the South Magnetic Pole. Energization of relay # 55 at latitudes South of the South Magnetic Pole and longitudes in the proximity of the South Magnetic Pole similarly provides transfer of navigation to stars South and West of the craft's zenith (or to a South Polar Star similarly as relay # 52) at longitudes within approximately 30° West of the South Magnetic Pole. (The 30° arc of commutator segments 539, 541, 543, and 545 on longitude disc 526 is merely an arbitrary figure, the degree of arc being appropriate to provide convergent orientation of the gimbal systems by computer 55 as previously described.)

It may be noted that rotation of star selection discs 528 and 529 in FIG. 40 could have connected fixed resistors directly into circuits # 9a and # 11a of FIG. 39 to provide automatic transfer of navigation to different stars similarly as previously described, however the previously described connection of pre-adjusted resistors into circuits # 9a and # 11a by switch 64 of FIGS. 39 and 40 provides convenient adjustment of the resistors to the sidereal hour angle and declination of the selected stars, and the electrical contacts of switch 64 would provide more stable and accurate electrical contact than the multitude of electrical contacts connected in series by rotation of discs 526, 527, 528, and 529 of FIG. 40. Any variation in electrical contact resistance created by rotation of discs 526, 527, 528, and 529 of FIG. 40 would not be critical in properly adjusting switch 64, since sufficient margin in the rotor angle of adjustment of switch 64 could be provided to maintain proper electrical contact in the contacts of switch 64 despite any variation in the resistance of contacts of discs 526, 527, 528, and 529.

From the previous description, it is seen that the commutator segments of discs 526, 527, 528, and 529 in FIG. 40 connect only one fixed resistor at a time across terminals # 74 and # 75 of circuit # 29, the gap between appropriate commutator segments providing a minimum of arc of rotation of the discs in passing electrical connection from one commutator segment to another. Thus there would be certain transition longitudes and latitudes where the electrical circuit across terminals # 74 and # 75 of circuit # 29 would be broken by longitude disc 526 and latitude disc 527 in passing electrical connection from one commutator segment to another. Appropriate routes could be selected to avoid prolonged duration of the craft at these transition points in longitude and latitude, such that proper transfer of navigation to appropriate stars would be maintained by star selection discs 528 and 529 as previously described.

If it were desired to eliminate the open circuit across terminals # 74 and # 75 of circuit # 29 at the transition longitudes and latitudes, two different methods could be utilized, it being believed that one method would be more appropriate for longitude disc 526, and the other method would be more appropriate for latitude disc 527, both methods being described as follows. On latitude disc 527, an additional commutator segment 557a (not illustrated but identical to commutator segment 557) would be electrically connected to slip ring 567, commutator segment 557a making contact with brush 556a (not illustrated) at Northern latitudes from the Equatorial Region to the North Magnetic Pole. Brush 556a (instead of brush 556 as originally described) would then be electrically connected to brush 546 on longitude disc 526. An additional commutator segment 559a (not illustrated but identical to commutator segment 559 on latitude disc 527) would similarly be electrically connected to slip ring 567, commutator segment 559a making contact with brush 558a (not illustrated) at Southern latitudes from the Equatorial Region to the South Magnetic Pole. Brush 558a (instead of brush 558 as originally described) would then be electrically connected to brush 548 on longitude disc 526. Commutator segments 533, 537, and brushes 532, 536 on longitude disc 526 would then be eliminated. Brush 530 on longitude disc 526 would be electrically connected to energize a North Magnetic Pole relay at longitudes East of the North Magnetic Pole and Northern latitudes from the Equatorial Region to the North Magnetic Pole, the North Magnetic Pole relay being de-energized at longitudes West of the North Magnetic Pole. Brush 534 on longitude disc 526 would similarly be electrically connected to energize a South Magnetic Pole relay at longitudes East of the South Magnetic Pole and Southern latitudes from the Equatorial Region to the South Magnetic Pole, the South Magnetic Pole relay being de-energized at longitudes West of the South Magnetic Pole. A single-pole double-throw contact would be respectively provided on the described North and South Magnetic Pole relays. The contacts of the North Magnetic Pole relay are then electrically connected identically as the original illustration of brushes 546, 530, and 532 on longitude disc 526 in FIG. 40, the movable contact serving the original function of brush 530, and the normally closed contact serving the original function of brush 532. The contacts of the South Magnetic Pole relay are similarly electrically connected identically as the original illustration of brushes 548, 534, and 536 on longitude disc 526 in FIG. 40, the movable contact serving the original function of brush 548, the normally open contact serving the original function of brush 534, and the normally closed contact serving the original function of brush 536. Thus the described North and South Magnetic Pole relays serve to automatically transfer navigation to appropriate stars identically as previously described, except that the instantaneous transfer of electrical connections provided by the described relays at the transition longitudes of the North and South Magnetic Poles would prevent any prolonged open circuit across terminals #74 and #75 of circuit #29 at the described transition longitudes.

The transfer of electrical connections provided by latitude disc 527 in FIG. 40 could similarly be duplicated by appropriate relays energized by the commutator segments illustrated on latitude disc 527 (the commutator segments then being electrically connected to slip ring 567), contacts of the relays being electrically connected to provide instantaneous transfer of electrical connections at the transition latitudes, however a simpler and more convenient method could be utilized. A single transition brush (not illustrated) would be provided to engage a series of transition commutator segments (not illustrated) on latitude disc 527 at the transition latitudes of disc 527 in FIG. 40, the transition commutator segments being electrically connected to slip ring 567 on disc 527, the single transition brush being electrically connected to energize a transition solenoid or electro-magnet at the transition latitudes. The single transition brush would be in a fixed position in the craft, however the brushes illustrated in FIG. 40 on latitude disc 527 would be mounted on an adjustable member rotatable about the axis of rotation of latitude disc 527. Spring tension would rotate the adjustable member (not illustrated) against a fixed step to position the brushes as illustrated in FIG. 40, energization of the transition solenoid or electro-magnet (not illustrated) causing rotation of the adjustable member and attached brushes through a small appropriate arc at the transition latitudes. Thus rotation of the latitude disc 527 clockwise would energize the transition solenoid at an appropriate latitude prior to a transition latitude to rotate the brushes clockwise to delay transfer of electrical connection from one commutator segment to another at the transition latitude. At the transition latitude, de-energization of the transition solenoid would result in counter-clockwise rotation of the brushes by spring tension to cause instantaneous transfer of electrical connection from one commutator segment to another on latitude disc 527. Rotation of latitude disc 527 counter-clockwise would similarly energize the transition solenoid at the transition latitudes to rotate the brushes clockwise, resulting in instantaneous transfer of electrical connection from one commutator segment to another, subsequent de-energization of the transition solenoid upon further counter-clockwise rotation of disc 527 maintaining electrical connection to the same commutator segments. Thus the action of the transition solenoid would provide instantaneous transfer of electrical connection from one commutator segment to another at the transition latitudes to prevent a prolonged open circuit across terminals #74 and #75 of circuit #29 at the transition latitudes.

The described transition solenoid rotation of the brushes could similarly be utilized to provide instantaneous transfer of electrical connections from one commutator segment to another on longitude disc 526 at the transition longitudes if desired. Instantaneous transfer of electrical connection from one commutator segment to another would not be necessary on star selection discs 528 and 529, since transfer of navigation to a different star would not be required until the commutator segments of discs 528 and 529 transferred electrical connection.

NAVIGATION SATELLITES

When utilizing artificial radio satellites orbiting in the equatorial plane of the Earth for navigation, more than one series of such satellites could be provided to provide continuous navigation in the event of failure of a satellite in one of the series. For example, eight radio satellites spaced at 45° intervals in the Earth's equatorial plane could constitute one such series, the commutator segments on star selection discs 528 and 529 being appropriate to properly transfer navigation to satellites in one of such series. Additional sets of star selection discs, similar to discs 528 and 529, could be provided to properly transfer navigation to satellites in additional series of such aritficial radio satellites, one set of such star selection discs being provided for each series of satellites. A constant speed satellite motor (not illustrated) could then be provided to rotate a multi-pole multi-position satellite selector switch (not illustrated), similarly as motor 518 rotates switch 64 in FIGS. 39 and 40, rotor contacts of the satellite selector switch (not illustrated) being connected to the leads attached to the brushes of star selection discs 528 and 529, the multiple stator contacts for each position of the satellite selector switch (not illustrated) being appropriately connected to the brushes of one set of star selection discs, such that each position of the satellite selector switch would connect a different set of star selection discs to the electrical circuit provided by longitude disc 526, latitude disc 527, and the associated relays.

The speed of the described satellite motor (not illustrated) adjusting the described satellite selector switch (not illustrated) could provide any desired period of contact time between the rotor and stator contacts of the satellite selector switch, at least a minimum contact time being provided to allow proper transfer of navigation to the different series of satellites. Thus the satellite motor could either be operated continuously to periodically transfer navigation from one of the described series of satellites to the other, or the satellite motor could be activated by a relay in star tracker 56 of FIGS. 6 and 39 whenever the signal from a radio satellite failed (similarly as relay 202 in FIGS. 6 and 39 is activated).

The described series of artificial radio satellites could either be at a fixed longitude relative to the rotation of the Earth, or they could rotate at constant intervals relative to the rotation of the Earth such that their position in longitude would change at a uniform rate. If the artificial radio satellites were at a fixed longitude relative to the rotation of the Earth, the resistors connected into circuit #9a of FIG. 39 (or into circuit #9– #10 of FIG. 6) by switch 64 would be pre-adjusted in accordance with the fixed longitudes of the satellites. If the artificial radio satellites rotated in longitude at constant intervals, chronometer motor 108 in FIG. 39 would adjust the housing of resistor 51a in circuit #9a (or #9– #10), differential gear 503, and also differential gear 598 through gear 597 in FIG. 41 as illustrated to properly compensate for rotation of the Earth with respect to the series of artificial satellites, similarly as chronometer motor 108 compensates for rotation of the Earth with respect to selected stars. Chronometer meter 108 would remain in a stationary position or could be eliminated when the series of artificial satellites were at a fixed longitude relative to the rotation of the Earth.

Thus continuous navigation would be provided as long as all the satellites in any one series were operative, or as long as inertial navigation computer 494 in FIG. 39 could maintain sufficiently accurate navigation until a signal was picked up by the tracking element from some satellite in the described system. Thus practically all the satellites in the entire system would have to be inoperative to prevent continuous navigation.

It may be noted from the discussion of the automatic star selector of FIG. 40 that if the navigation system of FIG. 39 were to be in operation for a continuous period of time extending over more than one day, such as in automatic navigation and guidance of sea craft, or if the system were utilized over an extended distance more than one revolution around the Earth such as in automatic navigation and guidance of Earth orbiting satellites or space stations, switch 64 in being adjusted clockwise to transfer navigation to different stars through a total 360° change in sidereal hour angle would be adjusted counter-clockwise back to its starting position at the point where navigation were transferred from a star of maximum sidereal hour angle to minimum sidereal hour angle (or vice-sersa), the position of gimbal ring 8 with respect to gimbal ring 6 in FIG. 6 and the rotor of resistor # 51a in FIG. 39 being similarly adjusted in small increments in one direction when switch 64 is adjusted clockwise and adjusted through a large increment in the opposite direction when switch 64 is adjusted counter-clockwise back to its starting position under the stated conditions. If the craft remains stationary in geographical location, the rotor of resistor # 51a would be adjusted by meter 102 at the same rate as the housing of resistor #51a is adjusted by chronometer motor 108 such that the resistance of resistor #51a would remain constant, except during automatic transfer of navigation to different stars where the resistance of resistor # 51a would be adjusted in increments of resistance equalling the increments of resistance in circuit # 9a provided by adjustment of switch 64, the resistance of resistor # 45a remaining constant while the craft is stationary. Movement of the craft East or West would then cause a corresponding increase or decrease in the resistance of resistors # 51a and # 45a, thus the number of revolutions around the Earth to which the navigation system could respond would be limited to the number of revolutions in adjustment of resistors #51a and # 45a. Therefore if the craft were to travel in an Eastern direction, resistor # 51a might be adjusted near a minimum resistance at the start of the operation through proper adjustment of chronometer motor 108, and if the craft were to travel in a Western direction, resistor # 51a might correspondingly be adjusted near a maximum resistance at the start of the operation through proper adjustment of chronometer motor 108, thus providing a maximum distance to which the navigation system would respond.

Any desired revolutions in adjustment of resistors #51a and # 45a of FIG. 39 could represent a 360° change in longitude. Thus if a 360 turn linear variable resistor of the type illustrated in FIG. 35 were utilized for resistors # 51a and # 45a, and 10 turns in adjustment of the resistors represented a 360° change in longitude, the resistors would be capable of properly responding to approximately 36 continuous revolutions around the Earth.

The described navigation system when tracking a series of artificial radio satellites orbiting in the Equatorial plane of the Earth as previously described would provide continuous all weather navigation, and could provide such navigation for submarines without the necessity of the submarines ever surfacing. When utilizing such satellites for navigation, all components adjusted by chronometer motor 108 would be adjusted in accordance with the rate of rotation of the described satellites with respect to the Earth.

With some modifications, the guidance system of the present invention would be well adapted for automatic navigation and guidance of artificial radio satellites orbiting in the Equatorial plane of the Earth, appropriate stars being utilized as a reference for navigation as previously described. Since the latitude of the described satellites would always be maintained constant at 0° latitude, latitude control circuits similar to circuits # 3- #4 in FIG. 30 could simply be utilized to activate right and left side reaction jets maintaining the latitude of the satellites at 0°, and longitude control circuits similar to circuits # 1- # 2 in FIG. 30 utilized to activate fore and aft reaction jets to control the speed and position of the satellites in longitude, separate azimuth and atitude control circuits being utilized to activate reaction jets controlling the attitude of the satellites in azimuth, pitch, and roll to maintain the satellites properly oriented with respect to True North and a true vertical reference provided by the celestial navigation system of the present invention as previously described.

Thus in FIG. 30 linear variable resistor # 11 in circuit # 3 could be adjusted by latitude indicating shaft 485 of the celestial navigation system such that resistor # 11 was midway between maximum and minimum resistance at 0° latitude, resistance # 11 decreasing in resistance at Northern latitudes and increasing in resistance at Southern latitudes. Since the rate of adjustment of resistor # 11 would directly indicate the speed of the satellites in a North-South direction, rate indicating means such as a rate gyro could be provided to measure the rate of adjustment of resistor # 11. The direction and magnitude of the rate of adjustment of resistor # 11 could then be utilized to adjust linear variable resistor # 13 in circuit # 3 such that resistor # 13 was midway between maximum and minimum resistance at O North-South velocity, resistance #13 increasing in resistance in proportion to Southern velocities and decreasing in resistance in proportion to Northern velocities. All other resistors in circuit # 3 would be fixed resistors except for a calibration resistor to adjust the satellite to the desired 0° latitude. Conventional servo amplifier circuits could then be utilized to energize relay #11 at Northern latitudes and energize relay # 13 at Southern latitudes from the signal output of the modified circuit #3, energization of relay #11 activating a left reaction jet resulting in Southern velocities to balance circuit # 3, and energization of relay #13 activating a right reaction jet resulting in Northern velocities to balance circuit # 3. Thus the velocity of the satellite in a Southern direction would be adjusted in proportion to the Northern latitude and the velocity of the satellite in a Northern direction would be adjusted in proportion to the Southern latitude, such that the right and left reaction jets would provide a North-South velocity approaching 0 velocity as the satellite approached 0° latitude to precisely maintain the satellite at 0° latitude without overshooting oscillations.

Since the latitude of the described radio satellites would remain constant at 0°, latitude motor 152 in the dead-reckoning computer of FIG. 39 could be eliminated, and the azimuth selection dial of the dead-reckoning computer would remain constant at a selected azimuth of due East. Longitude motor 117 of the dead-reckoning computer and longitude shaft 68 of the celestial navigation system would then differentially adjust resistor 510 midway between maximum and minimum resistance when the craft's actual longitude equalled the desired longitude established by the dead-reckoning computer as previously described, resistor 510 in FIG. 39 replacing resistors #1 and #3 in longitude circuit #1 of FIG. 30 as previously described.

If it were desired to adjust the speed of the satellite along the selected route to a selected speed, shaft 172 of clutch 170 in FIG. 29 could simply be coupled to a rotary relay (of the type illustrated in FIGS. 14 and 18) which was maintained in a neutral position by spring tension when no torque is applied to its rotor shaft, terminals #42 and #43 of FIG. 30 operating motor 167 and the rotary relay when switch 283 energizes clutch 170 in FIG. 29 to activate fore reaction jets on the satellite when the speed of the satellite exceeds the selected speed, the rotary relay activating aft reaction jets on the satellite when the speed of the satellite is less than the selected speed. Thus the speed of the satellite would be precisely adjusted to the selected speed without overshooting oscillations, since terminals #42 and #43 in FIG. 30 provide pulses of operation of motor 167 the duration of which are in proportion to the deviation of the actual speed of the craft from the desired speed as previously described.

The operating speed of longitude motor 117 of the dead-reckoning computer in FIG. 29 could very conveniently be accurately synchronized with a reference oscillator as previously described, particularly since the sine of the desired azimuth is one and the secant of the desired latitude is one for satellites orbiting in the equatorial plane of the Earth. The reference oscillator might consist of an electronically actuated tuning fork such as utilized in precision time pieces such as the Bulova accutron watches, any appropriate pick-up means such as a microphone or electro-magnetic field being utilized in conjuunction with an appropriate amplifier to convert the mechanical oscillations of the tuning fork to electrical oscillations. Any other appropriate oscillator with the desired accuracy could also be utilized. The tachometer generator means of longitude motor 117 in FIG. 29 would then be an optically encoded digital tachometer or alternating current tachometer generator, the longitude voltage means in FIG. 29 would be an accurate reference oscillator, and the speed control means controlling longitude motor 117 would be a phase sensitive amplifier synchronizing the speed of longitude motor 117 with the reference oscillator as previously described. Thus a series of artificial communication or radio satellites utilizing the described guidance system of FIG. 29 with an identical reference oscillator in each satellite could be very precisely positioned in longitude with respect to each other at appropriate longitude intervals in the Equatorial plane of the Earth. The artificial satellites could obviously be properly positioned with respect to each other in the Equatorial plane of the Earth by radio command from Earth in a conventional manner.

Upon firing of a space craft into orbit, the inertial navigation computer 494 of FIG. 39 could maintain guidance of the space craft in a conventional launching mode of operation until the space craft were in orbit, switch 195 in FIG. 29 at some pre-determined geographical location then transferring guidance from the launching mode to normal celestial navigation and guidance as previously described.

Firing of retro-rockets could be provided by radio command from Earth or by switch 195 in FIG. 29 at some pre-determined geographical location to appropriately decrease the speed of the space craft prior to re-entrance into the Earth's atmosphere. Adjustment of the craft's orbit could also be provided by radio command from Earth, it merely being necessary to select three destinations approximately 120° apart in the desired orbit by the destination selection means of FIG. 29 and adjust the speed selection means of FIG. 29 to achieve an orbit of a desired altitude.

Since many changes could be made in the aforesaid construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. A celestial navigation means comprising a first platform, means to mount said first platform with three degrees of rotational freedom in a craft permitting orientation of said first platform with respect to true north and a true vertical, means to properly orient said first platform with respect to a true vertical, a second platform mounted on said first platform, said second platform having a first axis of adjustment with respect to said first platform, said second platform having a second axis of adjustment at right angles to said first axis of adjustment, a tracking element, said tracking element mounted to rotate on a third axis of said second platform, said third axis being at right angles to said second axis, a principal axis of said tracking element being at right angles to said third axis, means to adjust said principal axis of said tracking element in rotation about said third axis in accordance with the declination of a celestial body, tracking means responsive to said tracking element to rotate said tracking element about said first and second axes to properly align said principal axis of said tracking element with respect to said celestial body, means to properly orient said first platform with respect to true north such that said second axis is parallel to the Earth's axis of rotation when said principal axis of said tracking element is properly aligned with respect to said celestial body, means responsive to the angle of rotation of said tracking element about said second axis to indicate longitude of said tracking element, means responsive to the angle of rotation of said tracking element about said first axis to indicate latitude of said tracking element.

2. The apparatus of claim 1 including, first servo positioning means, second servo positioning means, multi-position switching means, means responsive to each position of said multi-position switching means to properly compensate said first and second servo positioning means in accordance respectively with the sidereal hour angle and declination of an individual celestial body, means responsive to said first servo positioning means to properly adjust said tracking element in rotation about said second axis in accordance with the sidereal hour angle of a celestial body selected by said multi-position switching means, means responsive to said second servo positioning means to properly adjust said tracking element in rotation about said third axis in accordance with the declination of a celestial body selected by said multi-position switching means, means to appropriately readjust said multi-position switching means whenever a previously selected celestial body approaches the limit for practical navigation, said first and second servo positioning means responsive to the geographical location of said tracking element and said readjustment of said multi-position switching means to properly reorient said tracking element with a celestial body selected by said multi-position switching means.

3. The apparatus of claim 1 wherein all the adjusting axes of said first and second platforms coincide at a common intersection point to prevent lateral translation of said common intersection point with respect to said craft upon adjustment of any of said axes.

4. The apparatus of claim 1 including, a true north seeking gyroscope, means to mount said true north seeking gyroscope with three degrees of rotational freedom permitting orientation of said true north seeking gyroscope with respect to true north and a true vertical, means coupling said true north seeking gyroscope to said first platform, means to properly orient said true north seeking gyroscope with respect to a true vertical when said first platform is properly oriented with respect to true north, deviation of said first platform from true north resulting in deviation of said true north seeking gyroscope from a true vertical, torquing means responsive to deviation of said true north seeking gyroscope from a true vertical properly orienting said first platform with respect to true north, said true north seeking gyroscope providing proper azimuth stabilization of said first platform with respect to true north.

5. The navigation means of claim 1 including, true north computing means to determine the known deviation of magnetic north from true north as a function of geographical location, and means to provide said true north computing means with the true direction of magnetic north at the true geographical location of said navigation means, said true north computing means responsive to the determined geographical location of said navigation means to determine true north, said means to properly orient said first platform with respect to true north being responsive to said true north computing means.

6. The navigation means of claim 1 including, true vertical computing means to determine the known deviation of the Earth's magnetic field from a true vertical as a function of geographical location, and means to provide said true vertical computing means with the true inclination of the Earth's magnetic field at the true geographical location of said navigation means, said true vertical computing means responsive to the determined geographical location of said navigation means to determine a true vertical, said means to properly orient said first platform with respect to a true vertical being responsive to said true vertical computing means.

7. The apparatus of claim 1 including, gyroscopic means, means to mount said gyroscopic means with three degrees of rotational freedom with respect to said craft permitting orientation of said gyroscopic means with respect to true north and a true vertical, means to stably orient said gyroscopic means with respect to true north in conformity with said first platform, means to stably orient said gyroscopic means with respect to a true vertical, means responsive to said gyroscopic means to provide stabilized orientation of said first platform with respect to a true vertical, said gyroscopic means providing a stabilized true north and true vertical reference.

8. The celestial navigation means of claim 1 including, a third platform, means to mount said third platform in said craft permitting orientation of said third platform with respect to true north and a true vertical independently of the attitude of said craft, means to maintain said third platform stably oriented with respect to true north and a true vertical, first and second accelerometer means mounted on said third platform, said first and second accelerometer means responsive to accelerations of said craft respectively in the north-south and east-west direction, inertial navigation means responsive to said accelerometer means to determine longitude and latitude, means responsive to said celestial navigation means to provide accurate monitoring of said inertial navigation means during normal operation of said celestial navigation means, malfunction detection means to determine malfunctioning of said celestial navigation means, said inertial navigation means responsive to said malfunction detection means to maintain continuous accurate navigation during malfunctioning of said celestial navigation means.

9. The apparatus of claim 8 including, means responsive to said inertial navigation means to maintain a true north and a true vertical reference, said inertial navigation means responsive to said malfunction detection means during malfunctioning of said celestial navigation means to maintain proper orientation of components normally oriented by said celestial navigation means.

10. Celestial tracking means, means to mount said celestial tracking means in a craft permitting tracking of selected celestial bodies by said celestial tracking means, celestial navigation means responsive to said celestial tracking means to determine geographical location of said craft, celestial multi-position switching means, celestial servo positioning means, means responsive to said celestial servo positioning means to properly orient said celestial tracking means with respect to celestial bodies selected by said celestial multi-position switching means, and means to appropriately readjust said celestial multi-position switching means whenever selected celestial bodies reach the practical limit for navigation, said celestial servo positioning means being responsive to said craft's determined geographical location and said adjustment of said celestial multi-position switching means to properly reorient said celestial tracking means with respect to celestial bodies selected by said celestial multi-position switching means.

11. The device of claim 10 including, malfunction detection means, said malfunction detection means disconnecting said celestial navigation means during malfunctioning of said celestial navigation means, further navigation means independent of said celestial navigation means and responsive during malfunctioning thereof to said malfunction detection means to determine the geographical location of said craft and to maintain proper orientation of components normally oriented by said celestial navigation means.

12. The apparatus of claim 10 including, chronometer means responsive to the rate of rotation of the Earth with respect to celestial bodies tracked by said celestial tracking means, said celestial servo positioning means responsive to said chronometer means and said celestial tracking means to accurately determine the geographical location of said craft when said celestial servo positioning means is not operating to transfer navigation to other celestial bodies.

13. The apparatus of claim 12 including, differential means, said differential means responsive to said chronometer means and said celestial tracking means to provide instantaneous determination of said craft's geographical location, means responsive to said celestial servo positioning means to accurately correct the geographical location determined by said differential means when the geographical location determined by said celestial servo positioning means is not in agreement with the geographical location determined by said differential means.

14. The apparatus of claim 10 including, a celestial selection element, differential means responsive to the longitude of said craft and the Earth's longitudinal rotation with respect to selected celestial bodies, said differential means adjusting said celestial selection element in accordance with the hour angle of said selected celestial bodies with respect to said celestial tracking means, means responsive to said celestial selection element to appropriately readjust said celestial multi-position switching means whenever selected celestial bodies reach the practical limit for navigation.

15. The navigation apparatus of claim 10 including in combination, a chart remote therefrom, position indicating means to indicate geographical position on said chart, means responsive to said navigation apparatus to adjust said position indicating means to indicate the geographical position of said craft on said chart.

16. The navigation apparatus of claim 10 including in combination, a chart in rectangular coordinates remote therefrom, position indicating means to indicate geographical position on said chart, longitude servo positioning means, latitude servo positioning means, said longitude servo positioning means responsive to said navigation apparatus to adjust said position indicating means to indicate the longitude of said craft on said chart, said latitude servo positioning means responsive to said navigation apparatus to adjust said position indicating means to indicate the latitude of said craft on said chart, scale selection means to properly compensate said longitude and latitude servo positioning means, calibration means to properly compensate said longitude and latitude servo positioning means, said longitude and latitude servo positioning means responsive to said scale selection and calibration means to adjust said position indicating means to properly indicate the geographical position of said craft on a chart of any selected scale.

17. The apparatus of claim 16 including, a series of charts in rectangular coordinates, chart selection means, means responsive to said chart selection means to properly position any of said series of charts for selected viewing, a series of scale selection means preadjustable to properly compensate said longitude and latitude servo positioning means for each chart of said series of charts, a series of calibration means preadjustable to properly compensate said longitude and latitude servo positioning means for each chart of said series of charts, means responsive to said chart selection means to properly compensate said longitude and latitude servo positioning means with the appropriate said scale selection and calibration means for each chart selected by said chart selection means, said longitude and latitude servo positioning means responsive to said navigation apparatus and said chart selection means to adjust said position indicating means to properly indicate the geographical position of said craft on any chart selected by said chart selection means.

18. A tracking element, means to mount said tracking element with two degrees of rotational freedom in a craft permitting orientation of said tracking element with respect to a celestial body, tracking means responsive to the angular position of said tracking element to properly orient said tracking element with respect to a celestial body, means responsive to the angular position of said tracking element to determine the geographical location of said craft, first servo positioning means, second servo positioning means, first multi-position switching means, means responsive to each position of said first multi-position switching means to properly compensate said first and second servo positioning means in accordance with an individual celestial body, means responsive to said first and second servo positioning means to properly orient said tracking element with a celestial body selected by said first multi-position switching means, means to appropriately readjust said first multi-position switching means whenever a previously selected celestial body approaches the limit for practical navigation, said first and second servo positioning means responsive to the craft's geographical location and said adjustment of said first multi-position switching means to properly reorient said tracking element with a celestial body selected by said first multi-position switching means.

19. The apparatus of claim 18 including, first relay means, operation of said first relay means responsive to readjustment of said first multi-position switching means, locking means responsive to readjustment of said first multi-position switching means and said first and second servo positioning means to lock said first relay means in operation until said first and second servo positioning means have completed said proper reorientation of said tracking element with respect to another celestial body selected by said readjustment of said first multi-position switching means, means responsive to said operation of said first relay means to disconnect said tracking means during reorientation of said tracking element to another celestial body.

20. The apparatus of claim 19 including, longitude indicating means, chronometer means responsive to the rate of rotation of the Earth with respect to celestial bodies tracked by said tracking element, said first servo positioning means responsive to said first relay means and said chronometer means and the angular position of said tracking element to properly adjust said longitude indicating means to indicate longitude of said craft when said first relay means is not operating to transfer navigation to another celestial body, said first servo positioning means responsive to said first relay means to properly reorient said tracking element with respect to another celestial body selected by said first multi-position switching means upon readjustment of said first multi-position switching means.

21. The apparatus of claim 20 including, first clutch means, second clutch means, second relay means, said second relay means responsive to said first servo positioning means to energize said first clutch means and de-energize said second clutch means when said first servo positioning means is at its null point, said second relay means responsive to said first servo positioning means to energize said second clutch means and de-energize said first clutch means when said first servo positioning means is not at its null point, differential means, said differential means responsive to said first clutch means and said chronometer means and the angular position of said tracking element to adjust said longitude indicating means to provide an instantaneous indication of longitude when said first servo positioning means is at its null point, said first servo positioning means responsive to said second clutch means and said chronometer means and the angular position of said tracking element to accurately correct said longitude indicating means when said first servo positioning means is not at its null point, means responsive to said first relay means disengaging said first and second clutch means during transfer of navigation to another celestial body.

22. The apparatus of claim 20 including, refraction computing means to properly compensate said first and second servo positioning means for errors due to refraction of rays in the Earth's atmosphere.

23. The apparatus of claim 20 including, computing means to properly compensate said first and second servo positioning means for errors due to the proximity to Earth of the tracked celestial bodies.

24. The apparatus of claim 18 including in combination, master servo positioning means, a series of adjustable parameter elements, parameter setting means to adjust said master servo positioning means to a desired numerical value, second multi-position selection means, activating means to provide activation of said master servo positioning means after proper adjustment of said parameter setting means and said second multi-position selection means, said master servo positioning means responsive to said parameter setting means and said second multi-position selection means to adjust a said adjustable parameter element selected by said second multi-position selection means to the numerical value indicated by said parameter setting means upon activation by said activating means, each position of said first multi-position switching means connecting appropriate said adjustable parameter elements respectively into said first and second servo positioning means, said first and second servo positioning means responsive to said craft's geographical location and said connection of said adjustable parameter elements upon readjustment of said first multi-position switching means to properly reorient said tracking element with a celestial body selected by said first multi-position switching means.

25. A tracking element, means to mount said tracking element with two degrees of rotational freedom permitting orientation of said tracking element with a celestial body, a first axis of said tracking element, a second axis of said tracking element, first motor means to adjust said tracking element in rotation about said first axis, second motor means to adjust said tracking element in rotation about said second axis, third motor means, fourth motor means, first synchronizing means, second synchronizing means, said first synchronizing means synchronizing said first motor means with said third motor means, said second synchronizing means synchronizing said second motor means with said fourth motor means, tracking means responsive to the orientation of said tracking element with a celestial body, said third and fourth motor means responsive to said tracking means to properly orient said tracking element with a celestial body, means responsive to said third and fourth motor means providing a rapid indication of geographical location sensing changes in geographical location before said tracking element is reoriented to changes in geographical location.

26. A tracking element, means to mount said tracking element with two degrees of rotational freedom in a craft permitting orientation of said tracking element with respect to a celestial body, tracking means responsive to the angular position of said tracking element to properly orient said tracking element with respect to a celestial body, means responsive to the angular position of said tracking element to determine longitude and latitude, a celestial selection element, differential means responsive to the determined longitude of said craft and the Earth's longitudinal rotation with respect to selected celestial bodies, said differential means adjusting said celestial selection element in accordance with the hour angle of selected celestial bodies with respect to said craft, servo positioning means, said servo positioning means responsive to said adjustment of said celestial selection element to transfer navigation by said tracking element to a proper celestial body in accordance with said adjustment of said celestial selection element whenever a previous selected celestial body reaches the limit for practical navigation.

27. The apparatus of claim 26 including, first celestial activating means responsive to said adjustment of said celestial selection element at desired hour angles of selected celestial bodies, second celestial activating means responsive to said adjustment of said celestial selection element at desired hour angles of selected celestial bodies, further celestial activating means responsive to said adjustment of said celestial selection element at desired hour angles of selected celestial bodies, said servo positioning means responsive to said first celestial activating means to provide navigation by celestial bodies in a first direction from the zenith of said tracking element when said servo positioning means is activated by said first celestial activating means, said servo positioning means responsive to said second celestial activating means to provide navigation by celestial bodies in a second direction from the zenith of said tracking element when said servo positioning means is activated by said second celestial activating means, said servo positioning means responsive to said further celestial activating means to provide navigation by celestial bodies in a further direction from the zenith of said tracking element when said servo positioning means is activated by said further celestial activating means, means to provide activation of said servo positioning means by a desired said celestial activating means in accordance with the geographical location of said craft to provide navigation by celestial bodies in a desired direction from the zenith of said tracking element, said operation of said celestial selection element providing navigation by celestial bodies appropriate to time and the geographical location of said craft.

28. The apparatus of claim 27 including, a latitude adjustable element, means responsive to the determined latitude of said craft to properly adjust said latitude adjustable element, latitude activating means responsive to said adjustment of said latitude adjustable element at desired ranges of latitude, means responsive to said latitude activating means to provide activation of said servo positioning means by appropriate said celestial activating means in accordance with the geographical location of said craft, said servo positioning means responsive to said celestial activating means to provide navigation by celestial bodies appropriate to time and the geographical location of said craft.

29. The apparatus of claim 28 including, a longitude adjustable element, means responsive to the determined longitude of said craft to properly adjust said longitude adjustable element, longitude activating means responsive to said adjustment of said longitude adjustable element at desired ranges of longitude, means responsive to said longitude activating means and said latitude activating means to provide activation of said servo positioning means by appropriate said celestial activating means in accordance with the geographical location of said craft, said servo positioning means responsive to said celestial activating means to provide navigation by celestial bodies appropriate to time and the geographical location of said craft.

* * * * *